US011142020B2

(12) United States Patent
Christensen et al.

(10) Patent No.: US 11,142,020 B2
(45) Date of Patent: Oct. 12, 2021

(54) REINFORCED THERMOPLASTIC COMPONENTS AND METHOD OF MANUFACTURE THEREOF

(71) Applicant: CSS Composites LLC, Gunnison, UT (US)

(72) Inventors: Jason Christensen, Gunnison, UT (US); Joseph Stanish, Gunnison, UT (US); Roland Christensen, Gunnison, UT (US)

(73) Assignee: CSS COMPOSITES LLC, Gunnison, UT (US)

( * ) Notice: Subject to any disclaimer, the term of this patent is extended or adjusted under 35 U.S.C. 154(b) by 0 days.

(21) Appl. No.: 17/036,661

(22) Filed: Sep. 29, 2020

(65) Prior Publication Data

US 2021/0094345 A1   Apr. 1, 2021

Related U.S. Application Data

(60) Provisional application No. 62/908,320, filed on Sep. 30, 2019, provisional application No. 62/982,611, filed on Feb. 27, 2020.

(51) Int. Cl.
*B60B 5/02* (2006.01)
*B29C 70/34* (2006.01)
(Continued)

(52) U.S. Cl.
CPC ............. *B60B 5/02* (2013.01); *B29C 70/34* (2013.01); *B60B 1/041* (2013.01); *B60B 1/043* (2013.01);
(Continued)

(58) Field of Classification Search
CPC ......... B60B 5/02; B60B 21/062; B60B 1/041; B60B 1/043; B60B 2310/3025;
(Continued)

(56) References Cited

U.S. PATENT DOCUMENTS 2,937,905 A   5/1960  Altenburger
4,030,754 A   6/1977  Merlette
(Continued)

FOREIGN PATENT DOCUMENTS

EP   1506882 A1   2/2005
EP   2524817 B1   7/2015

OTHER PUBLICATIONS

PCT International Search Report and the Written Opinion for International Application No. PCT/US2020/053314, 17 pages.

*Primary Examiner* — Kip T Kotter
(74) *Attorney, Agent, or Firm* — Dorsey & Whitney LLP

(57) ABSTRACT

Disclosed herein are systems and techniques for producing complex components using a reinforced thermoplastic material. The complex components can include contoured or curved outer surfaces, and in some cases define a cavity. In certain examples, one or more thermoplastic materials are arranged to form a wheel component, such as that adapted to define a rim of the bicycle. Thermal bonding can be used to join multiple reinforced thermoplastic materials to one another in order to form a cavity of the wheel component or other complex shape. In certain examples, a portion of a tooling assembly can be pressurized to maintain a shape of the cavity during thermal bonding and cooling. This can remove the need for a sacrificial bladder or other structure that would maintain the shape of the cavity, allowing for a seamless final component, optionally absent indicia of bladder exit or other seams.

24 Claims, 34 Drawing Sheets

(51) Int. Cl.
*B60B 1/04* (2006.01)
*B29L 31/32* (2006.01)

(52) U.S. Cl.
CPC ..... *B29L 2031/32* (2013.01); *B60B 2310/206* (2013.01); *B60B 2310/3025* (2013.01); *B60B 2310/318* (2013.01); *B60B 2360/3412* (2013.01); *B60B 2360/3416* (2013.01)

(58) Field of Classification Search
CPC ...... B60B 2310/318; B60B 2360/3412; B60B 2360/3416
USPC ............ 301/95.102, 95.103, 95.104, 95.105
See application file for complete search history.

(56) References Cited

U.S. PATENT DOCUMENTS

| | | | |
|---|---|---|---|
| 5,282,673 A | 2/1994 | Koyama et al. | |
| 5,414,463 A | 5/1995 | Katoh et al. | |
| 5,540,485 A | 7/1996 | Enders | |
| 5,975,645 A | 11/1999 | Sargent | |
| 6,347,839 B1* | 2/2002 | Lew | B29C 70/345 |
| | | | 301/95.102 |
| 7,578,563 B2 | 8/2009 | Muraoka et al. | |
| 8,491,828 B2 | 7/2013 | Wetzels et al. | |
| 8,905,491 B2 | 12/2014 | Koshiyama | |
| 9,108,461 B2* | 8/2015 | Kismarton | B60B 3/10 |
| 2002/0108249 A1* | 8/2002 | Meggiolan | B29C 70/446 |
| | | | 29/895.3 |
| 2003/0090141 A1 | 5/2003 | Dietrich | |
| 2005/0062337 A1* | 3/2005 | Meggiolan | B29C 70/446 |
| | | | 301/95.102 |
| 2007/0194619 A1 | 8/2007 | Colegrove et al. | |
| 2007/0205654 A1* | 9/2007 | Denk | B60B 5/02 |
| | | | 301/95.102 |
| 2008/0265657 A1* | 10/2008 | Reuteler | B60B 5/02 |
| | | | 301/95.101 |
| 2008/0265658 A1* | 10/2008 | Reuteler | B60B 5/02 |
| | | | 301/95.102 |
| 2010/0013119 A1 | 1/2010 | Meggiolan et al. | |
| 2010/0253132 A1* | 10/2010 | Schlanger | B60B 7/063 |
| | | | 301/37.24 |
| 2012/0006470 A1* | 1/2012 | Lew | B60B 5/02 |
| | | | 156/193 |
| 2012/0013172 A1* | 1/2012 | Mercat | B60B 21/062 |
| | | | 301/95.102 |
| 2016/0243893 A1 | 8/2016 | Wissler et al. | |
| 2016/0325582 A1 | 11/2016 | Werner et al. | |
| 2018/0264756 A1 | 9/2018 | Giaraffa et al. | |
| 2020/0114679 A1* | 4/2020 | Morse | B60B 1/003 |

\* cited by examiner

REINFORCED THERMOPLASTIC COMPONENTS AND METHOD OF MANUFACTURE THEREOF

CROSS-REFERENCE TO RELATED APPLICATION

This application claims the benefit of priority to U.S. Provisional Application No. 62/908,320 entitled "Reinforced Thermoplastic Components and Method of Manufacture Thereof," filed Sep. 30, 2019, and to U.S. Provisional Application No. 62/982,611 entitled "Reinforced Thermoplastic Components and Method of Manufacture Thereof," filed Feb. 27, 2020, the disclosures of which are hereby incorporated by reference in their entirety.

FIELD

The described embodiments relate generally to high-strength, light-weight structures formed from reinforced thermoplastic materials, and more particularly, to structures formed from reinforced thermoplastic materials that can define a hollow cavity.

BACKGROUND

Composite materials can include a combination of two or more distinct materials that cooperate in a manner to complement and enhance their respective material properties. For example, composite materials can include a combination of relatively low weight materials and relatively high strength materials in order to produce components having a high strength to weight ratio. Such components can include intricate shapes and designs, including shapes tailored for specialty purposes. Specialty purpose components can, for example, include shapes having contoured surfaces, such as curved exteriors. Components can also have a hollow interior for weight reduction. In many traditional systems, thermoset materials are used to hold reinforcing materials in a matrix. Traditional approaches can produce overly brittle components, and limit component and manufacturing adaptability. Further, traditional manufacturing of components formed from composite materials, and resulting in a shape with a hollow interior, can involve complex, multi-step processes that increase cost and that can result in discontinuities or inconsistencies. As such, the need continues for techniques that can enhance the range of composite material component shapes and structures, without limiting functionality or performance of overall design.

SUMMARY

Examples of the present system and method are directed to reinforced thermoplastic components. More specifically, the examples described herein are directed to reinforced thermoplastic components having complex shapes, such as a shape having curved contours, substantially hollow interiors, and/or other properties. The reinforced thermoplastic components described herein can, in certain examples, be used to form a wheel component, such as a wheel used for a bicycle. The reinforced thermoplastic material can be used to form a completely continuous circular component that forms a wheel. The wheel component, or other structure formed by the reinforced thermoplastic material, can be a substantially hollow structure. Disclosed herein are techniques for forming the wheel component using one or more reinforced thermoplastic materials to form the wheel component having the hollow interior and a curved outer surface, including where the wheel component has a substantially circular hollow cavity and a continuous circular outer shape.

In one example, a wheel component is disclosed. The wheel component includes a rim bed portion defining an outer annular surface of the wheel component that is configured to engage a bicycle tire. The wheel component further includes a main structure portion defining a cavity with the rim bed portion. The rim bed portion and main structure portion are each formed from a reinforced thermoplastic material. The rim bed portion and the main structure are bonded to one another to form an integral structure.

In another example, the main structure portion can include a wall portion formed from the reinforced thermoplastic material. The reinforced thermoplastic material of the wall portion can include a plurality of plies overlapping one another and defining a radial crossply. The plurality of plies can include a first ply having a first edge. The first edge can define a bias angle of between 22.5 and 75 degrees from a center axis of a continuous circle defined by the outer annular surface.

In another example, the plurality of plies can include a second ply having a second edge. The second ply can overlap the first ply with the first and second edges being substantially transverse to one another. In some examples, the first and second plies can define an arrangement of plies. The wheel component can further include a plurality of the arrangement of plies disposed in a radial pattern to define the wall portion.

In another example, the rim bed portion and main structure portion can be at least one of thermally bonded, chemically bonded, or adhesively bonded.

In another example, the main structure portion can define an inner annular surface of the wheel component that is configured to receive a series of spokes. The main structure portion can be configured to withstand a pull force associated with the series of spokes of at least 300 lbs. The main structure portion can define a reinforcing layer along the inner annular surface.

In another example, the reinforced thermoplastic material includes a thermoplastic material and fibers held within the thermoplastic material. The fibers can include one or more of carbon fibers, glass fibers, Kevlar fibers, or basalt fibers. In some examples, the fibers can define at least 30% of a volume of the reinforced thermoplastic material.

In another example, a wheel component is disclosed. The wheel component can include a continuous reinforced thermoplastic material and can have a rim bed portion and a main structure portion connected to the rim bed portion. The continuous reinforced thermoplastic material defines a circular cavity therethrough. External surfaces of the wheel component can be defined by the rim bed portion and the main structure portion can be free of indicia associated with a bladder exit from the cavity.

In another example, the indicia can include through portions of the wheel component extending between the circular cavity and an external environment that have a cross-dimension of greater than 15 mm. Further, the external surfaces can cooperate to completely seal the circular cavity from the external environment. The continuous reinforced thermoplastic material can include a layup of reinforced thermoplastic sections overlapping one another to define a radial crossply. The radial crossply can extend along a sidewall of the main structure portion.

In another example, the circular cavity can be formed by maintaining a pressurized region between the rim bed portion and the main structure portion during a thermal bonding process. The pressurized region can be maintained without an internal bladder, thereby allowing the external surfaces of the rim bed portion and the main structure portion to be free of the indicia typically associated with bladder exit from the cavity.

In another example, the circular cavity is self-sealing. The continuous reinforced thermoplastic material can exhibit a flexural strength of at least 740 MPa.

In another example, a method of manufacturing a fully reinforced thermoplastic wheel component is disclosed. The method includes forming a rim bed portion from a first reinforced thermoplastic material. The method further includes forming a main structure portion from a second reinforced thermoplastic material. The method further includes forming the fully reinforced thermoplastic wheel component as a continuous circular component by thermally bonding the rim bed portion and the main structure portion to one another within a tooling compartment.

In another example, forming the main structure can include defining a radial crosspły by arranging a first ply of the second reinforced thermoplastic material relative to a second ply of the second reinforced thermoplastic material. One or both of the first or second plies defines a bias angle relative to a center axis of between 22.5 and 75 degrees. The forming of the main structure portion can include stamping the second reinforced thermoplastic material to define an inner annular surface configured for association with a series of spokes.

In another example, the operation of forming the fully reinforced thermoplastic wheel component can include heating the first and second reinforced thermoplastic materials above a melting temperature. Forming the fully reinforced thermoplastic wheel component can further include defining a cavity between the rim bed portion and the main structure portion by pressurizing a region of the tooling compartment substantially between the rim bed portion and the main structure portion.

In another example, a wheel component is disclosed. The wheel component includes a rim bed portion defining an outer annular surface of the wheel component that is configured to engage a bicycle tire. The wheel component further includes a main structure portion defining a cavity with the rim bed portion. The rim bed portion and the main structure portion are each formed from a reinforced thermoplastic material. Further, the rim bed portion and the main structure are thermally bonded to one another to form an integral structure.

In another example, the main structure portion can define an inner annular surface of the wheel component that can be configured to receive a series of spokes. The series of spokes can be engaged with the main structure portion to exhibit a pull force from the wheel component of at least 300 lbs. Additionally or alternatively, the series of spokes can be engaged with the main structure portion to exhibit a pull force from the wheel component of at least 400 lbs. Additionally or alternatively, the series of spokes can be engaged with the main structure portion to exhibit a pull force from the wheel component of at least 500 lbs.

In another example, the rim bed portion can be seated at least partially within the main structure portion. In some cases, the main structure portion includes a first wall portion and a second wall portion. The cavity can at least partially be defined by each of the rim bed portion, the first wall portion, and the second wall portion. The first wall portion and the second wall portion can be connected to one another via a lap joint. Additionally or alternatively, the second wall portion can define a reinforcing layer along an annular surface defined by the first wall portion. In some examples, the main structure portion can further include a third wall portion. In this regard, the cavity can be defined by each of the rim bed portion, the first wall portion, the second wall portion, and the third wall portion.

In another example, the rim bed portion includes a first rim wall portion and a second rim wall portion. The cavity can at least partially be defined by each of the first rim wall portion, the second rim wall portion, and the main structure portion.

In another example, the integral structure can define a continuous circular shape.

In another example, the reinforced thermoplastic material can include a thermoplastic material. The reinforced thermoplastic material can also include fibers held within the thermoplastic material. The fibers can include one or more of carbon fibers, glass fibers, Kevlar fibers, and/or basalt fibers. In some examples, the fibers can define at least 40% of a volume of the reinforced thermoplastic material. Additionally or alternatively, the fibers can define at least 70% of the volume of the reinforced thermoplastic material. The reinforced thermoplastic material can also include resin-impregnated spread carbon fiber tows, in certain applications.

In another example, the wheel component further includes a spoke portion formed from a reinforced thermoplastic material. The spoke portion can be thermally bonded with the main structure portion to form the integral structure as including each of the rim bed portion, the main structure portion, and the spoke portion. In this regard, the wheel component can further include a hub portion formed from a thermoplastic material. The hub portion can be thermally bonded with the spoke portion to form the integral structure including each of the rim bed portion, the main structure portion, the spoke portion, and the hub portion. While many shapes are possible and described herein, in some examples, the integral structure can define a tri-spoke shape.

In another example, a wheel component is disclosed. The wheel component includes a continuous reinforced thermoplastic material having a rim bed portion and a main structure portion connected to the rim bed portion. The continuous reinforced thermoplastic material defines a circular cavity therethrough. External surfaces of the wheel component are defined by the rim bed portion and the main structure portion, and are free of indicia associated with a bladder exit from the cavity.

In another example, the indicia can include through portions of the wheel component that extend between the circular cavity and an external environment, and that have a cross-dimension of greater than 20 mm. Additionally or alternatively, the indicia can include through portions of the wheel component that extend between the circular cavity and the external environment, and that have a cross-dimension of greater than 10 mm. The external surfaces cooperate to completely seal the circular cavity from the external environment.

In another example, the circular cavity can be formed by maintaining a pressurized region between the rim bed portion and the main structure portion during a thermal bonding process. The pressurized region can be maintained without an internal bladder, thereby allowing the external surfaces of the rim bed portion and the main structure portion to be free of the indicia associated with a bladder exit from the cavity.

In another example, a portion of an inflation component can be within the circular cavity and thermally bonded to the main structure portion. The portion of the inflation component can have a melt temperature that is higher than a melt temperature of the main structure portion. The portion of the inflation component can have a melt temperature that can be higher than the main structure portion and a melt temperature of the rim bed portion.

In another example, the wheel component can include a film within the circular cavity. The film can be adapted to define a self-sealing permanent bladder within the circular cavity. In some examples, the film can be formed from a nylon material. The film can have a melt temperature that can be higher than the melt temperature of one or both of the main structure portion or the rim bed portion.

In another example, the main structure portion can define a reinforced region along an inner annular region of the wheel component. The reinforced region can include multiple reinforced thermoplastic layers, thermally bonded to one another. The main structure portion can include a first wall portion and a second wall portion, each overlapping along the inner annular region. In some examples, the reinforced region is configured to establish a spoke pull force of at least 500 lbs.

In another example, the continuous reinforced thermoplastic material includes fiber filaments suspended in a resin matrix. The fiber filaments can be arranged in a compacted configuration adjacent one another within the resin matrix. The continuous reinforced thermoplastic material includes a nano coating therein surrounding fiber filaments for binding the filaments to the resin matrix. While many materials are possible, the fiber filaments can include one or more of carbon fibers, glass fibers, Kevlar fibers, or basalt fibers. In some examples, the continuous reinforced thermoplastic material can exhibit a flexural strength of at least 740 MPa.

In another example, a method of manufacturing a fully reinforced thermoplastic wheel component is disclosed. The method includes arranging a rim bed portion and a main structure portion within a tooling compartment. The rim bed portion and the main structure portion are formed from a reinforced thermoplastic material. The method further includes pressurizing a region of the compartment that is between the rim bed portion and the main structure portion. The method further includes bonding the rim bed portion and the main structure portion by heating the reinforced thermoplastic material above a melting temperature. The method further includes sealing a cavity defined by the rim bed portion and the main structure portion.

In another example, the operation of heating includes exposing the tooling compartment to a heat source exhibiting a temperature of at least 450 degree F. The operation of arranging a rim bed portion and a main structure portion within a tooling compartment can include sealing the rim bed portion at least partially within the main structure portion.

In another example, the main structure portion can include a first wall portion and a second wall portion. In this regard, the operation of arranging can include overlapping the first wall portion and the second wall portion along an inner annular surface of the wheel component. In some examples, the operation of arranging can include mechanically engaging each of the first wall portion with a first side of the rim bed portion, and the second wall portion with a second side of the rim bed portion opposite the first side of the rim bed portion. Further, the operation of bonding can include defining an edge joint along the mechanical engagement of each of the first wall portion and the first side of the rim bed portion, and the second wall portion and the second side of the rim bed portion.

In another example, the operation of pressurizing includes delivering a pressurized fluid into the region of the compartment between the rim bed portion and the main structure portion. The pressurized fluid can be configured to maintain the region at a pressure of greater than 40 psi. The pressurized fluid can include compressed air.

In one example, the operation of pressurizing includes maintaining a contour of the region of the compartment that is between the rim bed portion and the main structure portion with a sacrificial material to define the cavity. In this regard, the operation of sealing can include allowing the reinforced thermoplastic material to close on itself at a point of entry for the pressurized fluid delivery. In some examples, the method further includes plying a higher-melt temperature material to one or both of the rim bed portion or the main structure portion, prior to the operation of arranging. The higher-melt temperature material can be a film plied to a consolidated panel or stamp form shape of one or both of the rim bed portion or the main structure portion.

In another example, the operation of pressurizing can include at least partially inserting a portion of the inflation component into the region of the compartment between the rim bed portion and the main structure portion. The portion of the inflation component can include a consumable adapted to seal the point of entry for the pressurized fluid delivery. Further, the portion of the inflation component can also include a thermoplastic material having a melt temperature that is higher than a melt-temperature of the reinforced thermoplastic material used to form the rim bed portion or the main structure portion. In some examples, the operation of sealing can include sealing a thermoplastic plug at the point of entry.

In one example, the operation of bonding defines an integral structure from the rim bed portion and the main structure portion. The integral structure can be a continuous circular structure.

In another example, a method of manufacturing a fully reinforced thermoplastic wheel component is disclosed. The method can include forming a rim bed portion from a first reinforced thermoplastic material, forming a main structure portion from a second reinforced thermoplastic material, and forming the fully reinforced thermoplastic wheel component as a continuous circular component by thermally bonding the rim bed portion and the main structure portion to one another within a tooling compartment.

In another example, the operation of forming the rim bed portion can include stamping the first reinforced thermoplastic material to define an external annular surface configured to engage a bicycle tire. The operation of forming the main structure portion can include stamping the second reinforced thermoplastic material to define an inner annular surface configured for association with a series of spokes.

In another example, the method can further include providing the first reinforced thermoplastic material and the second reinforced thermoplastic material from a common reinforced thermoplastic material having fiber tows arranged within a resin material. The fiber tows can be compacted relative to one another within the resin material. In some examples, the fiber tows can be arranged as a matrix having a width substantially larger than a height, the matrix defining a spread tow.

In another example, the operation of forming the fully reinforced thermoplastic wheel component can include heating the first and second reinforced thermoplastic materials above a melting temperature. Further, the operation of forming the fully reinforced thermoplastic wheel component can include defining a cavity between the rim bed portion and the main structure portion by pressurizing a region of the tooling compartment substantially between the rim bed portion and the main structure portion. Further, the operation of forming the fully reinforced thermoplastic wheel component can include arranging the rim bed portion, the main structure portion, and a sacrificial bladder in the tooling compartment, the sacrificial bladder configured to maintain a pressure in the region of at least 40 psi. In this regard, the method can further include removing the sacrificial bladder through at least one of the rim bed portion or the main structure portion.

In another example, the operation of forming the fully reinforced thermoplastic wheel component can include reinforcing an inner annular surface of the continuous circular component. The method can further include associating a series of spokes with the inner annular surface. In some examples, the reinforced inner annular surface and the series of spokes cooperate to exhibit a pull force of at least 500 lbs.

In another example, a method of manufacturing a fully reinforced thermoplastic wheel component is disclosed. The method includes plying a film to a reinforced thermoplastic material. The film has a higher melting temperature than that of the reinforced thermoplastic material. The method further includes defining a cavity with the reinforced thermoplastic material and plied film. The method further includes sealing the cavity using the film.

In another example, the reinforced thermoplastic material can include a consolidated panel or a stamp form shape of a rim bed portion or a main structure portion. The rim bed portion and the main structure portion can be arranged to form the fully reinforced thermoplastic wheel component. In this regard, the method can further include stamping the consolidated panel and the plied film to form the stamp form shape of the rim bed portion or the main structure portion.

In another example, the operation of sealing can include allowing a point of entry for pressurized fluid to close itself, using the film. In this regard, the method can further include pressurizing the cavity by at least partially inserting an inflation component through the point of entry. In some examples, the inflation component can be configured to maintain a pressure within the cavity of at least 40 psi. The operation of defining can include subjecting the reinforced thermoplastic material to a thermal bonding process to form an integral structure defining the wheel component.

In another example, the integral structure can be a continuous circular component. The reinforced thermoplastic material can include reinforcement fibers, including one or more of carbon fibers, glass fibers, Kevlar fibers, or basalt fibers.

In another example, a method of manufacturing a fully reinforced thermoplastic wheel component is disclosed. The method includes arranging a rim bed portion and a main structure portion to define a cavity of the fully reinforced thermoplastic wheel component. The method further includes pressurizing the cavity by at least partially inserting an inflation component into the cavity. The inflation component is at least partially formed from a material having a melting temperature greater than a melting temperature of materials used to form the rim bed portion and the main structure portion. The method further includes sealing the cavity using the inflation component.

In another example, the operation of sealing can include defining a point of entry into the cavity for insertion of a portion of the inflation component. The point of entry can be defined through an annular surface defined by the rim bed portion. The operation of sealing can include co-curing the portion of the inflation component to the main structure portion.

In another example, the method further includes severing a portion of the inflation component from a remainder of the inflation component, the portion of the inflation component remaining at least partially within the cavity. The operation of sealing can include using the portion of the inflation component to close the cavity to an external environment.

In another example, the method further includes thermally bonding the rim bed portion and the main structure portion to one another. The thermal bonding can allow external surfaces of the wheel component to be formed free of indicia associated with bladder exit from the cavity, using a portion of the inflation component as a consumable within the cavity.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
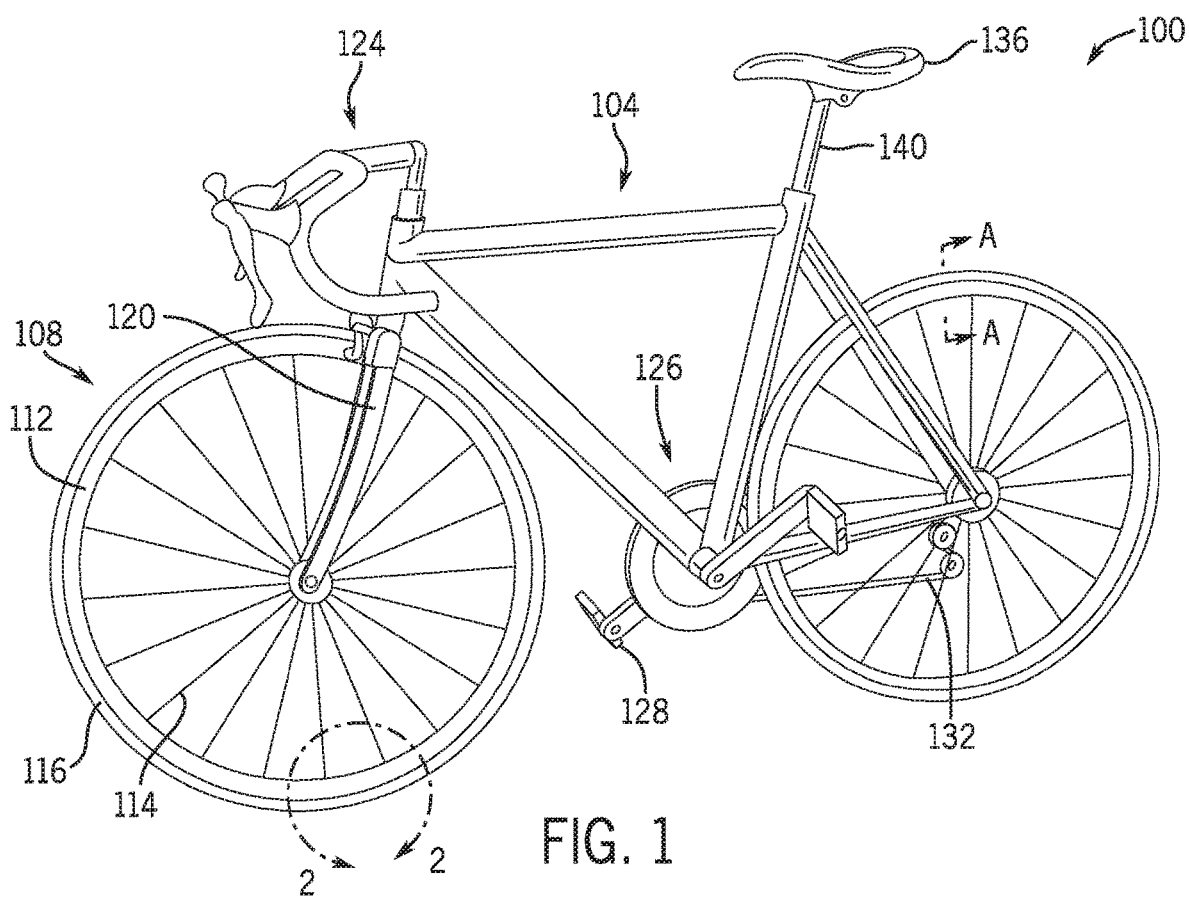
FIG. 1 depicts a sample bicycle.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various examples described herein and, accordingly, may not necessarily be presented or illustrated to scale, and are not intended to indicate any preference or requirement for an illustrated example to the exclusion of examples described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to reinforced thermoplastic components. More specifically, the present disclosure describes using reinforced thermoplastic materials to form complex shapes, including shapes having contoured or curved surfaces, and/or shapes having a substantially hollow interior. As used herein, "reinforced thermoplastic materials" can include a variety of materials having reinforcement "fibers" held within a thermoplastic material. As described in greater detail below, this can include, by way of non-limiting example, certain resin-type or other thermoplastic materials that are impregnated with reinforcement fibers, including carbon fibers, glass fibers, Kevlar fibers, and/or basalt fibers, among other options described and contemplated herein. Thermoplastic materials can exhibit a superior strength-to-weight ratio, and are generally adaptable to a variety of application-specific shapes. Shapes that have a curved or circular contour and/or a hollow interior can often benefit from the strength-to-weight ratio of reinforced thermoplastic materials. Such constructions, however, can be hindered by traditional manufacturing techniques.

The systems and techniques of the present disclosure can mitigate such hindrances and produce reinforced thermoplastic components having substantially smooth, seamless, and consistently curved surfaces. Further, the systems and techniques of the present disclosure can produce reinforced thermoplastic components having a substantially hollow interior. The substantially smooth, seamless, and consistently curved surfaces, enhanced by the substantially hollow interior can facilitate the manufacturing of a wheel component formed from reinforced thermoplastic materials. More specifically, the systems and techniques herein can be adapted to facilitate the manufacturing of a wheel component fully from the reinforced thermoplastic materials, substantially free from other filler or support-type materials.

The reinforced thermoplastic material can be used to form an integral structure. An integral structure can be defined as a one-piece structure. The integral structure or one-piece or continuous structure can define a continuous circular shape or a segment thereof. The integral structure can thus can adapted to from a bicycle rim, as described in greater detail below. The fully reinforced thermoplastic material can provide a reduced-weight ratio while exhibiting enhanced strength that can be tailored for high-performance applications. For example, the continuous circular structure formed fully from the reinforced thermoplastic material can be tuned to withstand a pull force of a spoke of an associated series of spokes of at least 300 lbs., of at least 400 lbs., of at least 500 lbs., or greater as may be appropriate for a given application. The continuous circular structure can also be substantially free of indicia or seams or other markings of manufacture, such as that from the removal of a bladder of other sacrificial material from the hollow interior. This can provide an aesthetically pleasing finish to the wheel component, in addition to supporting overall performance, for example, by reducing possible failure mechanisms along the wheel component, such as where a rim bed and channel wall would typically meet.

While many structural implementations of the wheel component are possible and described herein, in one example, the wheel component includes a rim bed portion that defines an outer annular surface of the wheel component. The outer annular surface is shaped in a manner by which to engage a bicycle tire, including being substantially circular or defining a segment of a curve that is adapted to grip an outer tire or wheel component. The wheel component can further include a main structure portion that defines a cavity with the rim bed portion. The main structure portion can be a structural portion of the wheel component that is used, for example, to engage a series of spokes of the wheel component of other features that support the wheel component in operation. In some cases, the rim bed portion and the main structure component can one or both define a collection of walls or other features that are engageable with one another to form the wheel component, as presented herein.

Broadly, each of the rim bed portion and the main structure are formed from a reinforced thermoplastic material. Where the rim bed portion and/or the main structure include a collection of walls or associated components, all such components are also formed from a reinforced thermoplastic material. In this regard, the wheel component can be formed as a fully reinforced thermoplastic wheel component. Thermoplastic materials can be impregnated or more generally combined with reinforcement fibers to define the reinforced thermoplastic materials, which can have a fiber reinforcement of at least 30%, of at least 40%, or of at least 70% by volume. In certain examples, the reinforcement fibers can be strategically arranged within the thermoplastic material. For example, the reinforcement fibers can be subjected to a spread treatment during manufacture, or other elongation and orientation technique that allows the reinforced thermoplastic material to define a spread tow, such as a spread carbon fiber tow when carbon is used as a reinforcement fiber. Other techniques and modifications to the reinforced thermoplastic materials can be used, including arranging the reinforcement fibers in a matrix, such as in a compacted arrangement. Further, coatings or other treatments can be applied to fibers prior to (or during) integration with the thermoplastic material to form the reinforced thermoplastic material. This can be a nano-coating that surrounds some or all of the fibers, such as surrounding some or all of individual fibers to define a barrier between the fibers and the surrounding thermoplastic material.

In one example, a reinforced thermoplastic material can be used to form a wall portion of the main structure of the wheel component. The wall portion can be formed from a reinforced thermoplastic material that is constructed from a plurality of plies of reinforced thermoplastic material, such as any of the thermoplastic materials described herein. The plies can be arranged to overlap one another and collectively form a radial pattern to define the wall portion. To illustrate, the radial pattern can include a first ply have a first edge and a second ply having a second edge. The first and second plies can overlap one another, such as overlapping the first and the second plies such that the second edge is arranged substantially transverse to the first edge. Further, the first and second plies can be arranged such that at least one of the first and second edges defines a bias angle relative to a center axis of a continuous circle defined by the wheel. Sample bias angles can be between substantially 22.5 and 75 degrees, such as being substantially between 40 and 60 degrees, such as being preferably about 45 degrees. The bias angle can be tuned in order to optimize wall strength, as described herein. The first and second plies can be overlapped with one another to define an arrangement or grouping of plies. The wall portion can include a plurality of arrangement of plies in order to define the radial crossply pattern. The wall portion can include multiple layers of crossply laminate, including a 6 layer crossply laminate, with 12, 22, or more overlapping course of tape, as one illustration.

The reinforced thermoplastic materials used to form the wheel component can be associated with one another to form an integral structure. As one example, a first reinforced thermoplastic material can be used to form a rim bed portion of the wheel component and a second reinforced thermoplastic material can be used to form the main structure portion of the wheel component. In certain examples, the first and/or second reinforced thermoplastic materials can be a sheet, tape, panel, or other largely undefined or even partially flexible form. The reinforced thermoplastic materials can be subjected to one or more machine processes in order to define the rim bed portion and/or the main structure portion and/or other pieces of the wheel component or complex-geometry components of the present disclosure. For example and as described in greater detail below, the reinforced thermoplastic materials can be subjected to stamping processes in order to define a stamp-formed shape of the rim bed portion, the main structure portion, and/or other portions of the wheel component or other shapes. The stamp form shape can generally define application-specific geometries of the rim bed portion or the main structure portion, including geometries adapted to use with a bicycle including the outer annular surface adapted to engage a bicycle tire and an inner annular surface configured to engage a series of spokes of the wheel component.

Thermal bonding can be used to join the rim bed portion and main structure portion to one another in order to form the wheel component as an integral structure. The integral structure can be a one-piece structure. In one example, the rim bed portion and the main structure portion can generally be arranged in a tooling or mold that roughly defines a target shape of the wheel component. The tooling can be subjected to heat, including subjecting the tooling to heat in excess of 450 degrees F.; however, in other cases, the temperature can be more or less than 450 degree F. based on the particular composition of the reinforced thermoplastic material. When exposed to such heat, the thermoplastic material softens and transitions toward a melted or partially melted state. The thermoplastic material of each of the rim bed portion and the main structure portion transitions toward this state within the tooling, where the portions are generally adjacent or contacting one another. For example, the rim bed portion and the main structure portion can be mechanically engaged with one another and/or pressed against a surface of one another in the tooling, such as in a tooling compartment. In this regard, upon transitioning toward and into the partially melted state, the reinforced thermoplastic material of the each of the rim bed portion and the main structure can generally join with one another. For example, the thermoplastic material of the rim bed portion and the thermoplastic material of the main structure portion can at least partially combine or intermix as each approaches or enters a partially melted or fully melted state. The reinforced thermoplastic materials can be subsequently cooled, as described herein, allowing each to return to a more solidified state as a single, integrally formed component from the rim bed portion and the main structure portion. For example, the reinforced thermoplastic material can be cooled to define an integral structure. This can allow different components or portions of the rim (e.g., the rim bed, wall portion, etc.) to collectively define a one-piece, or continuous, and/or seamless structure after formation.

The thermal bonding process can also be associated with defining a substantially hollow cavity within the wheel component. The wheel component can have a substantially hollow cavity to reduce weight and improve stability of the wheel. It is also possible to form a wheel as a substantially solid structure, such as may be the case for a wheel used in jogging strollers, carts, luggage, or other applications. Where the wheel component includes the substantially hollow cavity, the systems and techniques of the present disclosure include establishing and maintaining a shape of the cavity during the thermal bonding process. This allows the reinforced thermoplastic material to transition toward and into a partially melted or melted state without collapsing or deforming in a manner that would detract from the formation of an internal cavity. Maintaining the shape of the cavity can also facilitate the joining of the reinforced thermoplastic material, for example, by allowing the rim bed portion and the main structure portion to be pressed to together with a sufficient external force to facilitate the general intermixing or combination of the various reinforced thermoplastic materials without such external force distributing the shape of the cavity. Rather, with the shape of the cavity maintained, the external force of the tooling can also facilitate forming the cavity shape. For example, the rim bed portion and/or the main structure portion can be pressed or manipulated in a manner relative to or against a sacrificial bladder in order to use the partially melted or melted form of the reinforced thermoplastic material to establish the internal cavity shape of the wheel component, as one example.

In this regard, in some examples, the sacrificial bladder can be used to facilitate forming the internal cavity of the wheel component during thermal bonding. For example, a substantially solid material, including certain industrial foams and fillers or consolidated materials can be shaped to define a contour of the internal cavity. Additionally or alternatively, an inflatable bladder can be used, such as an assembly that can maintain a pressurized region between the main structure portion and the rim bed portion during the thermal bonding process. The rim bed portion and the main structure portion can be associated with the sacrificial bladder within the tooling assembly prior to the thermal bonding. The sacrificial bladder can be largely heat resistant and/or have a melting temperature above, or substantially above, that of the heat to which the tooling is subject during the thermal bonding process. In this regard, the sacrificial bladder can retain a solid shape, such as not being melted or partially melted, while the reinforced thermoplastic material of the rim bed portion and the main structure portion are melted or partially melted. The rim bed portion and the main structure portion can therefore be joined together, as described herein, without collapsing or deforming into an internal cavity defined by the respective portions. The rim bed portion and the main structure portion can also be joined together without also being inadvertently joined to the sacrificial bladder.

Subsequent to cooling, the sacrificial bladder can be removed from the wheel component, defining the substantially hollow cavity within the wheel component. Where the wheel component is a segment of a wheel, the sacrificial bladder can be removed from a side of the wheel component. Additionally or alternatively, the sacrificial bladder can be removed from a fully formed continuous and enclosed circular component. For example, it can be desirable for the sacrificial bladder to remain within the wheel segment throughout the formation of multiple wheel component segments to form the wheel component, which can have a continuous, integral structure that defines a circular shape. Further, the rim bed portion and the main structure portion can be joined to one another as a continuous and enclosed circular component, largely leaving the sacrificial bladder in the wheel component. In this regard, the sacrificial bladder can be removed via a port or hole that can generally be machined through one or both of the rim bed portion or the main structure portion. Subsequent operations can be used to cover or seal the port or hole and enclose the continuous circular cavity, as may be appropriate for a given application.

The systems and techniques described can also be adapted to maintain and/or establish the internal cavity substantially without the use of a sacrificial bladder. Broadly, the systems and techniques described herein can be used to pressurize a region of a tooling compartment that is holding the rim bed portion and the main structure during a thermal bonding process. For example, a fluid, such as compressed air, can be supplied to a region of the tooling compartment that is substantially between the rim bed portion and the main structure portion. The fluid can act to maintain a cavity between the rim bed portion and the main structure portion as the reinforced thermoplastic materials are bonded to one another. For example, an inflation component can extend partially into the cavity and supply the compressed air, which can be supplied with a pressure of at least 40 psi, of at least 100 psi, of at least 200 psi, or greater based on the material properties of the given application. The compressed air can pressurize the tooling compartment and at least partially hold the rim bed portion and the main structure portion at a desired arrangement within the tooling compartment. As the rim bed portion and the main structure portion begin to transition toward and into a partially melted or melted state, the pressure within the cavity can impede the thermoplastic material from deforming in a manner that would hinder or detract from a contour of the internal cavity. For example, the partially melted or melted reinforced thermoplastic material would be encouraged away from pressurized zone, and toward the tooling compartment boundaries and\or the respective rim bed portion and main structure portion for thermal bonding therebetween.

As described in greater detail herein, upon cooling, the inflation component can be removed from the internal cavity and the internal cavity can be substantially enclosed from an external environment. In some cases, this can involve using a plug or other thermoplastic material, which can be reinforced, to thermally bond with the rim bed portion and/or the main structure portion upon exit of the inflation component from the wheel component. Additionally or alternatively, the rim bed portion and/or the main structure portion can be substantially self-sealing, allowing the point of entry of the inflation component to generally close in on itself as the inflation component is removed. In certain examples, this can be facilitated by use of a high-melt temperature film that is plied to one or both of the reinforced thermoplastic material that forms the rim bed portion and/or the main structure portion. For example, the high-melt temperature film can be plied to a consolidated panel or the stamp form shape of the rim bed portion or the main structure portion, in certain examples. The film can have a melting temperature that is higher than that of the associated rim bed portion or the main structure portion. In this regard, upon removal of the inflation component, the associated rim bed portion or the main structure portion cools, and solidifies according to a different thermal profile than that of the film. The film can exhibit a more solid state than the associated rim bed portion or the main structure portion for a given temperature. The film can act as an internal barrier that guides the reinforced thermoplastic material along a path that closes and seals the point of entry for the inflation component. In certain other examples, as described herein, the inflation component itself can be used to seal the point of entry for the pressurized fluid delivery into the cavity. For example, at least a portion of the inflation component can be formed from a material having a higher melting temperature than that of the associated rim bed portion or the main structure portion. The portion can be a tip of the inflation component that is introduced in the cavity to supply the pressurize air. The tip can be a consumable feature of the inflation component. For example, subsequent to thermal boding of the rim bed portion and the main structure portion, the tip can be severed or otherwise removed from a remainder of the inflation component. The tip or consumable portion of the inflation component can in turn be used to seal the point of entry for the pressurized air. For example, the tip exhibits a higher melting temperature than the associated rim bed portion or the main structure portion, and thus cools and solidifies according to a different thermal profile. This different thermal profile acts to guide the associated rim bed portion or the main structure portion to close and seal the point of entry for the pressurized air.

With these and other techniques described herein, the resulting wheel component can include a substantially smooth outer contour that can be free of indicia associated with bladder exit from the internal cavity of the wheel component. For example, the finished wheel component can have an external surface that can be free of holes that are larger than 20 mm in cross-dimension, and/or free of holes that are larger 10 mm in cross-dimension. Such holes could be indications of bladder removal, whereas the absence of such holes can indicate a streamlined, bladderless manufacture of the hollow cavity, as described herein.

It will be appreciated that while the foregoing discussion includes reference to wheel components and other features related to bicycles, this is presented herein as an example implementation of the systems and techniques for forming intricate and optionally hollow structures fully from a reinforced thermoplastic material or materials. The systems and techniques provide substantial improvements to existing bicycle-related technology, for example, by enhancing the strength-to-weight ratio, by increasing the pull force capabilities of rim, adapting the rim to differentials in compressive and tensile stresses, and other improvements not realized by existing designs. As contemplated herein, the fully reinforced thermoplastic components can be adapted to a wide variety of structures and industries where high-performance is desired. In some cases, this can include adapting the reinforced thermoplastic material to other wheel-related applications, including wheel applications for strollers, carts, luggage, and other uses. For example, the reinforced thermoplastic material can be used to form a wheel having an integrally formed tri-spoke shape, which can optionally have an internal cavity. Other uses are contemplated, including using the reinforced thermoplastic material for applications with aerodynamic-specific shape requirements, such as a blade for a wind turbine or a hydrodynamic foil, as examples. Such applications can benefit from a sufficiently high strength-to-weight ratio, and often demand precise external contours, which the techniques of the present disclosure can provide. In other examples, other applications are contemplated herein with the scope of the present disclosure.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

As described herein, the reinforced thermoplastic structures can be adapted for use with a bicycle or other apparatus that uses wheels. In this regard, FIG. 1 depicts a bicycle 100. The bicycle 100 includes wheel assemblies 108 having a rim 112. The rim 112 can be formed from a reinforced thermoplastic material, such as the reinforced thermoplastic materials generally discussed above and described in greater detail below. This rim 112 can be adapted to withstand dynamic conditions during use of the bicycle 100 by a rider, including compressive and tensile stresses at particular localized regions of the rim 112.

As shown in FIG. 1, the composite rim 112 is engaged with a tire 116. The tire 116 can be any appropriate component configured to engage and grip a riding surface to facilitate forward motion of the bicycle 100, including slim profile tires. As described in greater detail below, the tires 116 can induce various maximum compressive stresses on the rim 112. The rim 112 is associated with a series of spokes 114 that structurally connect the rim 112 to other components of the bicycle 100. The series of spokes 114 can induce various maximum stresses on the rim 112.

In the non-limiting example of FIG. 1, the wheel assembly 108 and rim 112 are shown with the bicycle 100. However, it will be appreciated that the rim 112 can be used with a variety of bicycles and/or any suitable apparatuses that implement wheels for movement. This can include bicycles with an electric motor, strollers, carts, luggage, and so on. For purposes of illustration, the bicycle 100 is further shown as having a frame 104, a fork 120, a handle assembly 124, a drive assembly 126, pedals 128, a chain 132, a saddle 136, and a seat post 140. It should be noted that the bicycle 100 can include other components (or variations of the foregoing components), such as various derailleurs, heat sets, cassettes, brakes, frame tubes of various constructions, and so on. As such, the discussion of any bicycle, such as bicycle 100, is meant as illustrative only.

Figure 2:
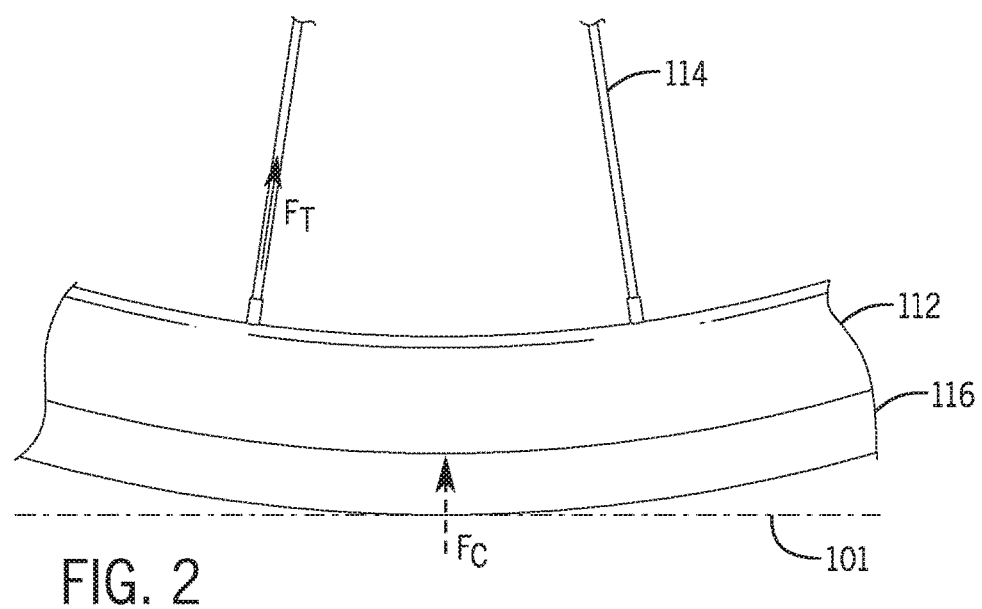
FIG. 2 depicts detail 1-1 of a wheel assembly of FIG. 1.

With reference to FIG. 2, detail 1-1 of the wheel assembly 108 is shown. FIG. 2 shows the rim 112 connected with the series of spokes 114 and engaged with the tire 116. The tire 116 is shown contacting a riding surface 101. The rim 112 is subjected to various dynamic conditions during use of the bicycle 100. Not only do the location of forces received by the rim 112 change as the wheel assembly 108 rotates, the profile of the forces can be different as well.

In FIG. 2, the rim 112 is shown being subjected to a compressive force $F_C$ and a tensile force $F_T$. The compressive force $F_C$ can result, for example, from the engagement of the tire 116 with the riding surface 101. The tensile force $F_T$ can result from the structural engagement defined by the series of spokes 114 with other components of the bicycle 100. In other examples, the rim 112 is subjected to other forces, which can change based on the dynamic operating conditions of the bicycle 100.

The rim 112 is formed fully from a reinforced thermoplastic material, such as from any of the reinforced thermoplastic materials described herein. The reinforced thermoplastic material can be specifically adapted to increase a strength-to-weight ratio of the rim 112. This can enhance a performance of the rim by not only reducing the overall weight of the wheel assembly 108, but also by selectively providing strength to the rim 112 in target regions. For example, the series of spokes 114 exert various forces on the rim 112 during use of the bicycle 100. In one example, the rim 112 is adapted, via the reinforced thermoplastic materials, to withstand a pull force from one or more of the series of spokes 114 for high-performance operations. The pull force can be indicative of an amount of force exerted by the spoke on a portion of the rim bed, such as a portion where a spoke and the rim 112 are joined. For example, the rim 112 can be adapted to withstand a pull force of at least 300 lbs. from a spoke of the series of spokes 114, of at least 400 lbs. from a spoke of the series of spokes 114, of at least 500 lbs. from a spoke of the series of spokes 114, or greater.

Figure 3A:
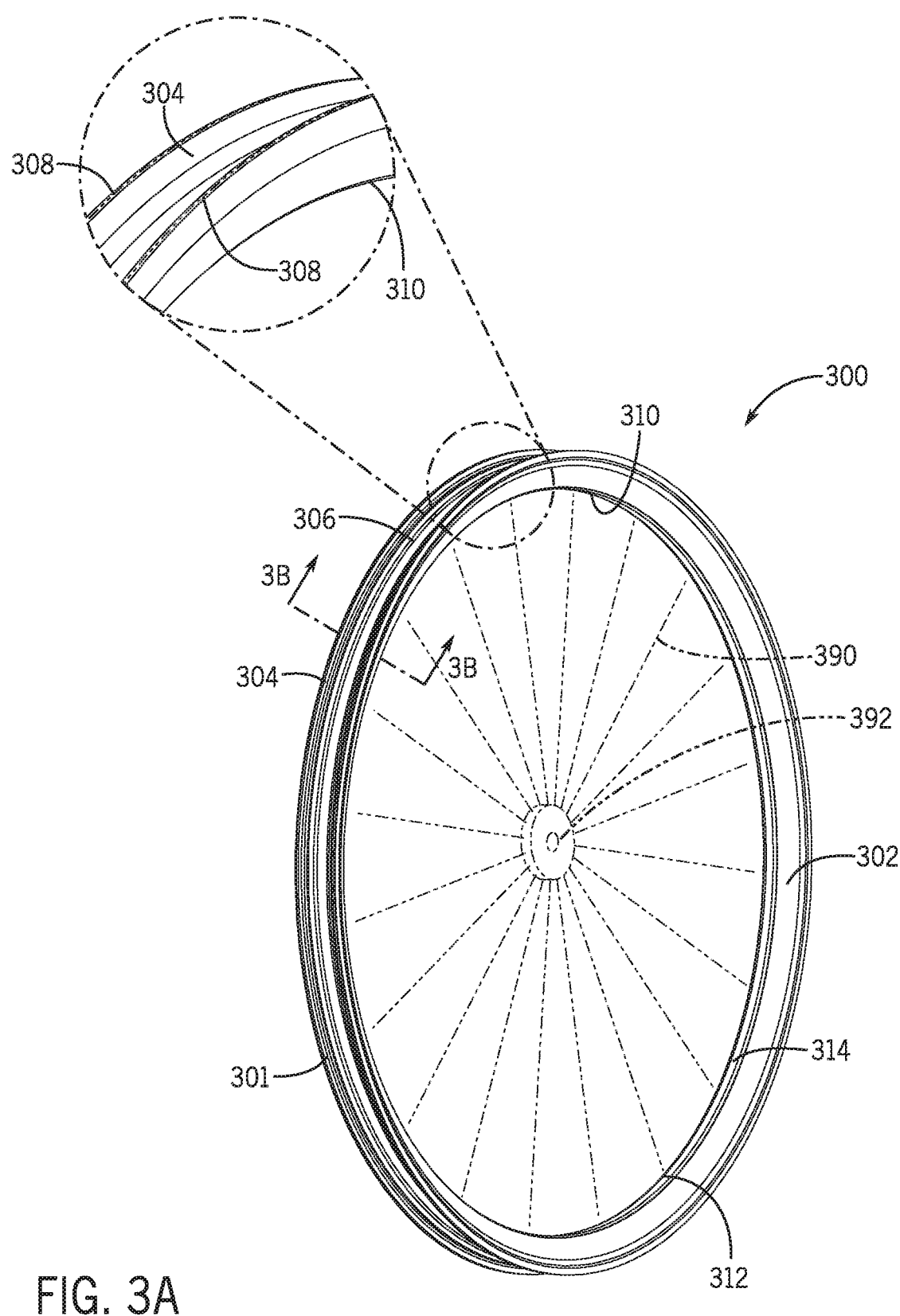
FIG. 3A depicts a reinforced thermoplastic rim formed as an integral circular structure.

FIG. 3A depicts a rim 300 formed fully from a reinforced thermoplastic material. The rim 300 can be an integral structure having a continuous circular contour 301. The rim 300 can also be substantially hollow throughout the continuous circular cavity. The rim 300 can also have a substantially smooth, seamless exterior surface that is substantially free of any indicia of bladder exit from the internal cavity or other evidence of intermediate manufacturing processes. Such features cooperate to define an aesthetically pleasing finish the rim 300. Additionally, such features can reduce potential failure mechanisms by providing a seamless finish, strengthened by the fibers of the reinforced thermoplastic material.

The rim 300 can include a rim bed portion 304 and a main structure portion 310. The rim bed portion 304 and the main structure portion 310 can define an integral structure. For example, the rim bed portion 304 and the main structure portion 310 can collectively define a one-piece, or continuous, and/or seamless structure after formation. The rim bed portion 304 is generally configured to engage a bicycle tire. For example, the rim bed portion 304 can define an outer annular surface 306 that is adapted to receive and retain a bicycle tire. The main structure portion 310 is generally configured to define a channel of the rim 300 and is adapted to engage a series of spokes. For example, the main structure portion 310 can define an inner annular surface 312 that is adapted to engage a series of spokes 390. The series of spokes 390 can be connected to a hub 392 or other feature. In this regard, the series of spokes 390 can exhibit a pull force on the main structure portion 310. The main structure portion 310 can define a reinforced region 314, in certain examples, where the series of spokes 390 and the main structure 310 engage one another. The reinforcement region 314 can be formed from additional reinforced thermoplastic materials, selectively providing increased strength and performance.

As shown in the detail view of FIG. 3A, the rim bed portion 304 and the main structure portion 310, while cooperating to define the integrally formed rim 300, can be provided as two separate components during a manufacturing process. The rim bed portion 304 and the main structure portion 310 can be thermally bonded to one another generally along a thermally bonded interface 308. The thermally bonded interface 308 is shown in the detail of FIG. 3A for purposes of illustration. It will be appreciated, however, that while the rim bed portion 304 and the main structure portion 310 are provided as individual components during the manufacturing process, the thermally bonding interface 308 can be substantially invisible to the naked eye in the final product, and as such, define a seamless interface or transition between the rim bed portion 304 and the main structure portion 310. In this regard, the final rim 300 can have a seamless surface 302.

Figure 3B:
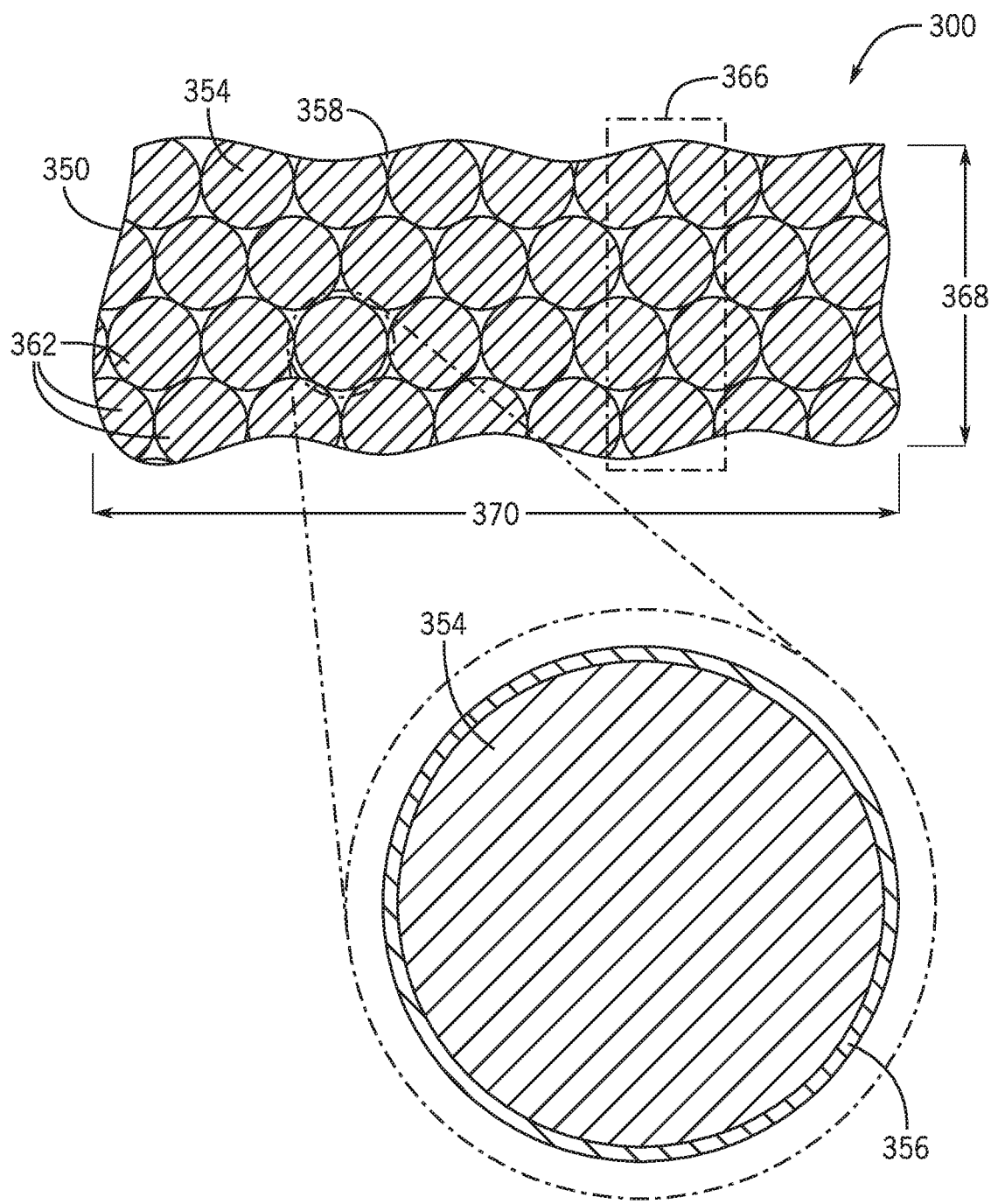
FIG. 3B depicts a cross-sectional view of a reinforced thermoplastic material of FIG. 3A used to form the fully thermoplastic rim, taken along line 3B-3B of FIG. 3A.

FIG. 3B depicts a cross-sectional view of the rim 300 of FIG. 3A, taken along line 3B-3B. More particularly, FIG. 3B shows a cross-sectional view of the reinforced thermoplastic material used to form the rim 300. The rim 300 can be fully formed from the reinforced thermoplastic material. In this regard, the rim bed portion 304, the main structure portion 310, and/or any or all other portions of the rim 300 can be formed from the reinforced thermoplastic materials. It will therefore be appreciated that the following discussion of reinforced thermoplastic materials can be applicable to any or all components of the rim 300, or more generally the wheel components and complex geometric structures described herein.

FIG. 3B shows the cross-section of the rim 300 as being formed from a reinforced thermoplastic material 350. The reinforced thermoplastic material 350 broadly includes reinforcement fibers 354 that are disposed in a thermoplastic material 358. The thermoplastic material 358 is generally defined by a material that is softened through the application of heat and is conversely hardened when cooled. The thermoplastic material 358 can be heated and cooled multiple, sequential times without substantial degradation of material properties. Certain resins, polymers, synthetics, nylons, and/or other materials can be used. The reinforcement fibers 354 provide strength to the thermoplastic material 358. For example, the fibers 354 can maintain the shape and physical state during the application of heat to the thermoplastic material 358. Sample fibers include carbon fibers, glass fibers, Kevlar fibers, basalt fibers, and/or other appropriate materials that can be adapted to provide strength to the thermoplastic material 358. In some cases, as shown in the detail of FIG. 3B, the fibers 354, individually or collectively, can be encased or partially encased in a coating 356. The coating 356 can be a nano-coating that defines a barrier between the fibers 354 and the thermoplastic material 358.

The reinforced thermoplastic material 350 can be manufactured in a variety of manners to increase the strength of the material via the arrangement of the fibers 354. For example, in some cases, the fibers 354 can be subjected to a spread technique that establishes the fibers 354 in the thermoplastic material 358 as a spread tow. In certain cases, this can allow a given cross-section of the reinforced thermoplastic material 350 to have a width 370 that is greater than a height 368. Additionally or alternatively, the spread technique or other manufacturing technique can arrange the fibers 354 in an elongated fashion. For example, the fiber 354 can be generally arranged substantially parallel to one another and elongated. Additionally or alternatively, the fibers 354 can define a compact arrangement 362 in the thermoplastic material 358. The compact arrangement 362 can help organize the fibers 354 in a manner to increase a density of the fibers 354 in the reinforced thermoplastic material 350, by volume. For example, for a representative volume 366 of the reinforced thermoplastic material 350, the fibers 354 can define at least 40% of a volume of the material 350, at least 70% of a volume of the material 350, or other appropriate value based on the target strength and application.

Figure 4:
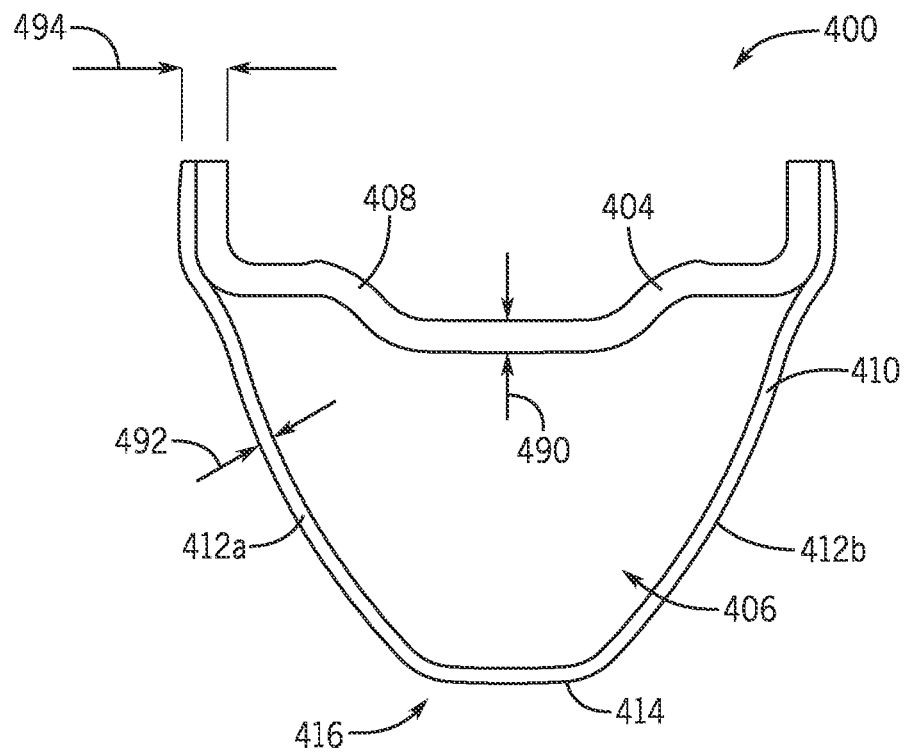
FIG. 4 depicts an example of a wheel component formed from a reinforced thermoplastic material.
Figure 5A:
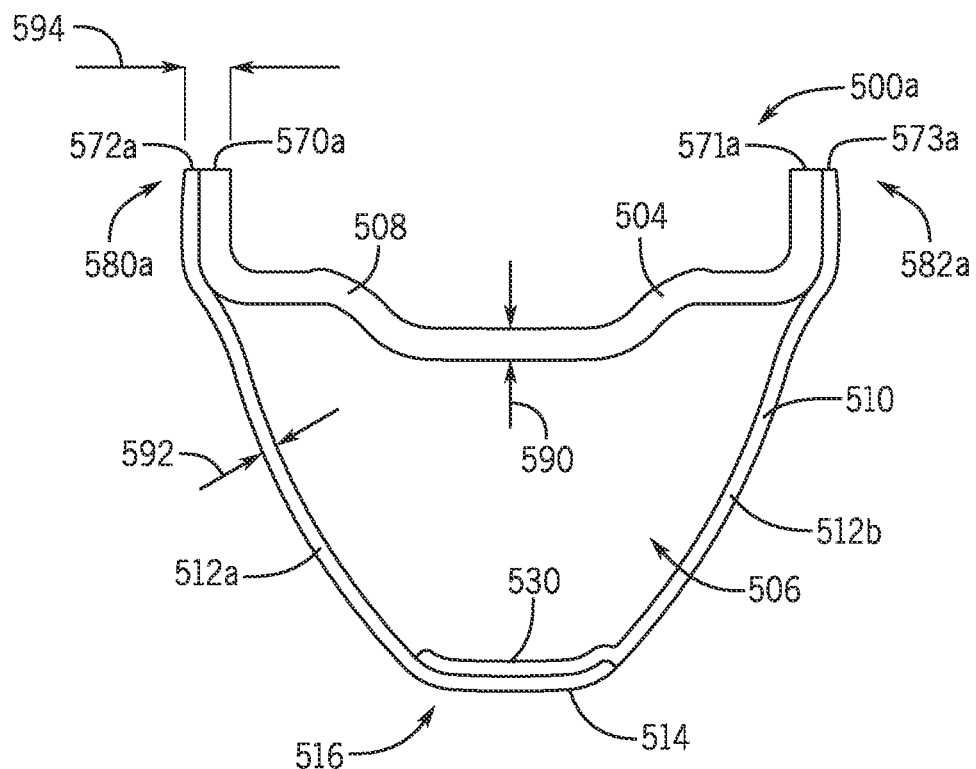
FIG. 5A depicts another example of a wheel component formed from a reinforced thermoplastic material.
Figure 5B:
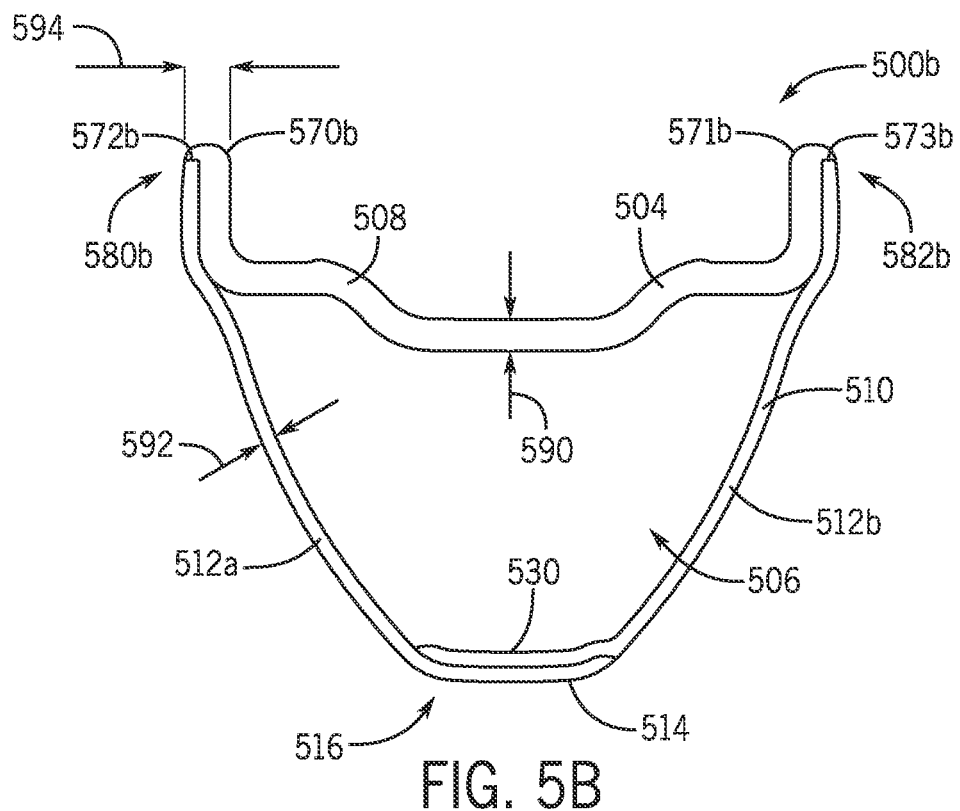
FIG. 5B depicts another example of a wheel component formed from a reinforced thermoplastic material.
Figure 5C:
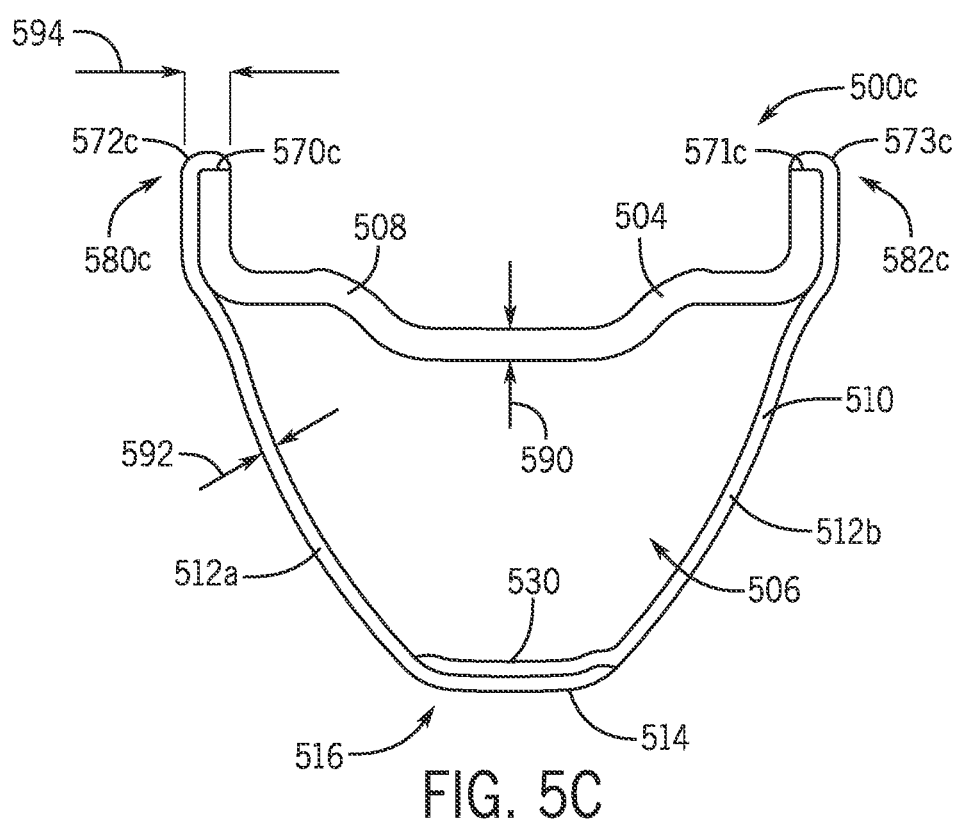
FIG. 5C depicts another example of a wheel component formed from a reinforced thermoplastic material.
Figure 6:
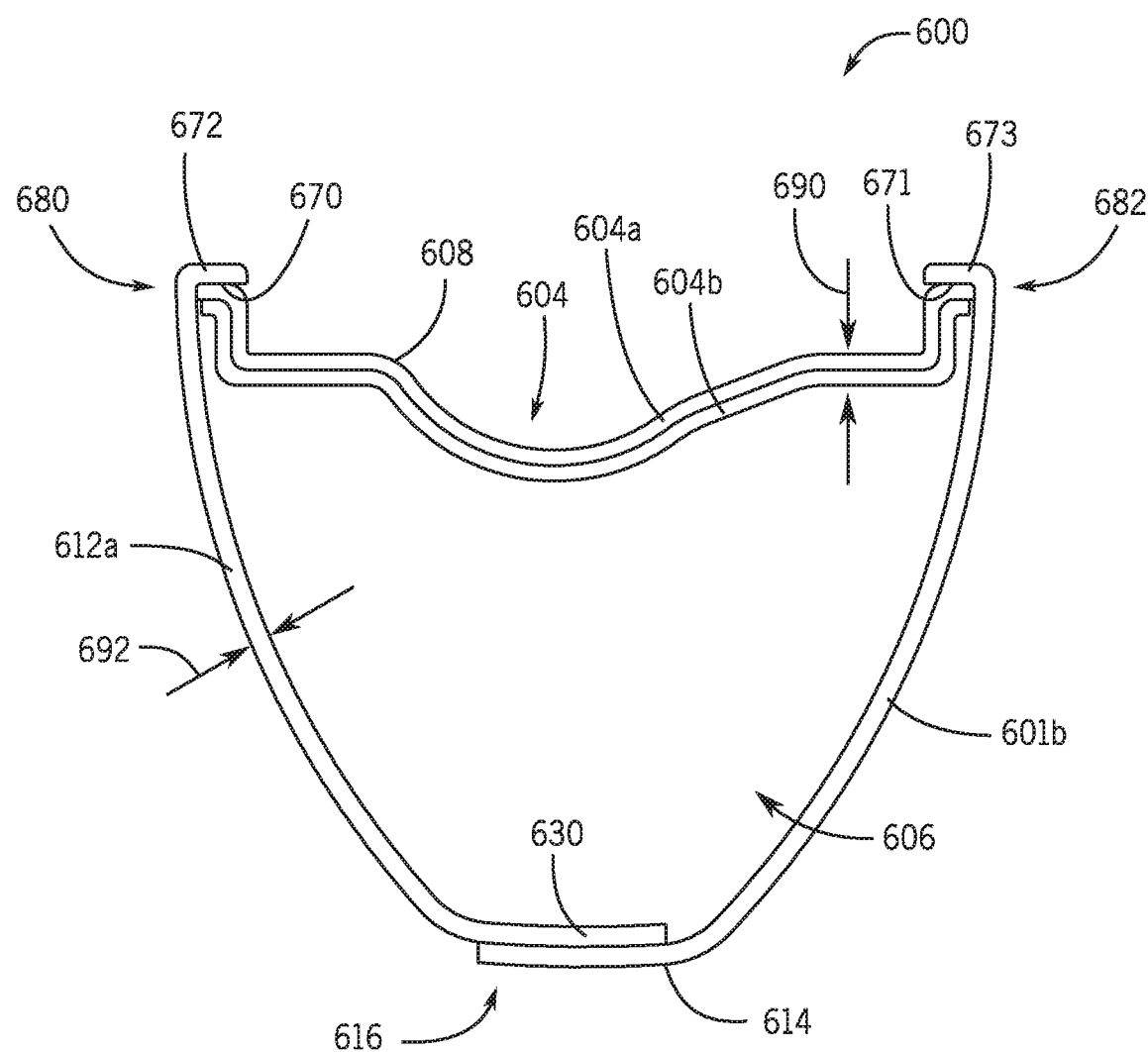
FIG. 6 depicts another example of a wheel component formed from a reinforced thermoplastic material.

FIGS. 4-6 depict sample constructions of wheel components of the present application. A wheel component can be a segment of a wheel or a continuous circular component. FIGS. 4-6 depict various cross-sectional views of the wheel components. The wheel components of FIG. 4-6 can be used to define any of the rims and wheel assemblies described herein, including the rim 112 of FIGS. 1 and 2, and the rim 300 of FIGS. 3A and 3B. Further, it will be appreciated that FIGS. 4-6 show the wheel component in a state prior to thermal bonding for purposes of illustrating the structural relationship of reinforced thermoplastic materials used to form the wheel component. Subsequent to a thermal bonding process, such as subsequent to any of thermal bonding processes described herein, the individual reinforced thermoplastic material can join to one another in a manner that forms the wheel component as single, integrally-formed structure.

With reference to FIG. 4, a cross-sectional view of a wheel component 400 is shown. The wheel component 400 can be formed fully from a reinforced thermoplastic material, such as any of the reinforced thermoplastic materials described herein, redundant explanation of which is omitted here for clarity.

The wheel component 400 is shown in FIG. 4 as including a rim bed portion 404 and a main structure portion 410. The rim bed portion 404 and the main structure portion 410 cooperate to define a cavity 406. The rim bed portion 404 can define an outer annular surface 408 that is adapted to engage a bicycle tire. The main structure portion 410 can define an inner annular surface 414 that is adapted to engage a series of spokes. The main structure portion 410 can optionally define a reinforcement region 414 along some or all of the inner annular surface 414. The reinforcement region 416 can be an increased strength region of the main structure portion to facilitate increasing the strength to the wheel component 400, such as providing a sufficiently high pull force, as described herein, for high-performance use.

The main structure portion 410 can include a first wall portion 412a and a second wall portion 412b. In the example of FIG. 4, the first wall portion 412a and the second wall portion 412b are provided as a generally single form of reinforced thermoplastic material. The first and second wall portions 412a, 412b can have a thickness 492. In some cases, the thickness 492 can be less than a thickness 490 of the rim bed portion 404; however, this is not required. The main structure portion 410 and the rim bed portion 404 can be joined to one another at an edge joint. In the arrangement of FIG. 4, the main structure portion 410 and the rim bed portion 404 can collectively define a thickness 494 at the edge. This increased thickness can provide stability to a bicycle tire engaged with the rim bed portion 404.

With reference to FIG. 5A, a cross-sectional view of a wheel component 500a is shown. The wheel component 500a can be formed fully from a reinforced thermoplastic material, such as any of the reinforced thermoplastic materials described herein, redundant explanation of which is omitted here for clarity. The wheel component 500a can be substantially analogous to the wheel component 400 of FIG. 4 and include: a rim bed portion 504, a main structure portion 510, a cavity 506, an outer annular surface 508, an inner annular surface 514, a first wall portion 512a, a second wall portion 512b, a reinforced region 516, a thickness 592, a thickness 590, and a thickness 594, redundant explanation of which is omitted here for clarity.

FIG. 5A further shows the first wall portion 512a and the second wall portion 512b as being defined by different pieces of reinforced thermoplastic material. The first wall portion 512a and the second wall portion 512b can define an overlap 530 at the reinforcement region 516. The overlap 530 of the first wall portion 512a and the second wall portion 512b can enhance the strength of the wheel component 500a at the inner annular surface 514.

Also shown in FIG. 5A, the first wall portion 512a and the rim bed portion 504 can be joined to one another along a first ridge region 580a. For example, the first wall portion 512a can have an end 572a and the rim bed portion 504 can have an end 570a. The ends 570a, 572a can be joined to one another using the techniques described herein to form the first ridge region 580a. Further, the second wall portion 512b and the rim bed portion 504 can be joined to one another along a second ridge region 582a. For example, the second wall portion 512b can have an end 573a and the rim bed portion 504 can have an end 571a. The ends 571a, 573a can be joined to one another using the techniques described herein to form the second ridge region 582a. The first and second ridge regions can cooperate to receive a bicycle tire therebetween. In the embodiment of FIG. 5A, the ends 570a, 572a are arranged substantially parallel to one another, and with a terminal point of each of respective ends 570a, 572a substantially unobstructed by the respective one of the first wall portion 512a or the rim bed portion 504. Further, the ends 571a, 573a are arranged substantially parallel to one another, and with a terminal point of each of the respective ends 571a, 573a substantially unobstructed by the respective one of the second wall portion 512b or the rim bed portion 504.

In some cases, the ends 570a, 571a of the rim bed portion 504 can wrap around the respective ends of the first and second wall portions. For example and with reference to FIG. 5B, a wheel component 500b is shown and an end 570b of the rim bed portion 504 wraps at least partially around an end 572b of the first wall portion 512a. As further shown in FIG. 5B, an end 571b of the rim bed portion 504 warps at least partially around an end 573b of the second wall portion 512b. Accordingly, the at least partial wrapping can help modify a performance characteristic of first and second ridge regions 580b, 582b, such as enhancing the strength of these regions or otherwise tailoring the regions for use in particular applications.

In some cases, ends 572a, 573a can wrap around the respective ends of the rim bed portion 504. For example and with reference to FIG. 5C, a wheel component 500c is shown and an end 572c of the first wall portion 512a wraps at least partially around an end 570c of the rim bed portion 504. As further shown in FIG. 5C, an end 573c of the second wall portion 512b wraps at least partially around an end 571c of the rim bed portion 504. Accordingly, the at least partial wrapping can help modify a performance characteristic of first and second ridge regions 580c, 582c, such as enhancing the strength of these regions or otherwise tailoring the regions for use in particular applications.

With reference to FIG. 6, a cross-sectional view of a wheel component 600 is shown. The wheel component 600 can be formed fully from a reinforced thermoplastic material, such as any of the reinforced thermoplastic materials described herein, redundant explanation of which is omitted here for clarity. The wheel component 600 can be substantially analogous to the wheel component 400 of FIG. 4 and include: a rim bed portion 604, a main structure portion 610, a cavity 606, an outer annular surface 608, an inner annular surface 614, a first wall portion 612a, a second wall portion 612b, a reinforced region 616, an overlap 630, a first ridge region 680, an end 670, an end 672, a second ridge region 682, an end 671, an end 673, a thickness 692, a thickness 690, and a thickness 694, redundant explanation of which is omitted here for clarity.

Notwithstanding the foregoing similarities, the rim bed portion 604 is shown in FIG. 6 as including a first rim bed portion 604a and a second rim bed portion 604b. The first and second rim bed portions 604a, 604b can be layered or composite components or layers that are formed with one another in order to define the rim bed portion 604. The dual layer configuration of FIG. 6 can help reinforce the outer annular surface 608. The thickness 690 can be defined as including a thickness of the first rim bed portion 604a and the second rim bed portion 604b FIGS. 7A-7E depict various operations of manufacturing a formed shape of the reinforced thermoplastic material. The reinforced thermoplastic material can be initially manufactured as a sheet, a roll, a tape, panel, or the like. According to the techniques described herein, the reinforced thermoplastic material can be manipulated into a shape that is subsequently used to form the wheel component or other complex-geometry shape. For example, the reinforced thermoplastic material can be stamped or pressed into a shape in order to define a rim bed portion, a main structure portion, one or more wall portions, one or more reinforcement portions, and so on. The stamp-formed shape of these components can then be mechanically engaged with one another and subjected to a thermal bonding process to form the continuous integrally-formed circular structure of the wheel component.

Figure 7A:
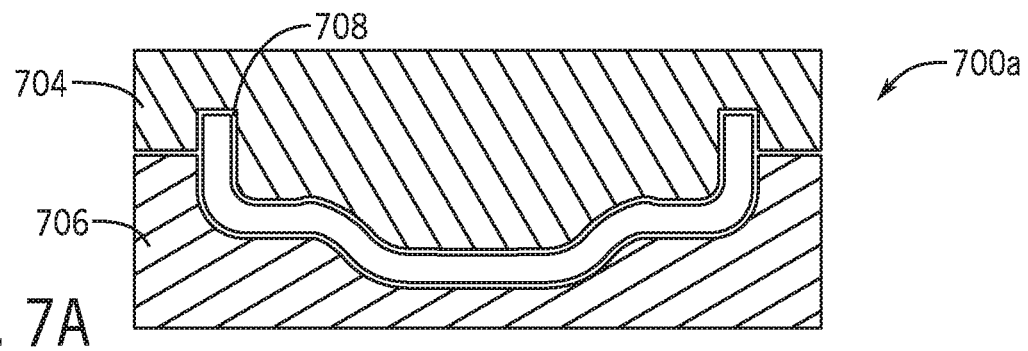
FIG. 7A depicts an operation of forming a rim bed portion of a wheel component.

With reference to FIG. 7A, an operation 700a is shown. At the operation 700a, a stamp form shape of a sample rim bed portion can be formed. For example, a reinforced thermoplastic material 708 can be provided substantially between a first stamp half 704 and a second stamp half 706. The reinforced thermoplastic material 708 can be substantially analogous to any of the reinforced thermoplastic materials described herein, redundant explanation of which is omitted here for clarity. The first and second stamp halves 704, 706 can be advanced toward the reinforced thermoplastic material 708 in order to press the reinforced thermoplastic material 708 into the shape of a rim bed portion, such as that shown in FIG. 7A. To facilitate the foregoing, the reinforced thermoplastic material 708 can be heated to encourage deformation into the stamp form shape defined by the first and second stamp halves 704, 706.

Figure 7B:
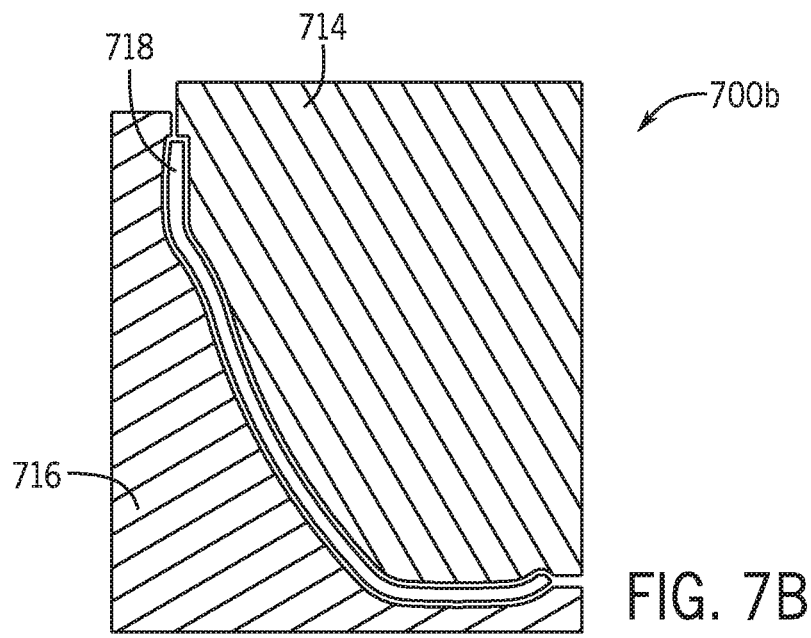
FIG. 7B depicts an operation of forming a main structure portion of a wheel component.

With reference to FIG. 7B, an operation 700b is shown. At the operation 700b, a stamp form shape of a sample wall portion can be formed. For example, a reinforced thermoplastic material 718 can be provided substantially between a first stamp half 714 and a second stamp half 716. The reinforced thermoplastic material 718 can be substantially analogous to any of the reinforced thermoplastic materials described herein, redundant explanation of which is omitted here for clarity. The first and second stamp halves 714, 716 can be advanced toward the reinforced thermoplastic material 718 in order to press the reinforced thermoplastic material 718 into the shape of a wall portion, such as that shown in FIG. 7B. To facilitate the foregoing, the reinforced thermoplastic material 718 can be heated to encourage deformation into the stamp form shape defined by the first and second stamp halves 714, 716.

Figure 7C:
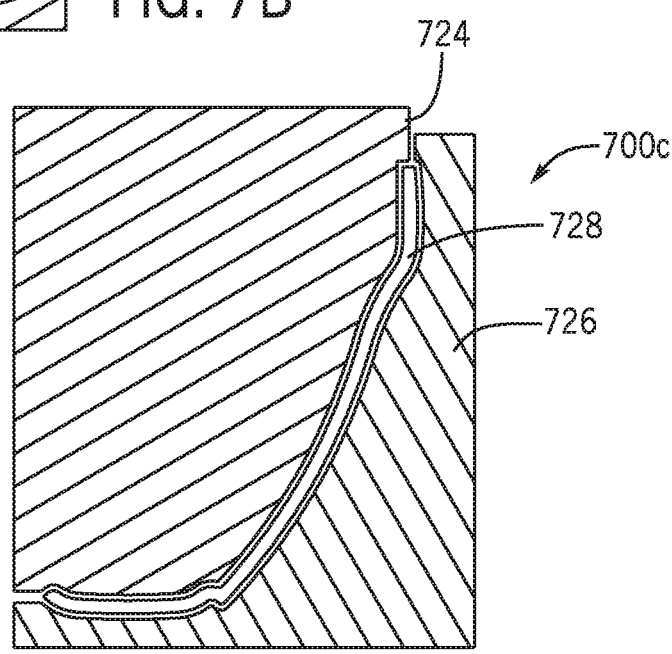
FIG. 7C depicts another operation of forming a main structure portion of a wheel component.

With reference to FIG. 7C, an operation 700c is shown. At the operation 700c, a stamp form shape of another sample wall portion can be formed. For example, a reinforced thermoplastic material 728 can be provided substantially between a first stamp half 724 and a second stamp half 726. The reinforced thermoplastic material 728 can be substantially analogous to any of the reinforced thermoplastic materials described herein, redundant explanation of which is omitted here for clarity. The first and second stamp halves 724, 726 can be advanced toward the reinforced thermoplastic material 728 in order to press the reinforced thermoplastic material 728 into the shape of a wall portion, such as that shown in FIG. 7C, which can be a wall portion configured to corresponding engagement with the wall portion of FIG. 7B. To facilitate the foregoing, the reinforced thermoplastic material 728 can be heated to encourage deformation into the stamp form shape defined by the first and second stamp halves 724, 726.

In some cases, a film can be plied to the reinforced thermoplastic material to facilitate thermal bonding. For example, a film having a higher-melt temperature than the reinforced thermoplastic material can be plied into a stamp-form shape of one or more of the portions of the wheel component and/or a consolidated panel. The different thermal characteristics of the film can influence the behavior of the reinforced thermoplastic material as it begins to cool. For example and as described herein, the reinforced thermoplastic material can be influenced to seal or close a hole formed through the material, such as a hole used to provide pressurized air to an internal cavity.

Figure 7D:
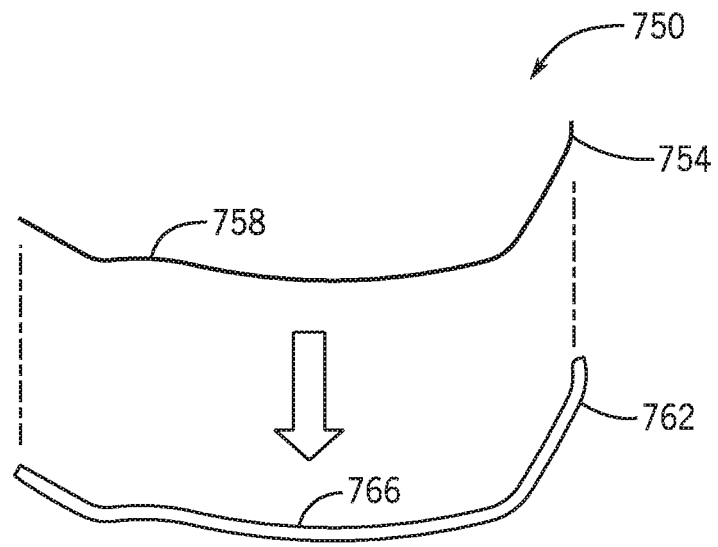
FIG. 7D depicts an operation of plying a higher melt temperature film to a stamp-formed shape of a wheel component.

For purposes of illustration, FIG. 7D shows an arrangement 750 having a film 754 being applied to a stamp form shape 762. The stamp form shape 762 can be or define a portion of the rim bed portions or main structure portions described herein. The stamp form shape 762 can define a contour 766. The film 764 can be arranged to match the contour 766, and thus exhibit a contour 758 upon being plied with the stamp form shape 762.

Figure 7E:
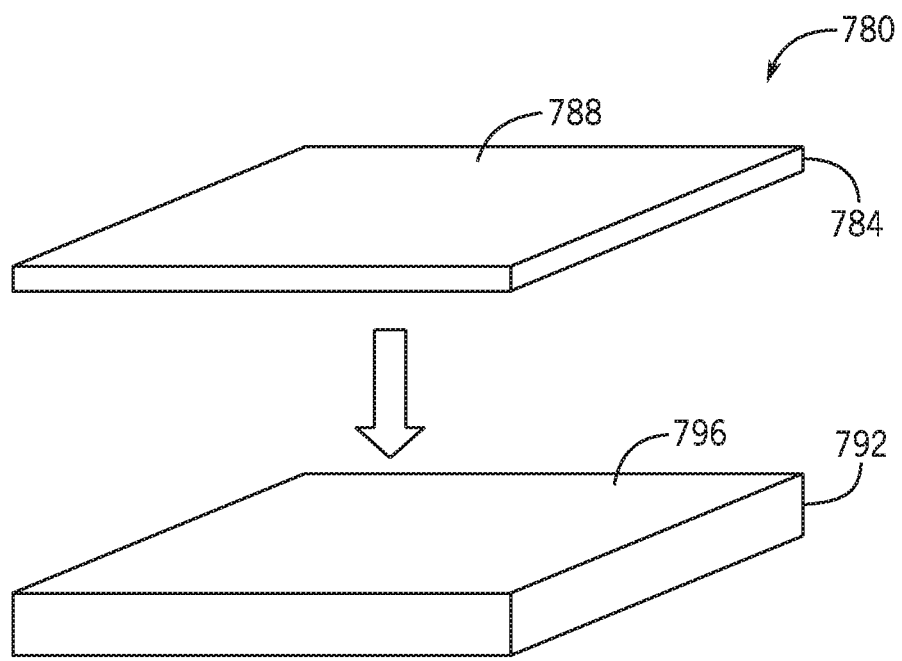
FIG. 7E depicts an operation of plying a higher melt temperature film to a consolidated panel prior to a stamping operation.

FIG. 7E shows an arrangement 780 having a film 784 and a consolidated panel 792. The consolidated panel 792 can be a reinforced thermoplastic material, which can be presented in a state prior to stamping into one or more components of the various wheel assemblies described herein. The consolidated panel 792 can define a contour 796, which can be substantially planar in some instances. The film 784 can be arranged to match the contour 796, and thus exhibit a contour 788 upon being plied with the consolidated panel 792. The plied consolidate panel 792 and the film 784 can in turn be introduced to a stamp or press to form the one or more components of the wheel assembly as a plied, optionally laminated structure, having the reinforced thermoplastic material and the plied higher-melt temperature film.

In some cases, the reinforced thermoplastic material can be formed from a plurality plies. The plies can be arranged relative to one another in order to define a layup or composite structure that can be used to form one or more portions of the wheel component. As one example, the wall portion of the wheel component can be formed from a plurality of plies of thermoplastic material. The plurality of plies can be arranged to overlap one another and collectively form a radial pattern to define the wall portion. One or more or all of the plurality of plies can be arranged or biased relative to a center axis of wheel component. For example, a given ply can have an edge that defines an angle with the center axis of between substantially 22.5 and 75 degrees, such as being substantially between 40 and 60 degrees, such as being preferably about 45 degrees. The bias angle can be tuned in order to optimize wall strength of the wall portion.

Figure 8A:
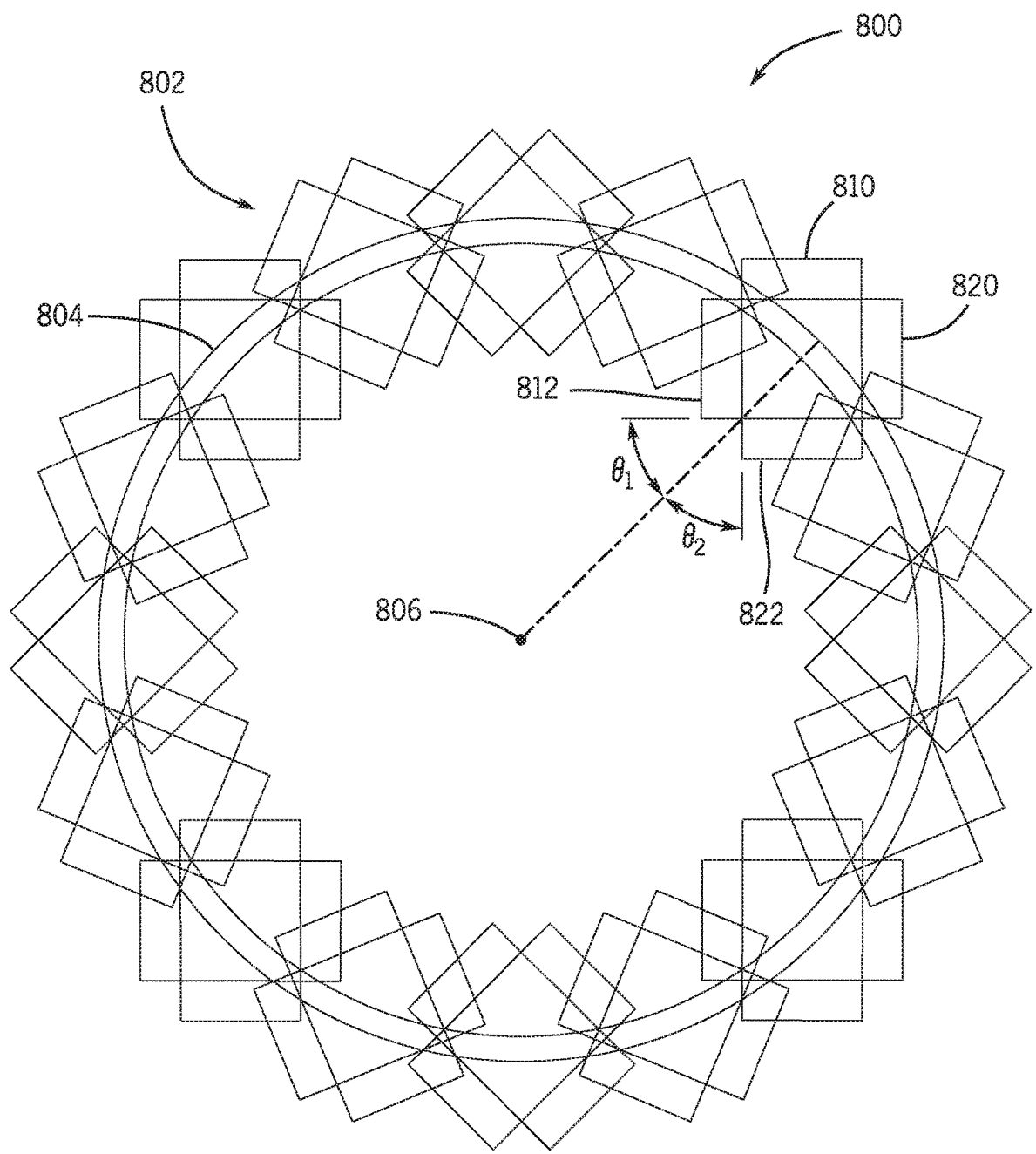
FIG. 8A depicts an example layup for manufacturing a radial crossply of a reinforced thermoplastic component.

Turning to FIG. 8A, a layup 800 is shown for forming the reinforced thermoplastic material from a plurality of plies. The layup 800 includes a radial pattern of plies 802. The radial pattern of plies 802 is arranged about a wall portion outline 804. The wall portion outline 804 can be generally indicative of a circular shape of the wheel component. In other examples, other outlines and shapes can be used to arrange the plurality of plies. The wall portion outline 804 is shown having a center 806. The center 806 can define a center axis of the wall portion outline 804 and/or other generally circular component of the wheel component, including the outer annular surface.

The radial pattern of plies 802 is shown in FIG. 8A as including a first ply 810 and a second ply 820. The first ply 810 includes a first edge 812. The second ply 820 includes a second edge 822. The first edge 812 can define an angle $\theta_1$ from a center axis defined by the center 806. The second edge 822 can define an angle $\theta_2$ from a center axis defined by the center 806. In the example of FIG. 8A, the angles $\theta_1$, $\theta_2$ are shown as being substantially 45 degrees. The angles $\theta_1$, $\theta_2$ can define a bias angle or orientation of the plies 810, 820. The angles $\theta_1$, $\theta_2$ can be tuned in order to optimize a wall strength of the wheel component, such as being tunable to be a degree value of substantially between 22.5 and 75 degrees, such as being substantially between 40 and 60 degrees, and the like.

In the example of FIG. 8A, the first ply 810 and the second ply 820 can be substantially rectangular structures that have a surface area. The first and second plies 810, 820 can overlap one another at an overlapped portion to form a cross pattern with the second edge 822 extending over and across the first edge 812 with the overlapped portion encompassing a majority of the surface area of the first ply 810 and the second ply 820, as depicted in FIG. 8A. The first and second plies 810, 820 together can define an arrangement or grouping of plies. In this regard, the radial pattern of plies 802 can include a plurality of the arrangement of plies 810, 820 to define the radial crossply. Multiple arrangements of plies can be grouped together and layered over one another to define the wall portion. For example, the wall portion can include multiple layers of crossply laminate, including a 6 layer crossply laminate, with 12, 22, or more overlapping courses of tape, according to one exemplary illustration.

Figure 8B:
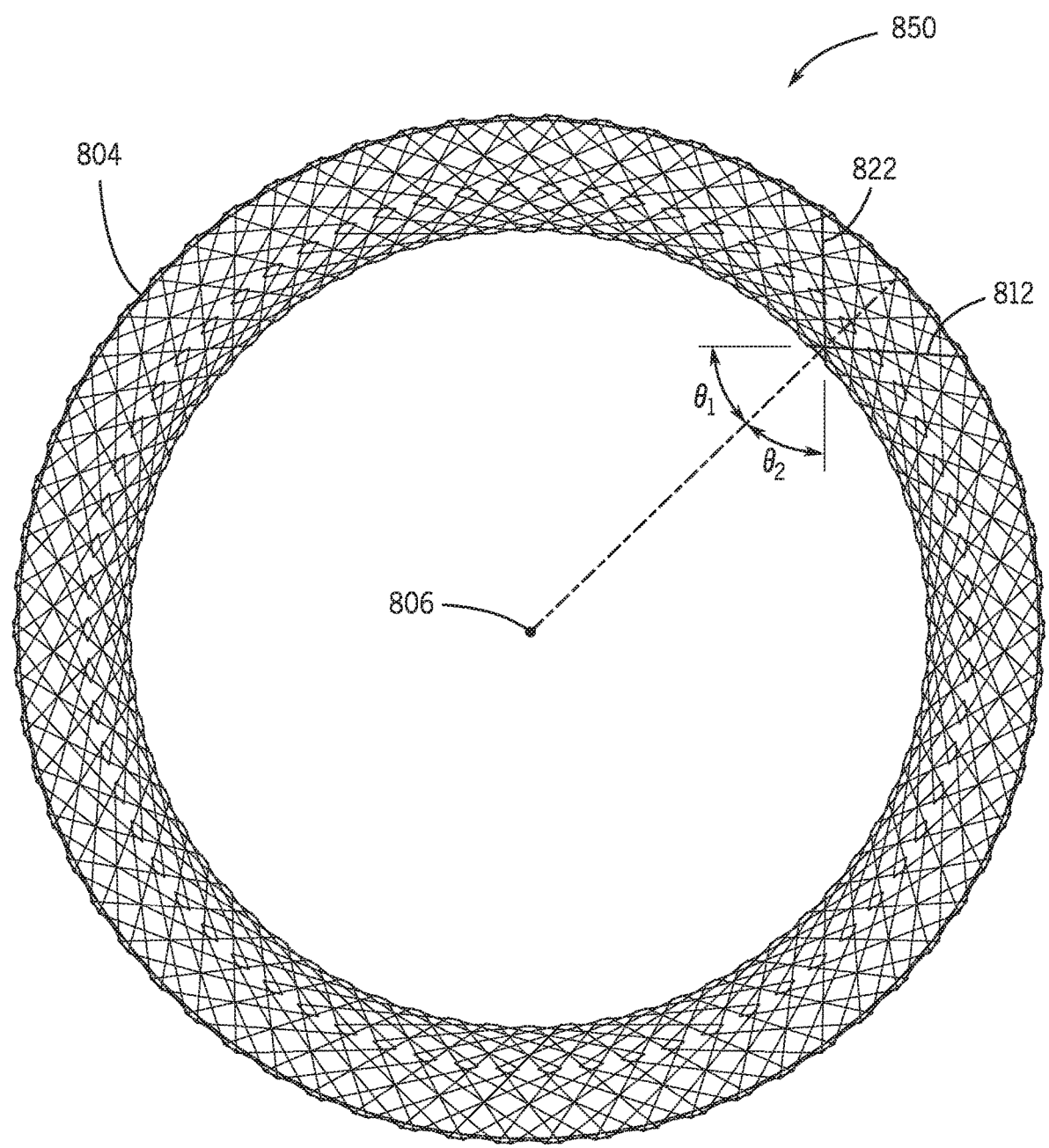
FIG. 8B depicts a wall portion of a wheel component having a radial crossply.

For example, and as show in FIG. 8B, a wall portion 850 is shown formed from the layup 800 of FIG. 8A. For example, the radial pattern of plies 802 can be plied together and formed into a composite structure. The composite structure having the radially crossply pattern can be shaped or formed into a portion of the continuous wheel component, such as being formed into the wall portion. Sample formation techniques incudes, stamping, pressing, molding, thermal forming, and like, as described throughout. FIG. 8B shows the composite having the radial cross ply pattern of FIG. 8A formed into the wall portion 850. In the formed shaped of the wall portion 850, the first edge 812 and the second edge 822 can maintain the bias angles $\theta_1$, $\theta_2$, such as maintain the substantially 45 degree value, thereby enhancing wall strength of the component. As noted above, the bias angles can range from a degree value of substantially between 22.5 and 75 degrees, such as being substantially between 40 and 60 degrees, and the like.

Turning to FIGS. 9A-9D, multiple other example layups of reinforced thermoplastic components are shown. The layup of FIGS. 9A-9D can be used to form a wall portion of the wheel component substantially analogously to the layup 800 described above with respect to FIGS. 8A and 8B. As illustrated in FIGS. 9A-9D, the shape, orientation, and number of plies used to form a wall portion of the wheel component can vary to provide different structural properties, geometries, and/or surface finishes.

Figure 9A:
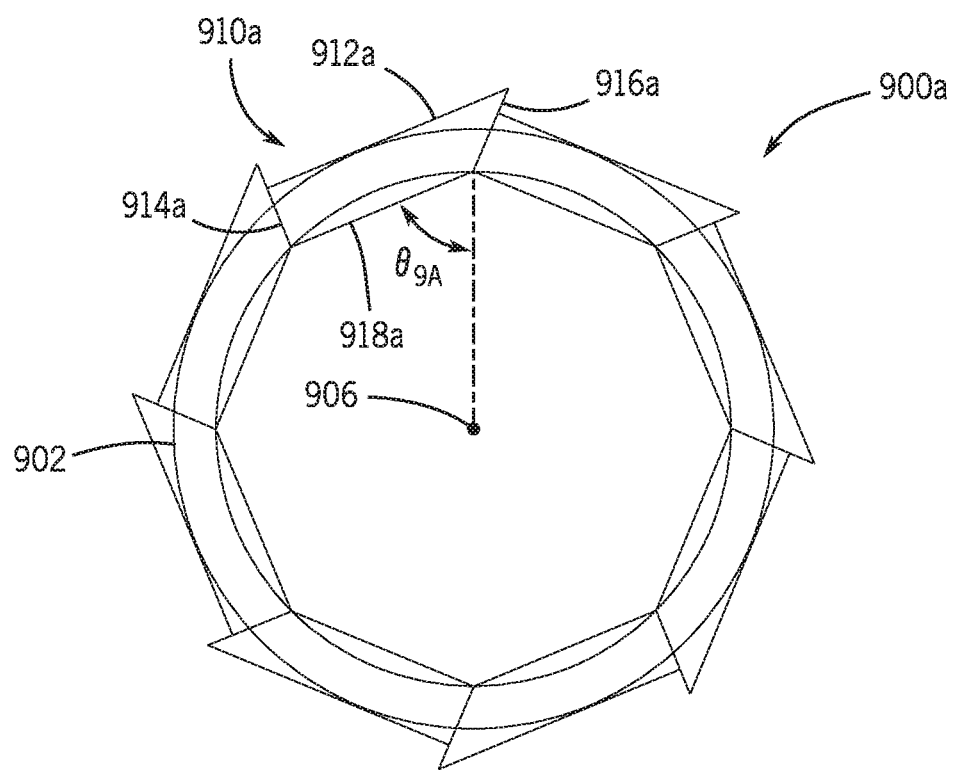
FIG. 9A depicts another example layup for manufacturing a radial crossply of a reinforced thermoplastic component.

With reference to FIG. 9A, a first layup 900a is shown. The first layup 900a includes a radial pattern of plies 910a. The radial pattern of plies 910a are arranged along a wall portion outline 902. The wall portion outline 902 can define a center 906. The radial pattern of plies 910a can include a ply 912a having a first end 914a, a second end 916a, and an edge 918a. The edge 918a can define a bias angle $\theta_{9a}$ from a center axis defined by the center 906. In the example of FIG. 9A, the first end 914a and be different than the second 916a. For example, the first end 914a can be oriented substantially transverse relative to the edge 918a, and the second end 916 can extend at an angle greater than 90 degrees from the edge 918a. The radial pattern of plies 910a are disposed about the wall portion overlap so that the ends of the respective plies abut one another to define and complete a radial crossply pattern.

Figure 9B:
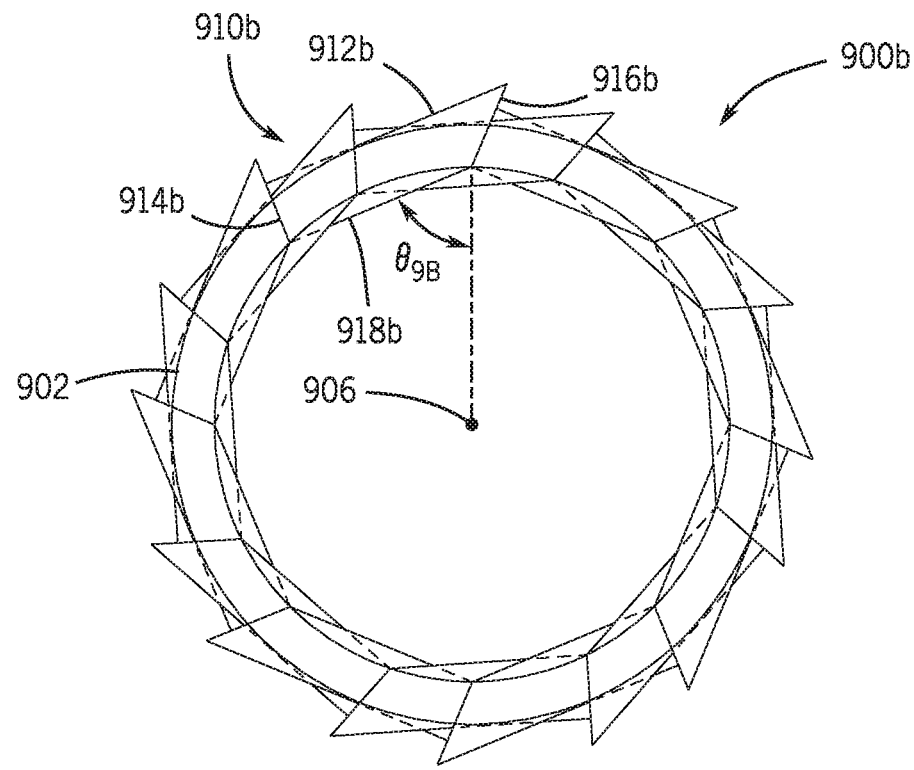
FIG. 9B depicts another example layup for manufacturing a radial crossply of a reinforced thermoplastic component.

With reference to FIG. 9B, a second layup 900b is shown. The second layup 900b includes a radial pattern of plies 910b. The radial pattern of plies 910b are arranged along a wall portion outline 902. The wall portion outline 902 can define a center 906. The radial pattern of plies 910b can include a ply 912b having a first end 914b, a second end 916b, and an edge 918b. The edge 918b can define a bias angle $\theta_{9b}$ from a center axis defined by the center 906. In the example of FIG. 9B, the ply 912b can be rotated relative to a ply layer above or below the ply 912b. For example, the ply 912b can be rotated in order to overlap an abutting connection of ply below. In this regard, the ply 192b can be rotated to establish a desired connection to the ply below to further tune the wall strength of the wheel component.

Figure 9C:
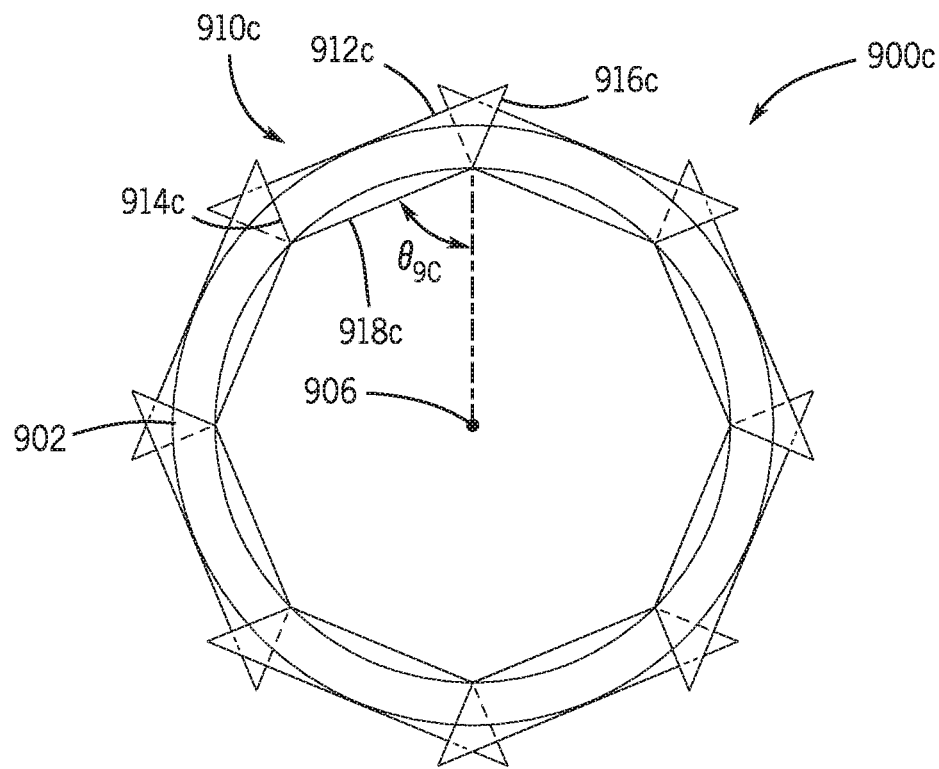
FIG. 9C depicts another example layup for manufacturing a radial crossply of a reinforced thermoplastic component.

With reference to FIG. 9C, a third layup 900c is shown. The third layup 900c includes a radial pattern of plies 910c. The radial pattern of plies 910c are arranged along a wall portion outline 902. The wall portion outline 902 can define a center 906. The radial pattern of plies 910c can include a ply 912c having a first end 914c, a second end 916c, and an edge 918c. The edge 918c can define a bias angle $\theta_{9c}$ from a center axis defined by the center 906. In the example of FIG. 9c, the first end 914c can be generally similar to that of the second end 914b. For example, the first and second ends 914a, 914b can be reflections of one another and each can extend in generally opposing directions and at an angle that is greater than 90 degrees from the edge 918c. In this regard, the ply 912c can be manipulated to establish a desired connection or overlap to an adjacent ply below to further tune wall strength of the wheel component.

Figure 9D:
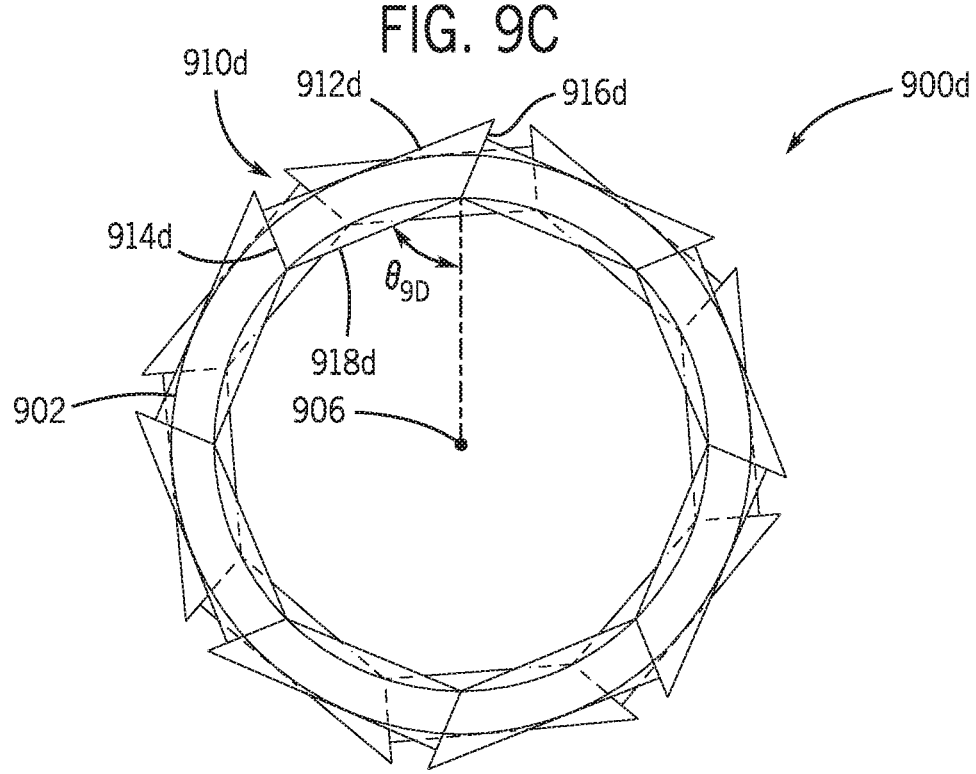
FIG. 9D depicts another example layup for manufacturing a radial crossply of a reinforced thermoplastic component.

With reference to FIG. 9D, a fourth layup 900d is shown. The fourth layup 900d includes a radial pattern of plies 910d. The radial pattern of plies 910d are arranged along a wall portion outline 902. The wall portion outline 902 can define a center 906. The radial pattern of plies 910d can include a ply 912d having a first end 914d, a second end 916d, and an edge 918d. The edge 918d can define a bias angle $\theta_{9d}$ from a center axis defined by the center 906. In the example of FIG. 9D, the first end 914d can be different than the second 916d. For example, the first end 914d can be oriented substantially transverse relative to the edge 918d, and the second end 916d can extend at an angle greater than 90 degrees from the edge 918d. The radial pattern of plies 910d are disposed about the wall portion overlap so that the ends of respective plies abut one another to define a complete radial crossply pattern. Further in the example of FIG. 9D, the ply 912d can be rotated relative to a ply layer above or below the ply 912d. For example, the ply 912d can be rotated in order to overlap an abutting connection of ply below. In this regard, the ply 192d can be rotated to establish a desired connection to the ply below to further tune wall strength of the wheel component. While FIGS. 9A-9D illustrate various ply layup strategies and configurations, any additional configurations, and/or combinations of the illustrated ply layup strategies can be used to form the reinforced thermoplastic material from a plurality of plies.

Figure 10A:
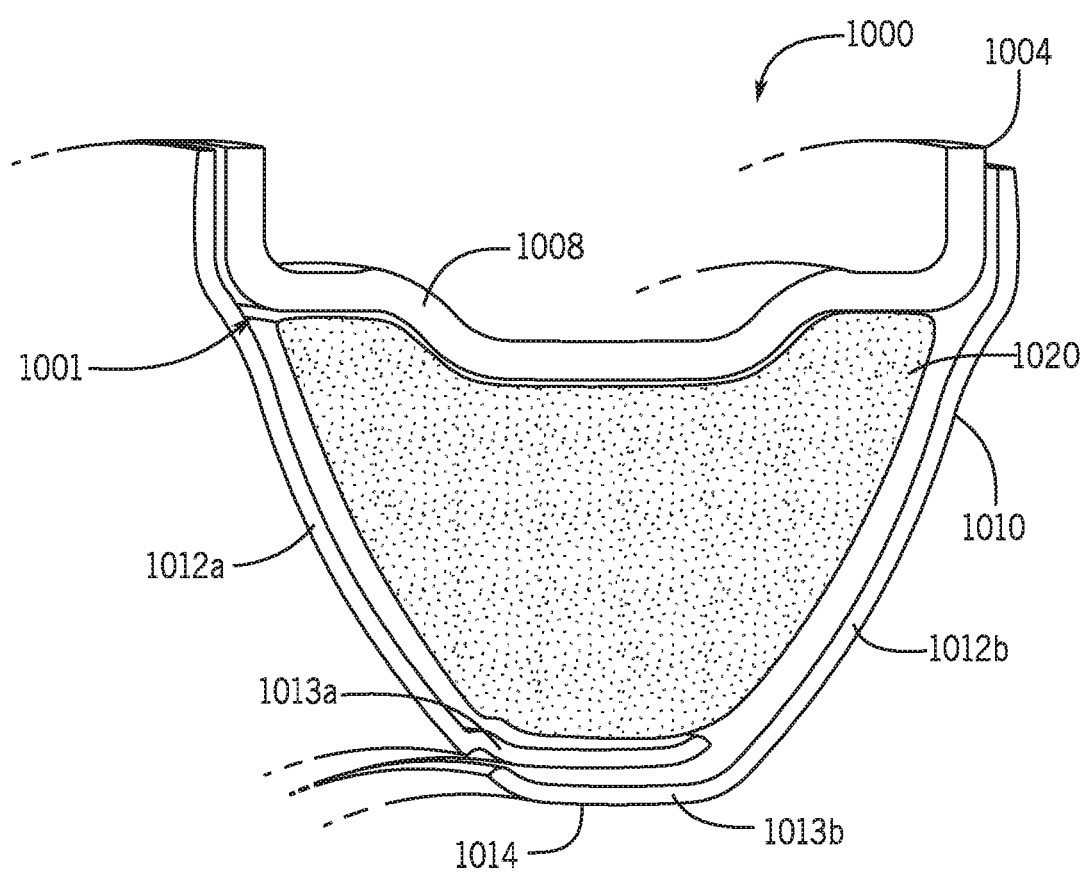
FIG. 10A depicts a collection of components used to form a wheel component fully from a reinforced thermoplastic material.

FIG. 10A depicts a sample wheel component 1000 prior to thermal bonding. The wheel component 1000 can be substantially analogous to the various wheel components described herein and include: a cavity 100₁, a rim bed portion 1004, an outer annular surface 1008, a main structure portion 1010, a first wall portion 10112a, a second wall portion 12b, and an inner annular surface, redundant explanation of which is omitted here for clarity.

FIG. 10A also shows the first wall portion 1012a as defining an engagement feature 1013a and the second wall portion 1012b as defining an engagement feature 1013b. The engagement features 1013a, 1013b generally overlap one another at the inner annular surface 1014. In this regard, the engagement features 1013a, 1013b can define a reinforcement region for the wheel component 1000 along which the wheel component 1000 can be adapted to receive a series of spokes. FIG. 10A also shows a sacrificial material 1020. The sacrificial material 1020 can help define a shape of the cavity 1001 during a thermal bonding process. The rim bed portion 1004, the first wall portion 1012a, the second wall portion 1012b, and the sacrificial material 1020 are shown mechanically engaged with one another and generally defining a loose fitting connecting. In this configuration, the collection of such components can be associated with a tooling, where they can be subjected to heat in order to form thermal bonds among the various reinforced thermoplastic materials.

Figure 10B:
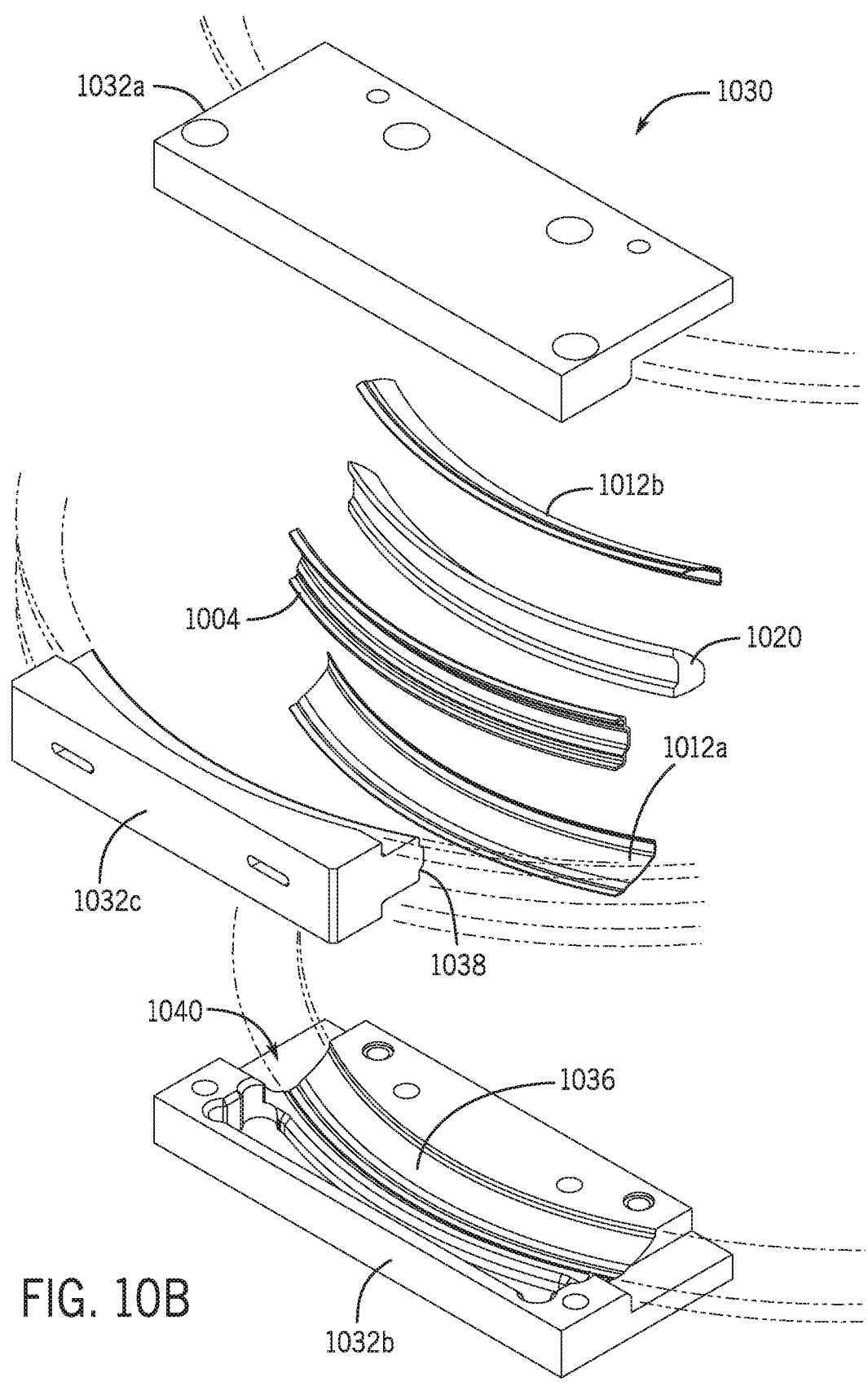
FIG. 10B depicts an assembly for thermally bonding reinforced thermoplastic components to form a wheel component.

In this regard, FIG. 10B shows the wheel component 1000 associated within a tooling 1030. Generally the wheel component 1000, as presented in FIG. 10A, can be arranged with a tooling compartment 1040. The tooling 1030 can be subjected to heat in order to transition the reinforced thermoplastic materials to a partially melted or melted state, where they can be thermally bonded to one another. For example, in some cases, the tooling 1030 can be subjected to a temperature of at least 400 degrees F., of at least 450 degrees F., of at least 500 degrees F., or other temperature in order to transition the reinforced thermoplastic materials toward a partially melted or melted state, which can be based on the specific material properties of the thermoplastic.

The tooling 1030 operates to maintain and hold the various pieces of the wheel component 1000 relative to one another during the thermal bonding. For example, the tooling 1030 can include a first plate 1032a, a second plate 1032b, and a third plate 1032c. The plates 1032a, 1032b, 1032c can cooperate to enclose the wheel component 1000 within the tooling 1030. While the plates 1032a, 1032b, 1032c are shown as segments of circular features, it will be appreciated that the plates 1032a, 1032b, 1032c can be continuous circular components (as illustrated in phantom in FIG. 10B) that operate to enclose a segmented wheel component and/or an entire continuous circular wheel component for thermal bonding therein. The first plate 1032a can have a contour to engage the first wall portion 1012a, the second plate 1032b can have a contour 1036 configured to engage the second wall portion 1012b, and the third plate 1032c can have a contour 1038 adapted to engage the rim bed portion 1004.

Figure 10C:
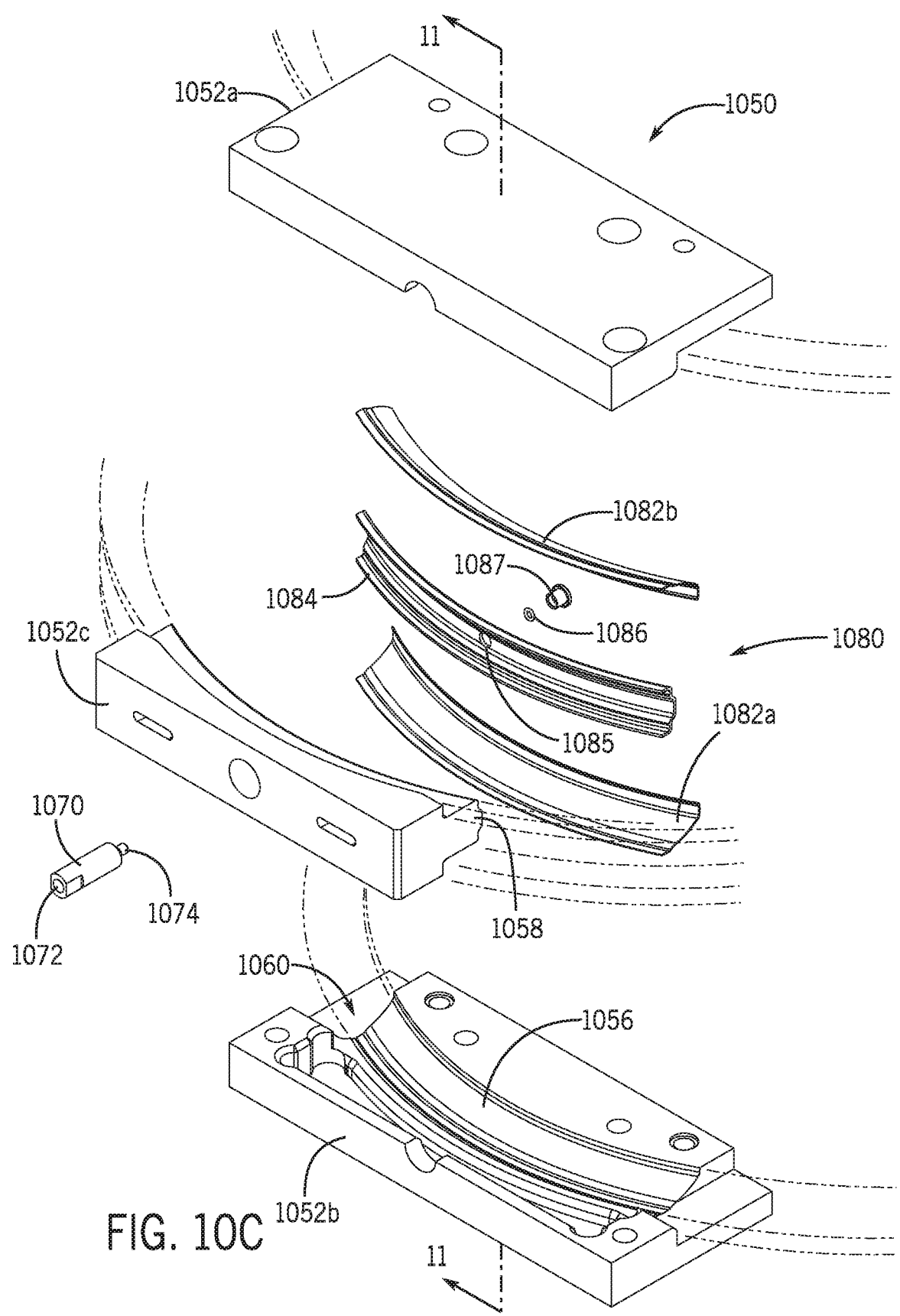
FIG. 10C depicts another assembly for thermally bonding other reinforced thermoplastic components to form another example of a wheel component.
Figure 11:
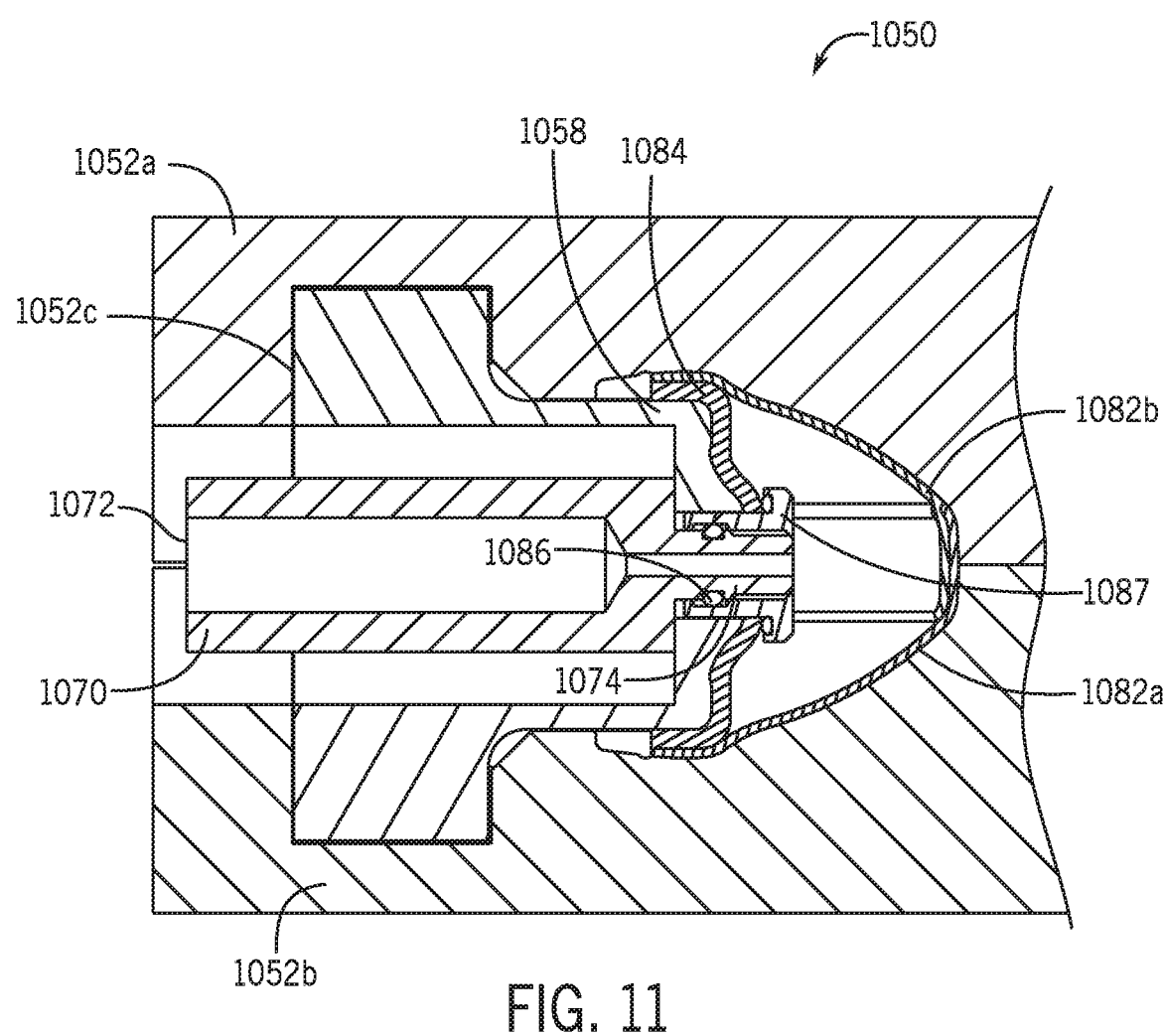
FIG. 11 depicts a cross-sectional view of the assembly of FIG. 10, taken along line 11-11 of FIG. 10C.

The sacrificial material 1020 of FIG. 10B helps maintain the shape of the cavity of the wheel component 1000 during the thermal bonding, as described herein. FIGS. 10C and 11 show an example of present disclosure where the shape of an internal cavity of the wheel component is maintained during thermal bonding using pressurized fluid and without a bladder. For example, an inflation component can be used to deliver a pressurized fluid to regions of tooling that define the internal cavity of the wheel component. Subsequent to thermal bonding, the inflation component can be removed. The reinforced thermoplastic material can close in and seal itself, in some cases, and/or be adapted to be closed with other, reinforced thermoplastic components, such as a portion of the inflation component that is formed from a reinforced thermoplastic material.

In this regard, FIGS. 10C and 11 shows a wheel component 1080 arranged generally within a tooling 1050. The wheel component 1080 and the tooling 1050 can be generally analogous to those described with respect to FIGS. 10A and 10B and include: a rim bed portion 1084, a first wall portion 1082a, a second wall portion 1082b, a first plate 1052a, a second plate 1052b, a third plate 1052c, a contour 1058, and a contour 1056.

The tooling 1050 can also be adapted to provide pressurized fluid to the wheel component 1080 during thermal bonding. In this regard, FIG. 10C shows the tooling 1050 including an inflation component 1070. The inflation component 1070 can include an inlet 1072 that is adapted to receive pressurized fluid, such as compressed air, from a source. The inflation component 1070 can also include a tip 1074. The tip 1074 is insertable into the tooling compartment 1060 in order to direct pressurized air to a region substantially between the pieces of the wheel component 1080. For example the inflation component 1070 can generally extend through the third plate 1052c so that the tip 1074 is advanced through the rim bed portion 1084 at an opening 1085. The inflation component 1070 can be configured to deliver pressurized air to the tooling compartment 1060 of at least 40 psi, or of at least 100 psi, or of at least 200 psi, and/or delivery at a higher pressure, each of which can be tuned to mitigate the deformation of the reinforced thermoplastic material into the cavity. To facilitate the foregoing, the inflation component 1070 can also be associated with an adaptor 1087. The adaptor 1087 can be associated with the tip 1074 via an O-ring 1086 or other sealing structure. As shown in FIG. 10C, the adaptor 1087 can fit at least partially into the cavity of the wheel component 1080 to facilitate delivery of the pressurized fluid into the internal cavity and minimize leakages. Subsequent to thermally bonding the reinforced thermoplastic materials, the tooling 1050 can be allowed to cool and/or be subjected to an active cooling process. The inflation component 1070 can be removed from the wheel component 1080, and the hole 1085 can be closed. Many mechanisms are possible and described herein. For example, the reinforced thermoplastic materials can be constructed for substantially self-sealing of the hole 1085. This can be facilitated by a higher-melt temperature film that can be plied to a stamp form shape of the wheel components and/or a consolidated panel. In other cases, a separate plug, patch, or reinforcement strip can be used to close the hole 1085, which can also be formed from a reinforced thermoplastic material. The materials can cool together in a manner that closes the hole 1085 in a seamless fashion, leaving substantially no visible indication of the hole 1085 in the finished product. In this regard, the rim bed portion 1084 and/or the main structure portion 1082 can be fully formed as reinforced thermoplastic components having a continuously hollow cavity and be free of surface indicia of a manufacturing process associated with bladder exit.

Figure 12:
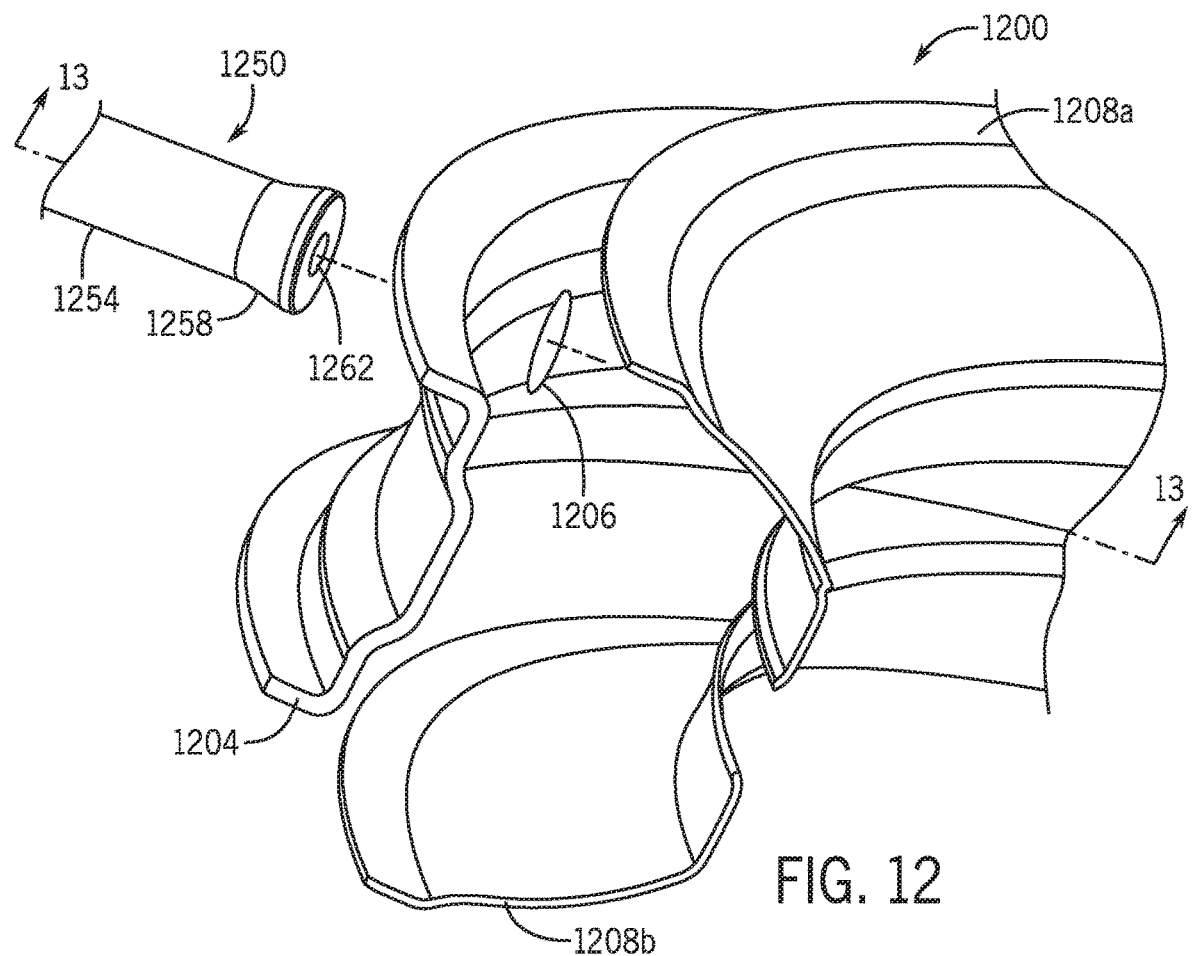
FIG. 12 depicts an arrangement for pressurizing a cavity of a wheel component with a consumable inflation component.
Figure 13:
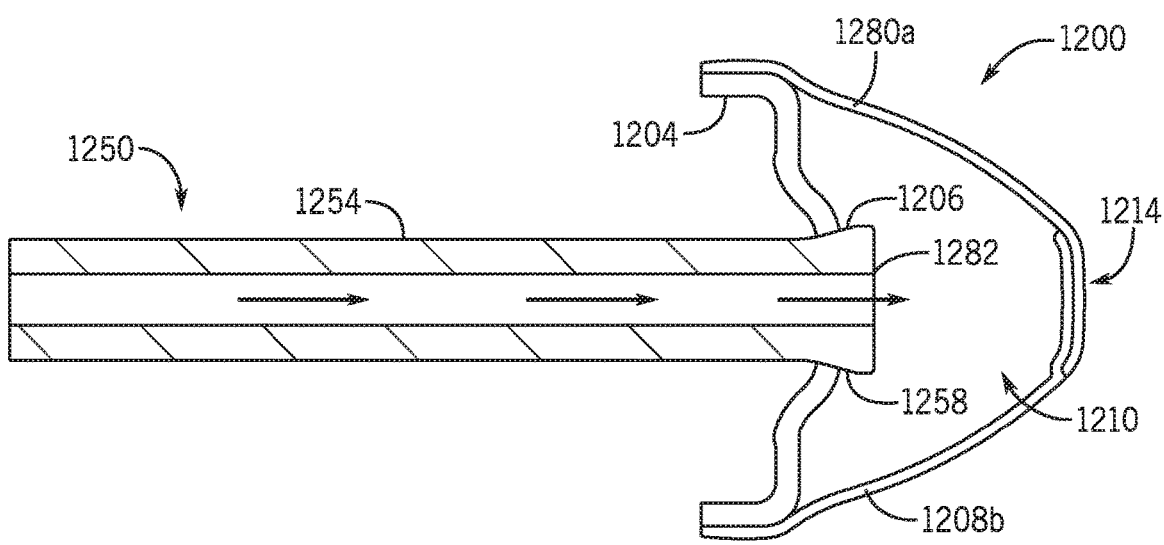
FIG. 13 depicts a cross-sectional view of the assembly of FIG. 12, taken along line 13-13 of FIG. 12.

In certain other cases, the inflation component 1070 can be used to seal a hole or other point of entry for pressurized air into the cavity. For example, FIGS. 12 and 13 present a wheel component 1200 that can have an internal cavity that is pressurized by an inflation component 1250. The wheel component 1200 and the inflation component 1250 can be substantially analogous to the wheel component 1000 and the inflation component 1120 of FIG. 11 and include a main structure portion 1204, a first wall portion 1208a, a second wall portion 1208b a hole 1206, a cavity 1210, an inlet or shaft portion 1254, and a tip 1258. The inflation component 1250 can deliver pressurized air into the cavity 1210 via the tip 1258, as shown in FIG. 13. For example, the tip 1258 can have a duct 1262 that allows a flow of pressurized air in the cavity 1210.

A portion of the inflation component 1250, such as the tip 1262, can be a consumable component that is used to seal the hole 1206. For example, the tip 1262 can be formed from a thermoplastic material (which may or may not be reinforced) and/or other material that generally has a higher melting temperature than that of the reinforced thermoplastic material used to form the rim bed portion 1204 and/or the first or second wall portions 1208a, 1208b. Subsequent to the thermal bonding of the portions of the wheel component 1200, the tip 1258 can be severed from the shaft 1254. The tip 1258 can remain partially integrated with the rim bed portion 1204 such as being integrated with the hole 1206 and used to seal and plug the hole 1206. For example, the tip 1258 can cool according to a different thermal characteristic than the surround rim bed portion 1204. This differential can encourage the rim bed portion 1204 to at least partially close in on itself and seal the hole 1206, using the tip 1258 to plug or block the hole 1206. The cavity 1210 can be therefore sealed from an external environment. The self-sealing properties of the rim bed portion 1204 in cooperation with the tip 1258 can define a substantially smooth, seamless exterior surface of the wheel component.

Figure 14:
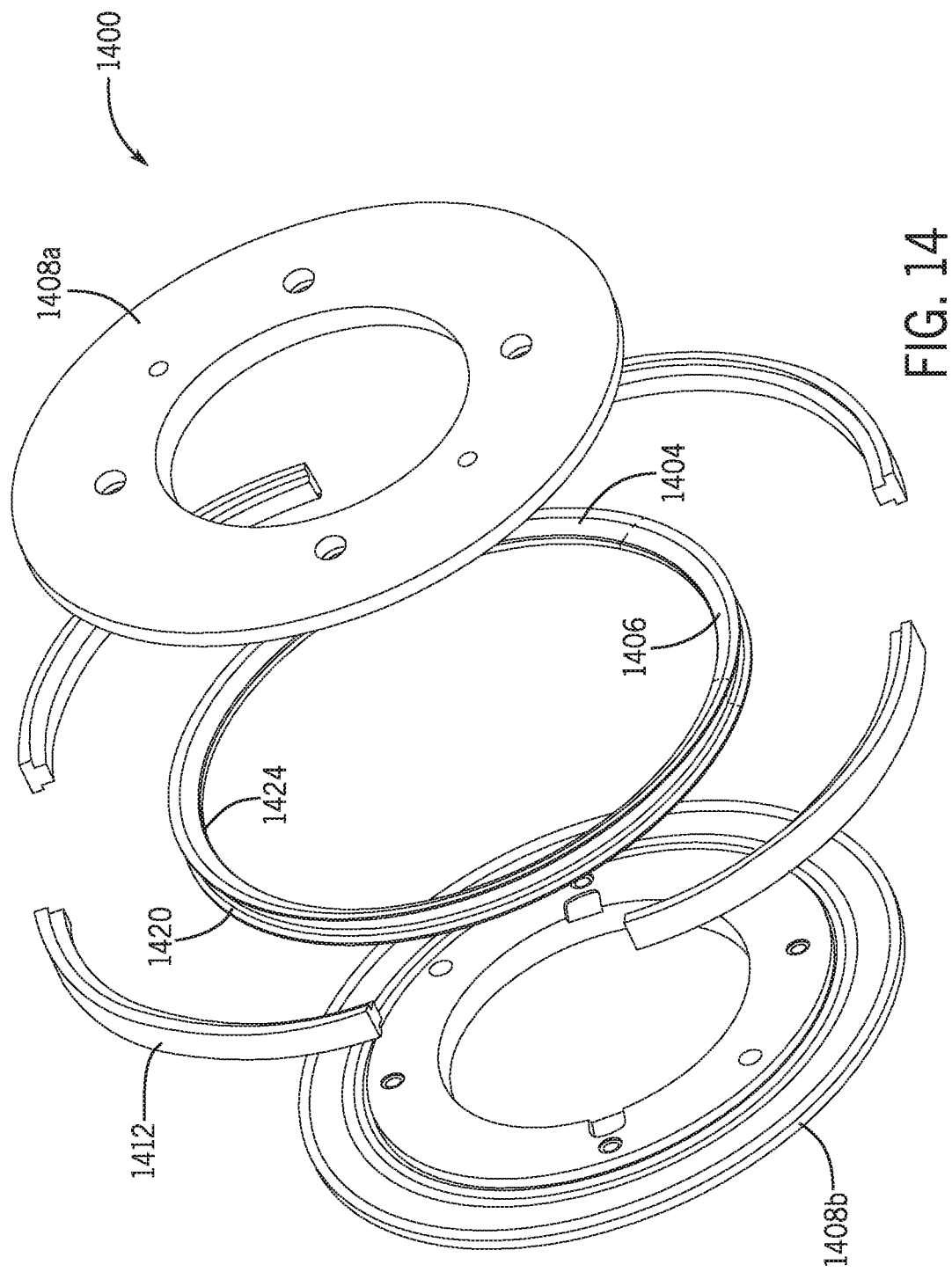
FIG. 14 depicts another assembly for forming a continuous circular contour of a wheel component.

As stated above, the pieces of any of the wheel components described herein can be thermally bonded to one another to form a segment of a continuous circular shape. Additionally or alternatively, the pieces of the wheel components can be thermally bonded to one another to form the continuous circular shape. FIG. 14 depicts a sample tooling 1400 that be used to thermally bond the pieces of the wheel component as a continuous circular shape. In this regard, it will be appreciated that the tooling described with reference to FIGS. 9 and 10 can be, or be adapted to define, the continuous circular tooling 1400 presented in FIG. 14.

Broadly, FIG. 14 shows the tooling 1400 as including a first plate 1408a and a second plate 1408b. The tooling 1400 also includes a collection of annular members 1412. The pieces of the wheel component are arranged generally between the plates 1408a, 1408b and the collection of annular members 1412 encircle the pieces of the wheel component. The example of FIG. 14 shows a wheel component 1404 arranged within the tooling 1400. The wheel component 1404 can be substantially analogous to any of the wheel components described herein and include a rim bed portion 1220 and a main structure portion 1224, redundant explanation of which is omitted here for clarity. In some cases, the rim bed portion 1220 and the main structure 1224 can be arranged within the tooling 1400 and thermally bonded to one another within the tooling 1400. Additionally or alternatively, the wheel component 1404 can include wheel segments 1406 that include rim and main structure portions which are thermally bonded to one another. In this regard, multiple circular segments can be arranged with the tooling 1400 in order to define a continuous circular component, internally formed and having a substantially seamless exterior.

FIGS. 15A-20B depicts various examples of wheel components that are formed fully from reinforced thermoplastic materials. The wheel components of FIGS. 15A-20B can be formed via a thermal bonding process. For example, one or more components of a rim bed portion and a main structure portion that are each formed from a reinforced thermoplastic material can be arranged relative to one another and joined together. The rim bed portion and main structure portion can be constructed in a variety of manners to facilitate thermal bonding. For example, the rim bed portion and the main structure portion can include overlapping portions that are adapted to mechanically engage with one another in order to form a lap joint. Additionally or alternatively, the rim bed portion and the main structure portion can be adapted to form an edge joint, among other constructions. In some cases, one or both of the rim bed portion or the main structure portion can be associated with another reinforced thermoplastic material, such as a reinforced thermoplastic material that is adaptable to define a reinforced zone of the wheel component that is strengthened to receive spokes or other features of a bicycle. It will be appreciated that while FIGS. 15A-20B show sample constructions of wheel components, in other cases other constructions are contemplated herein.

Figure 15A:
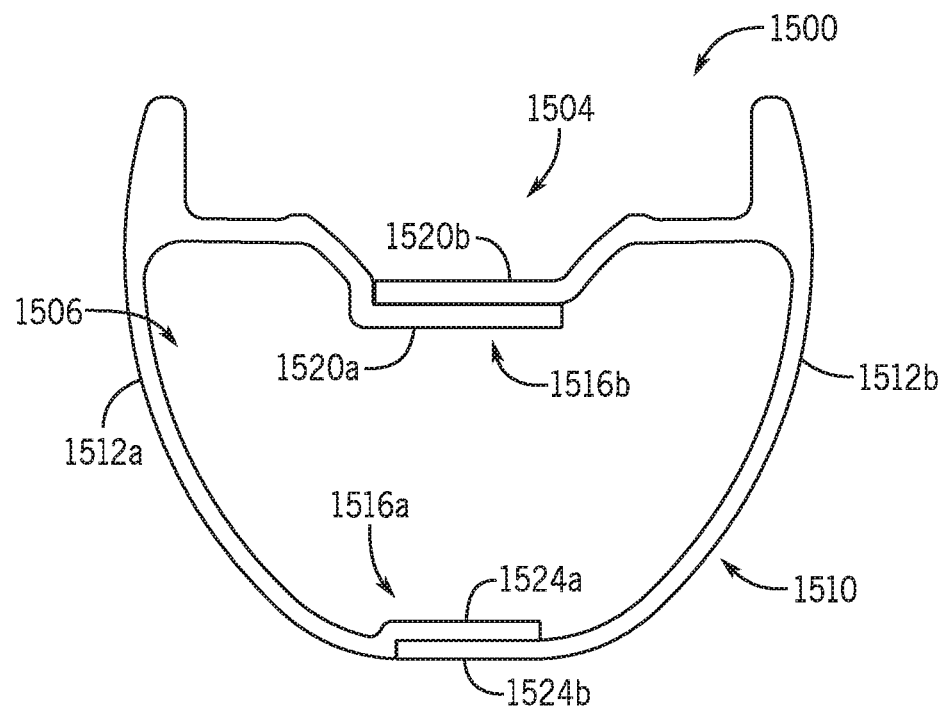
FIG. 15A depicts a cross-sectional view of an example of a wheel component formed from a reinforced thermoplastic material and having thermally bonded joints.
Figure 15B:
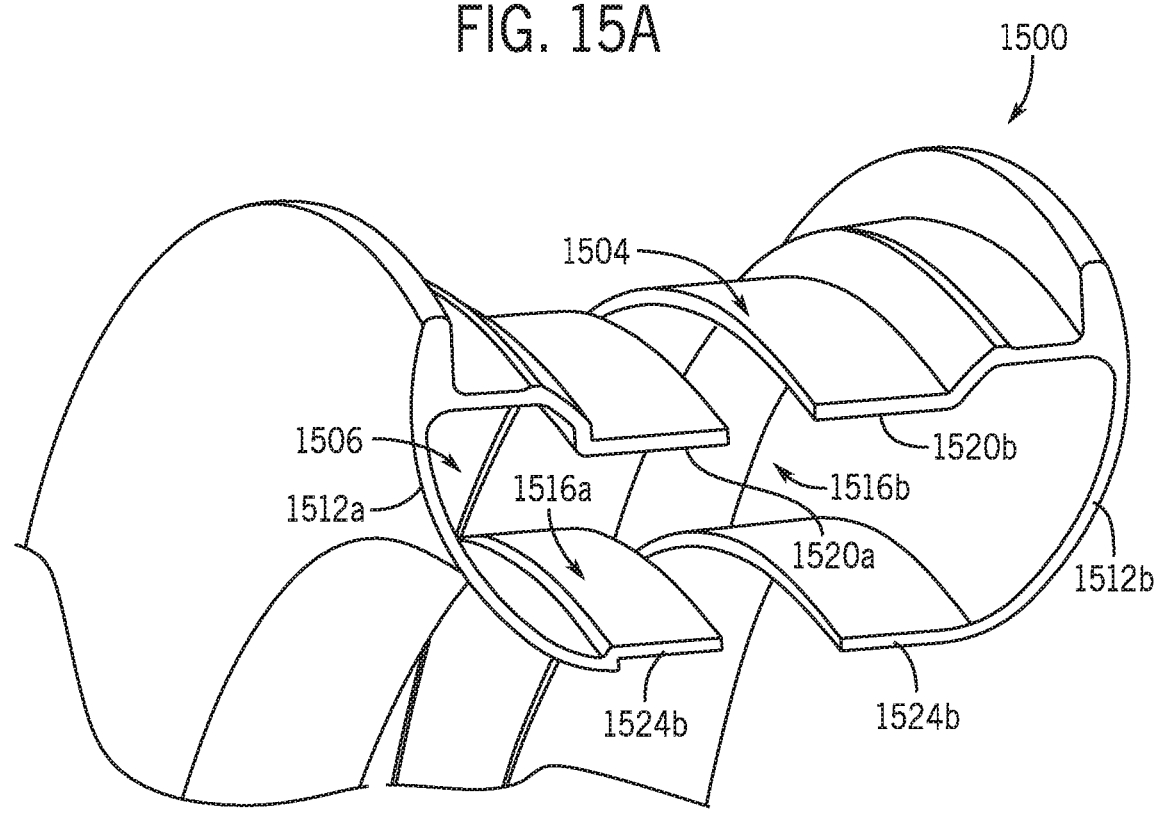
FIG. 15B depicts an exploded view of the wheel component of FIG. 15A.

With reference to FIGS. 15A and 15B, a wheel component 1500 is shown. The wheel component 1500 can be substantially analogous to the various wheel components and the reinforced thermoplastic structures described herein; redundant explanation of which is omitted here for clarity. The wheel component 1500 is shown in FIGS. 15A and 15B as including a first wall portion 1512a and a second wall portion 1512b. The first wall portion 1512a and the second wall portion 1512b cooperate to enclose the wheel component 1500 and define a cavity 1506. In the example of FIGS. 15A and 15B, the first wall portion 1512a and the second wall portion 1512b establish the rim bed portion 1504 that defines an outer annular surface of the wheel component 1500 that is configured to engage a bicycle tire. The first wall portion 1512a and the second wall portion 1512b also establish the main structure portion 1510 that can be adapted to engage spokes of a bicycle. The first wall portion 1512a and the second wall portion 1512b are mechanically engaged at the rim bed portion 1504 and the main structure portion 1510. For example the first wall portion 1512a can include an engagement feature 1520a and the second wall portion 1512b can include an engagement feature 1520b. The engagement features 1520a, 1520b can overlap one another at the rim bed portion 1504, forming a lap joint. Collectively, the overlap of the engagement features 1520a, 1520b can define a reinforcement region 1516b at the rim bed portion. Further, the first wall portion 1512a can include an engagement feature 1524a and the second wall portion 1512b can include an engagement feature 1524b. The engagement features 1524a, 1524b can overlap one another at the main structure portion 1510, forming a lap joint. Collectively, the overlap of the engagement features 1524a, 1524b can define a reinforcement region 1516a at the main structure portion.

Figure 16A:
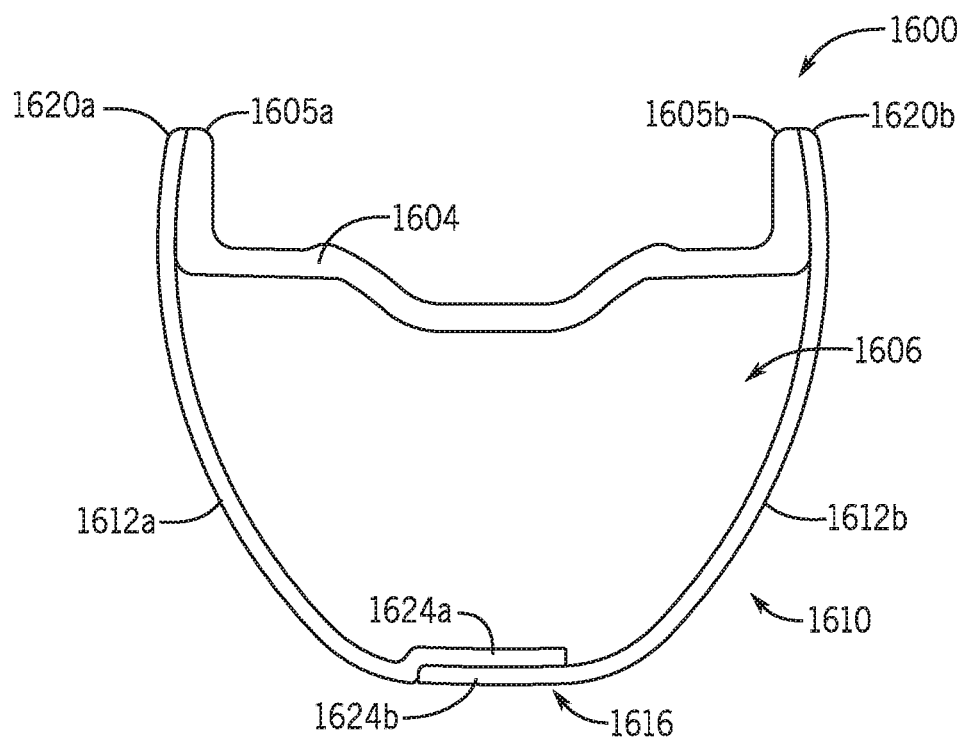
FIG. 16A depicts a cross-sectional view of another example of a wheel component formed from a reinforced thermoplastic material and having thermally bonded joints.
Figure 16B:
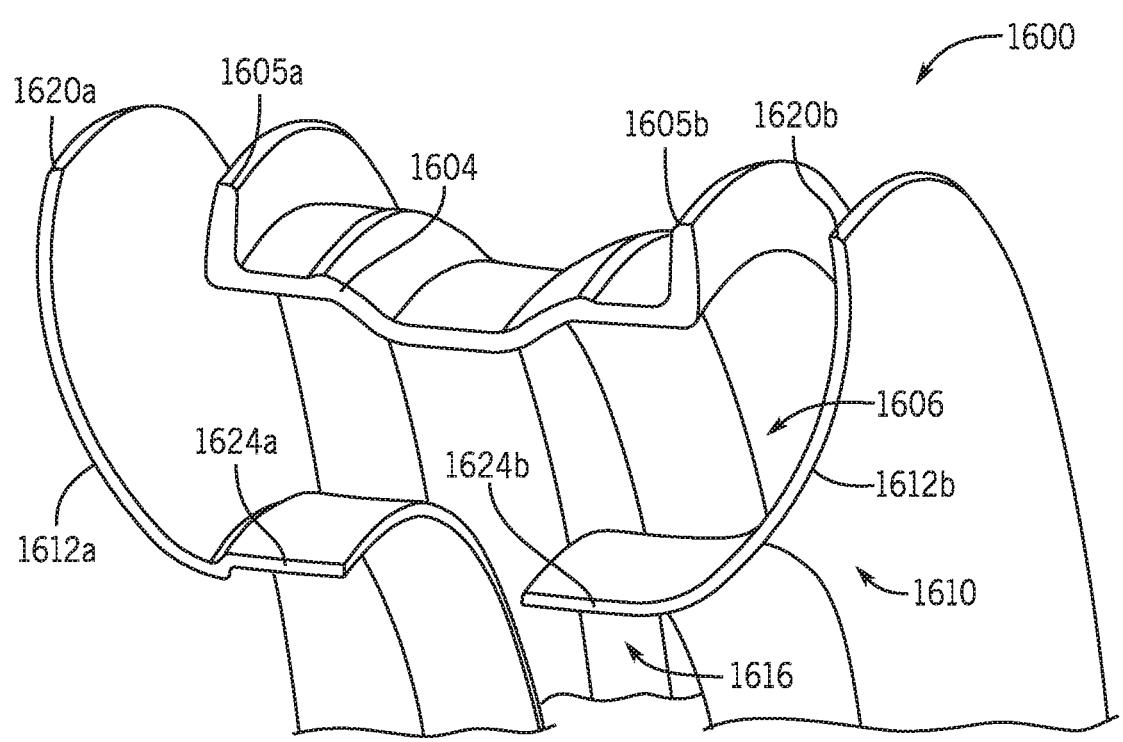
FIG. 16B depicts an exploded view of the wheel component of FIG. 16A.

With reference to FIGS. 16A and 16B a wheel component 1600 is shown. The wheel component 1600 can be substantially analogous to the various wheel components and the reinforced thermoplastic structures described herein; redundant explanation of which is omitted here for clarity. The wheel component 1600 is shown in FIGS. 16A and 16B as including a first wall portion 1612a, a second wall portion 1612b, and a rim bed portion 1604. The first wall portion 1612a, the second wall portion 1612b, and the rim bed portion 1604 cooperate to enclose the wheel component 1600 and define a cavity 1606. In the example of FIGS. 16A and 16B, the rim bed portion 1604 is a structural component that defines an outer annular surface of the wheel component 1600 that is configured to engage a bicycle tire. The first wall portion 1612a and the second wall portion 1612b establish the main structure portion 1610 that can be adapted to engage spokes of a bicycle. The first wall portion 1612a and the second wall portion 1612b are mechanically engaged at the main structure portion 1610. For example, the first wall portion 1612a can include an engagement feature 1624a and the second wall portion 1612b can include an engagement feature 1624b. The engagement features 1624aa, 1624b can overlap one another at the main structure portion 1610, forming a lap joint. Collectively, the overlap of the engagement features 1624a, 1624b can define a reinforcement region 1616 at the main structure portion 1610. Further, the first wall portion 1512a can include an engagement feature 1620a and the second wall portion 1612b can include an engagement feature 1620b. The engagement features 1620a, 1620b can be used to define an edge joint with the main structure portion 1604. For example, the main structure portion 1604 can include an engagement feature 1605a that is mechanically engageable with the engagement feature 1620a to define an edge joint. The main structure portion 1604 can further include an engagement feature 1605b that is mechanically engageable with the engagement feature 1620b to define another edge joint.

Figure 17A:
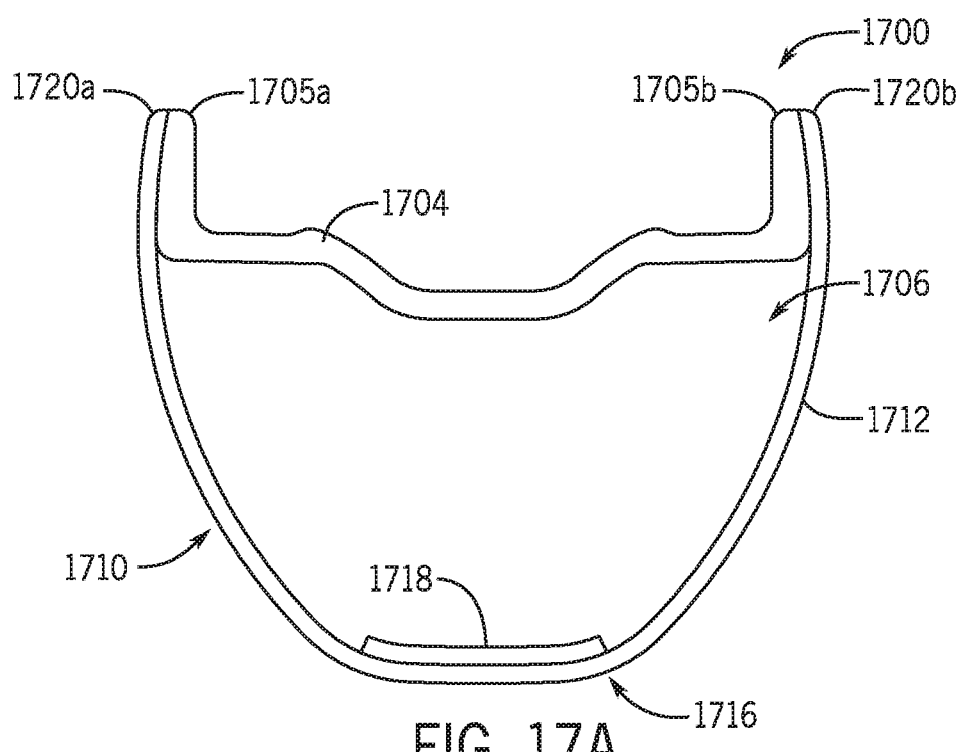
FIG. 17A depicts a cross-sectional view of another example of a wheel component formed from a reinforced thermoplastic material and having thermally bonded joints.
Figure 17B:
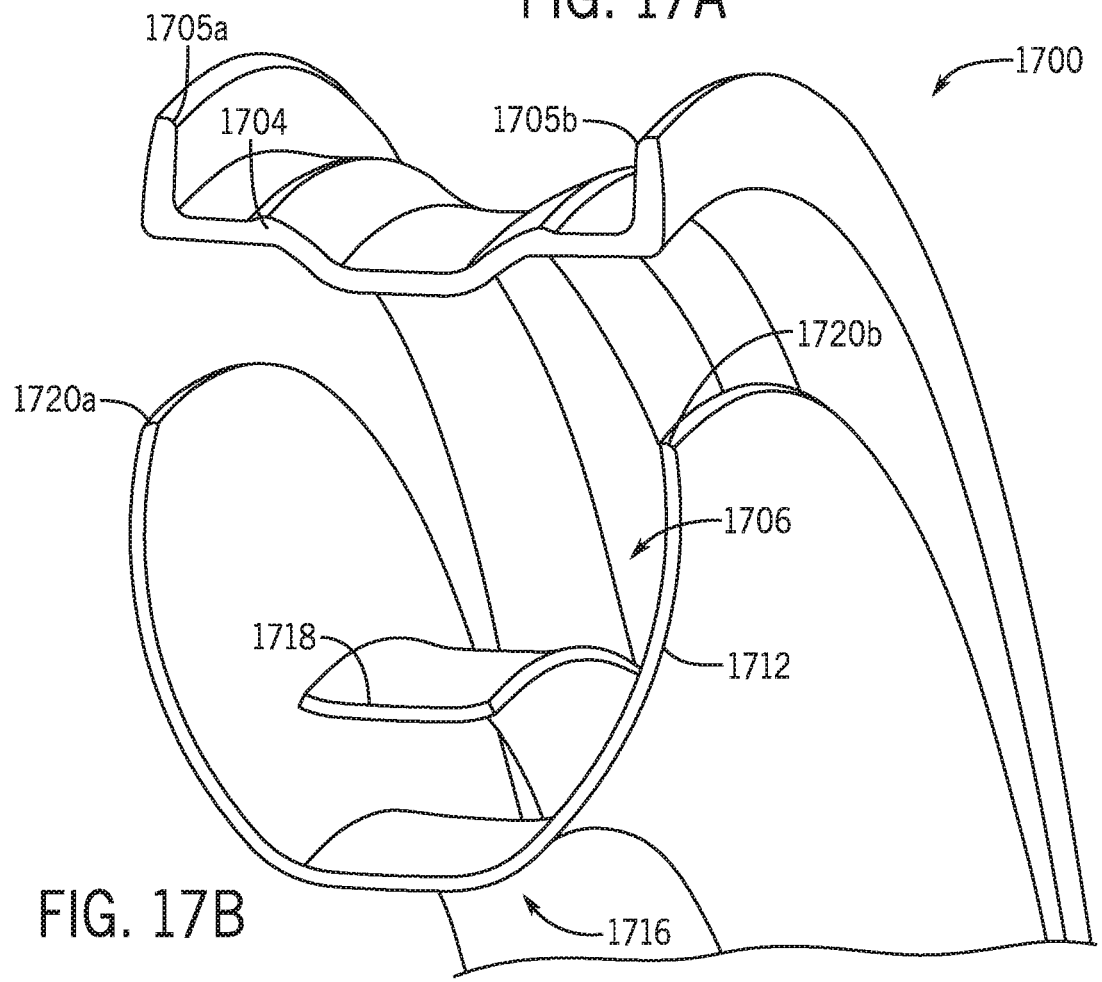
FIG. 17B depicts an exploded view of the wheel component of FIG. 17A.

With reference to FIGS. 17A and 17B a wheel component 1700 is shown. The wheel component 1700 can be substantially analogous to the various wheel components and the reinforced thermoplastic structures described herein; redundant explanation of which is omitted here for clarity. The wheel component 1700 is shown in FIGS. 17A and 17B as including a rim bed portion 1704 and a main structure portion 1712. The rim bed portion 1704 and the main structure portion 1712 cooperate to enclose the wheel component 1700 and define a cavity 1706. In the example of FIGS. 17A and 17B, the rim bed portion 1704 is a structural component that defines an outer annular surface of the wheel component 1700 that is configured to engage a bicycle tire. The main structure portion 1710 can be adapted to engage spokes of a bicycle. The rim bed portion 1704 is mechanically engaged at the main structure portion 1710. For example, the rim bed portion can include engagement features 1705a, 1705b. The main structure portion 1712 can include engagement features 1720a, 1720b. The engagement features 1720a, 1705a can define an edge joint between the main structure portion 1712 and the rim bed portion 1704. Further, the engagement features 1720b, 1705b can define an edge joint between the main structure portion 1712 and the rim bed portion 1704. FIG. 17 further shows the wheel component as including a reinforcement region 1716 at the main structure portion 1712, for example, as might be adapted or strengthened to receive a series of spokes. For example, the wheel component 1700 can further include a reinforcement piece 1718, which can also be formed from a reinforced thermoplastic material. The reinforcement piece can overlap or cover or be laminated with the main structure portion 1712 to define the reinforcement region 1712.

Figure 18A:
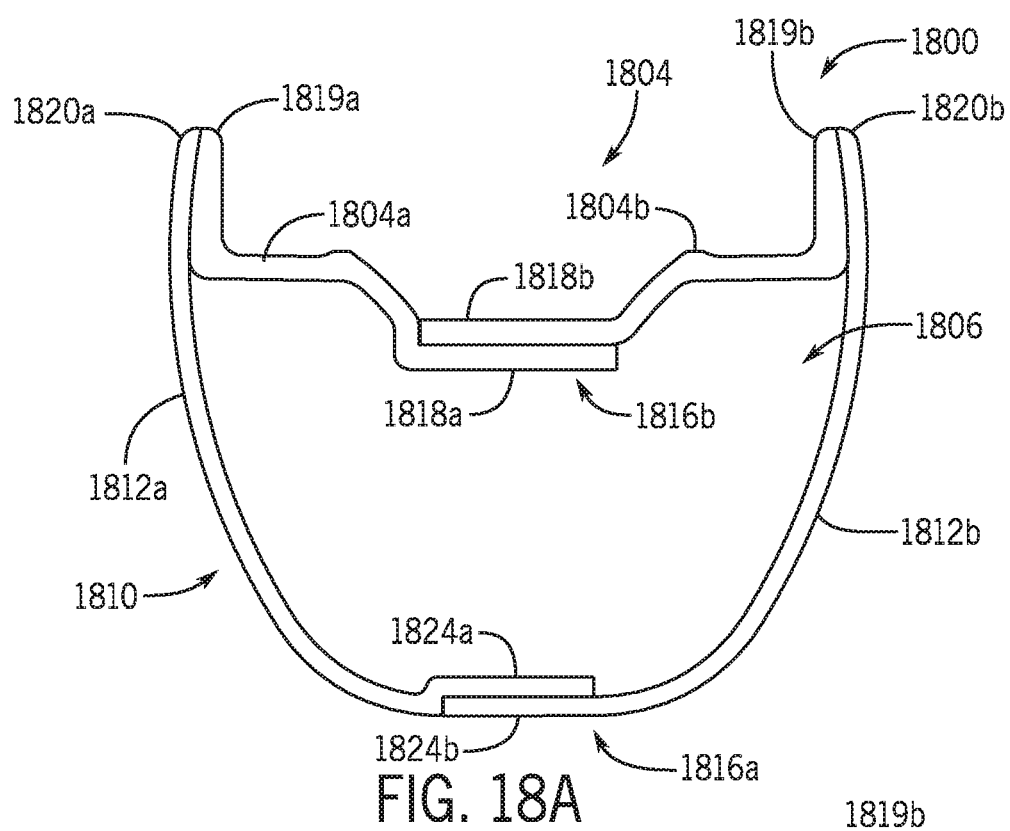
FIG. 18A depicts a cross-sectional view of another example of a wheel component formed from a reinforced thermoplastic material and having thermally bonded joints.
Figure 18B:
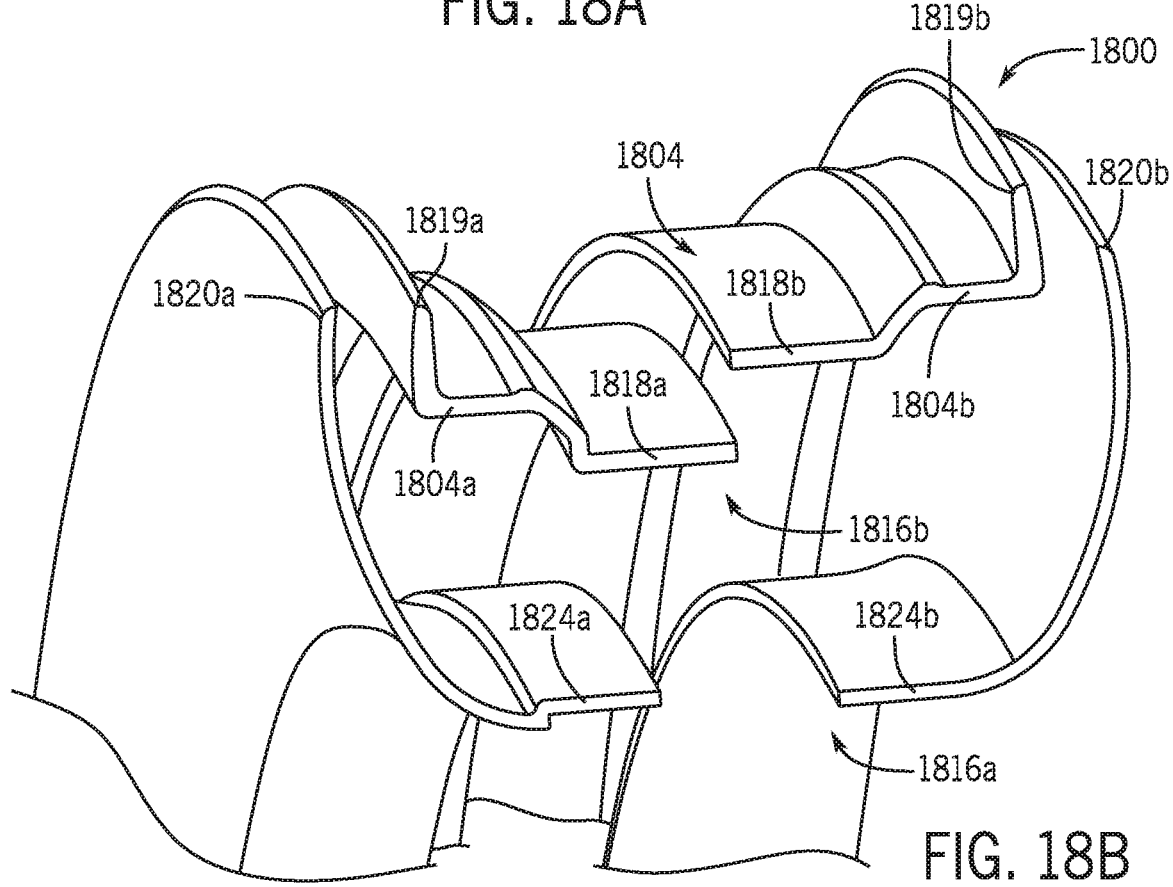
FIG. 18B depicts an exploded view of the wheel component of FIG. 18A.

With reference to FIGS. 18A and 18B a wheel component 1800 is shown. The wheel component 1800 can be substantially analogous to the various wheel components and the reinforced thermoplastic structures described herein; redundant explanation of which is omitted here for clarity. The wheel component 1800 is shown in FIGS. 18A and 18B as including a first wall portion 1812a, a second wall portion 1812b, a first rim bed portion 1804a, and a second rim bed portion 1804b. The first wall portion 1812a, the second wall portion 1812b, the first rim bed portion 1804a, and the second rim bed portion 1804b cooperate to enclose the wheel component 1800 and define a cavity 1806. In the example of FIGS. 18A and 18B, the first rim bed portion 1804a and the second rim bed portion 1804b establish the rim bed portion 1804 of the wheel component 1800. The rim bed portion 1804 defines an outer annular surface of the wheel component 1800 that is configured to engage a bicycle tire. Further, the first wall portion 1812a and the second wall portion 1812b establish the main structure portion 1810 that can be adapted to engage spokes of a bicycle. The first wall portion 1812a and the second wall portion 1812b are mechanically engaged at the rim bed portion 1804 and the main structure portion 1810. For example, the first wall portion 1812a can include an engagement feature 1824a and the second wall portion 1812b can include an engagement feature 1824b. The engagement features 1824a, 1824b can overlap one another at the main structure portion 1810, forming a lap joint. Collectively, the overlap of the engagement features 1824a, 1824b can define a reinforcement region 1816a at the rim bed portion 1810. Further, the first rim bed portion 1804a and the second rim bed portion 1804b can also form a reinforcement region 1816b at the rim bed portion 1804. For example, the first rim bed portion 1804a can include an engagement feature 1818a and the second rim bed portion 1818b can include an engagement feature 1818b. The engagement features 1818a, 1818b can overlap one another at the rim bed portion 1804, forming a lap joint that defines the reinforcement region 1816b. The rim bed portion 1804 is also adapted to form edge joints with the main structure portion 1810. For example, the first wall portion 1812a can include an engagement feature 1820a and the first rim bed portion 1804a can include an engagement feature 1819a. The engagement features 1820a, 1819a can be arranged relative to one another to form the edge joint. Further, the second wall portion 1812b can include an engagement feature 1820b and the second rim bed portion 1804b can include an engagement feature 1819b. The engagement features 1820b, 1819b can be arranged relative to one another to form the edge joint.

Figure 19A:
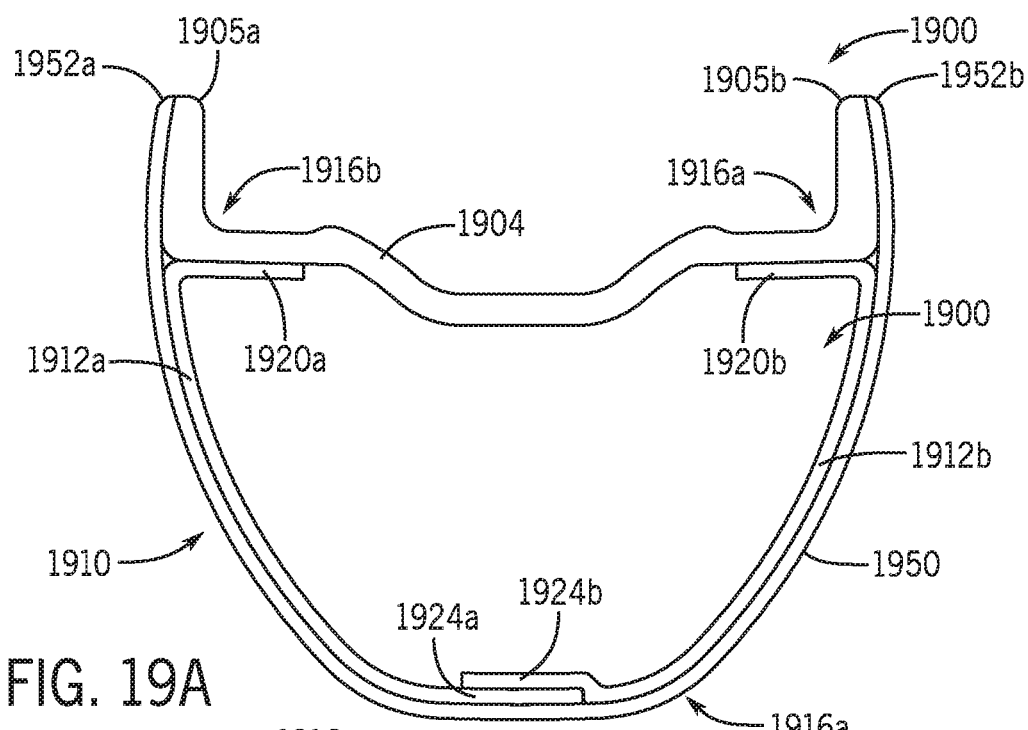
FIG. 19A depicts a cross-sectional view of another example of a wheel component formed from a reinforced thermoplastic material and having thermally bonded joints.
Figure 19B:
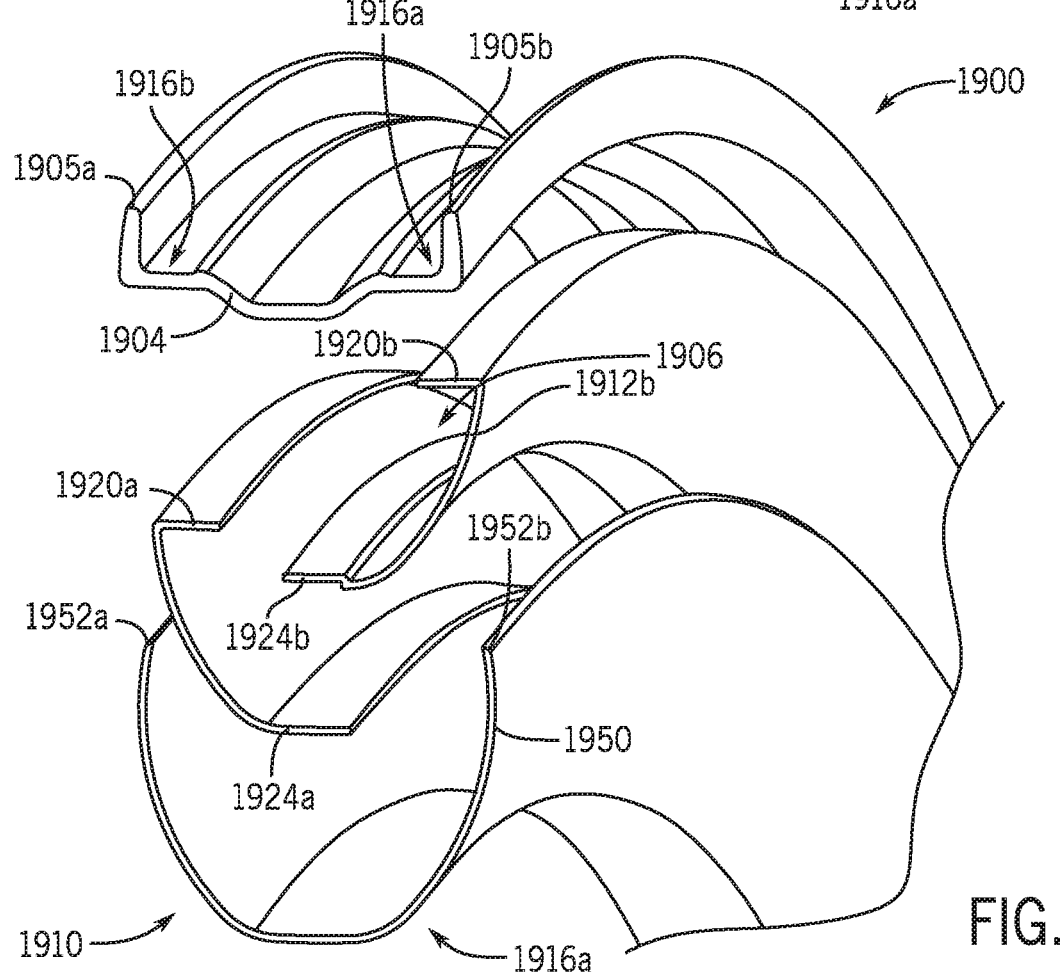
FIG. 19B depicts an exploded view of the wheel component of FIG. 19A.

With reference to FIGS. 19A and 19B a wheel component 1900 is shown. The wheel component 1900 can be substantially analogous to the various wheel components and the reinforced thermoplastic structures described herein; redundant explanation of which is omitted here for clarity. The wheel component 1900 is shown in FIGS. 19A and 19B as including a first wall portion 1912a, a second wall portion 1912b, a rim bed portion 1904, and a shell 1950. The first wall portion 1912a, the second wall portion 1912b, the rim bed portion 1904, and the shell 1950 cooperate to enclose the wheel component 1900 and define a cavity 1906. In the example of FIGS. 19A and 19B, the rim bed portion 1904 is a structural component that defines an outer annular surface of the wheel component 1700 that is configured to engage a bicycle tire. Further, the first wall portion 1912a, the second wall portion 1912b, and the shell 1950 establish the main structure portion 1910 that can be adapted to engage spokes of a bicycle. The first wall portion 1912a and the second wall portion 1912b are mechanically engaged at the main structure portion 1910. For example the first wall portion 1912a can include an engagement feature 1924a and the second wall portion 1912b can include an engagement feature 1924b. The engagement features 1924a, 1924b can overlap one another at the main structure portion 1910, forming a lap joint. Collectively, the overlap of the engagement features 1924a, 1924b can define a reinforcement region 1916a at the rim bed portion 1910. Further, the rim bed portion 1904 can also form reinforcement regions, such as reinforcement regions 1916b, 1916c shown in FIGS. 19A and 19B. For example, the first wall portion 1912a can include an engagement feature 1920a that is arrangeable relative to the rim bed portion 1904 to define the reinforced region 1916b. Further, the second wall portion 1912b can include an engagement feature 1920b that is arrangeable relative to the rim bed portion 1904 to define the reinforced region 1916b. The reinforced regions 1916a, 1916b can be reinforced corners of the rim bed portion 1904, which can be configured to support and/or enhance the functionality of certain bicycle tires engaged with the rim bed portion 1904. The rim bed portion 1904 is also adapted to form edge joints with the main structure portion 1910. For example, the shell can include an engagement feature 1952aa and the rim bed portion 1904 can include an engagement feature 1905a. The engagement features 1952a, 1905a can be arranged relative to one another to form the edge joint. Further, the shell can include an engagement feature 152bb and the rim bed portion 1904 can include an engagement feature 1905b. The engagement features 1952b, 1905b can be arranged relative to one another to form the edge joint.

Figure 20A:
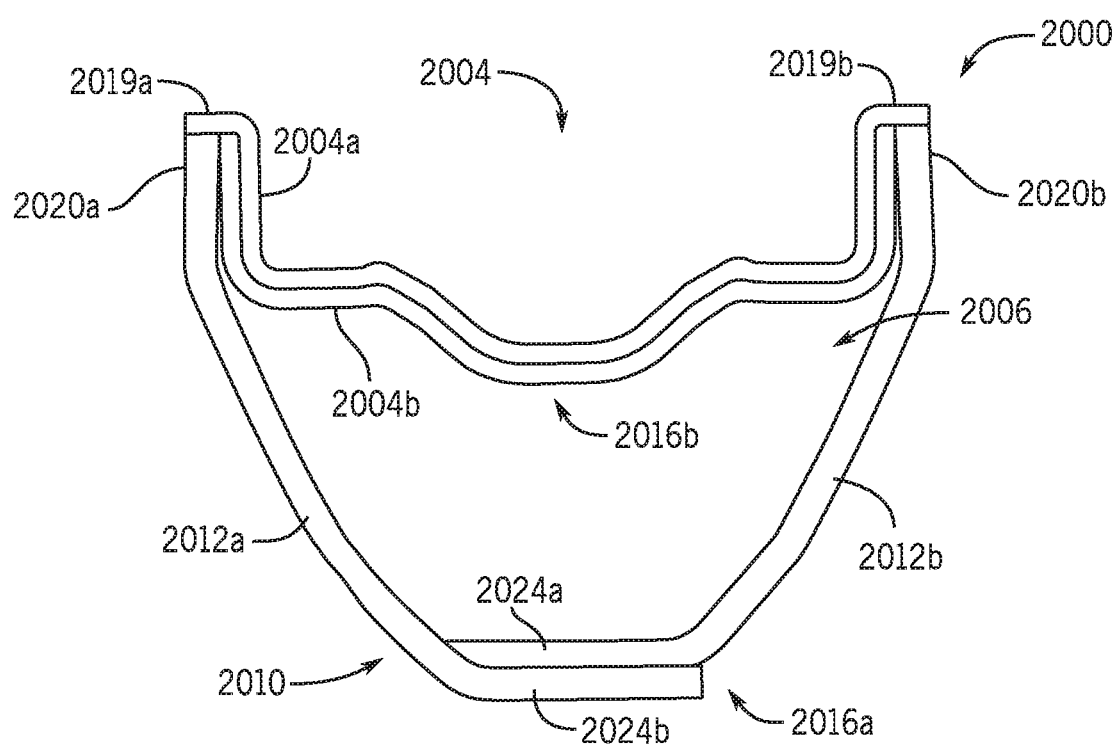
FIG. 20A depicts a cross-sectional view of another example of a wheel component formed from a reinforced thermoplastic material and having thermally bonded joints.
Figure 20B:
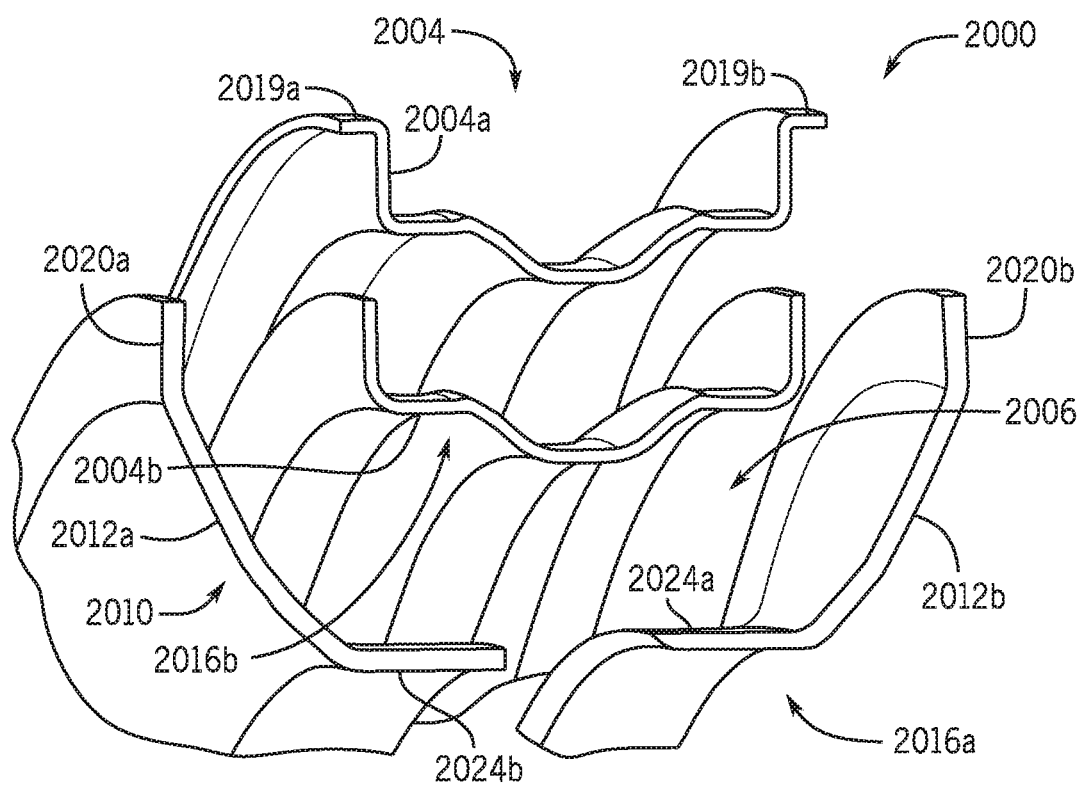
FIG. 20B depicts an exploded view of the wheel component of FIG. 20A.

With reference to FIGS. 20A and 20B a wheel component 2000 is shown. The wheel component 2000 can be substantially analogous to the various wheel components and the reinforced thermoplastic structures described herein; redundant explanation of which is omitted here for clarity. The wheel component 2000 is shown in FIGS. 20A and 20B as including a first wall portion 2012a, a second wall portion 2012b, a first rim bed portion 2004a, and a second rim bed portion 2004b. The first wall portion 2012a, the second wall portion 2012b, the first rim bed portion 2004a, and the second rim bed portion 2004b cooperate to enclose the wheel component 2000 and define a cavity 2006. In the example of FIGS. 20A and 20B, the first rim bed portion 2004a and the second rim bed portion 2004b establish the rim bed portion 2004 of the wheel component 2000. The rim bed portion 2004 defines an outer annular surface of the wheel component 2000 that is configured to engage a bicycle tire. Further, the first wall portion 2012a and the second wall portion 2012b establish the main structure portion 2010 that can be adapted to engage spokes of a bicycle. The first wall portion 2012a and the second wall portion 2012b are mechanically engaged at the rim bed portion 2004 and the main structure portion 2010. For example, the first wall portion 2012a can include an engagement feature 2024a and the second wall portion 2012b can include an engagement feature 2024b. The engagement features 2024a, 2024b can overlap one another at the main structure portion 2010, forming a lap joint. Collectively, the overlap of the engagement features 2024a, 2024b can define a reinforcement region 2016a at the rim bed portion 2010. Further, the first rim bed portion 2004a and the second rim bed portion 2004b can also form a reinforcement region 2016b at the rim bed portion 2004. The rim bed portion 2004 is also adapted to form edge joints with the main structure portion 2010. For example, the first wall portion 2012a can include an engagement feature 2020a and the first rim bed portion 2004a can include an engagement feature 2019a. The engagement features 2020a, 2019a can be arranged relative to one another to form the edge joint. Further, the second wall portion 2012b can include an engagement feature 2020b and the second rim bed portion 2004b can include an engagement feature 2019b. The engagement features 2020b, 2019b can be arranged relative to one another to form the edge joint.

FIGS. 21A-25B depict further examples of thermal bonding of reinforced thermoplastic components. In particular, FIGS. 21A-25B depict multi-stage thermal bonding techniques. For example, it can be desirable in certain circumstances to complete a spoke bed bond or weld (e.g., bonding components of a main structure portion to one another), and in turn complete a channel bond or weld (e.g., bonding components of a rim bed portion to one another and/or with the main structure portion). It will be appreciated therefore, that the following techniques can be adapted to thermally bond any of the reinforced thermoplastic materials to one another, including thermal bonding to form a circular segment and/or a continuous circular component.

Figure 21A:
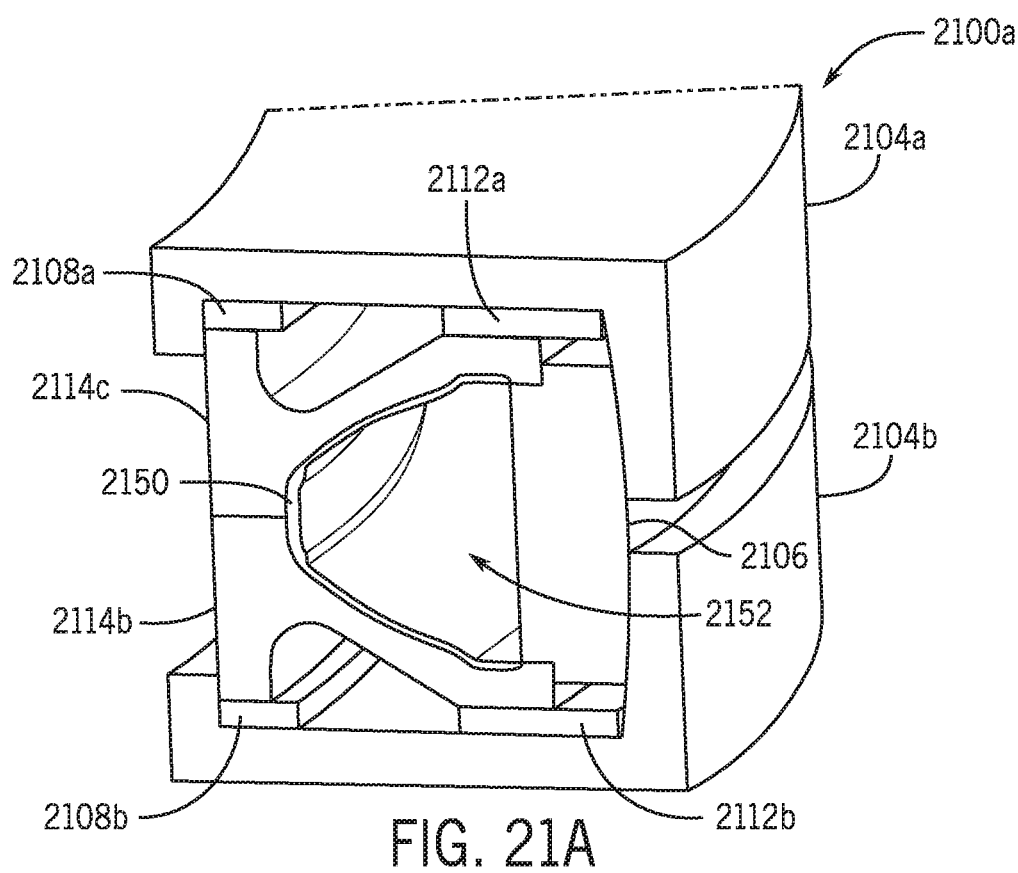
FIG. 21A depicts an arrangement for performing a spoke weld for a reinforced thermoplastic wheel component, according to one example.
Figure 21B:
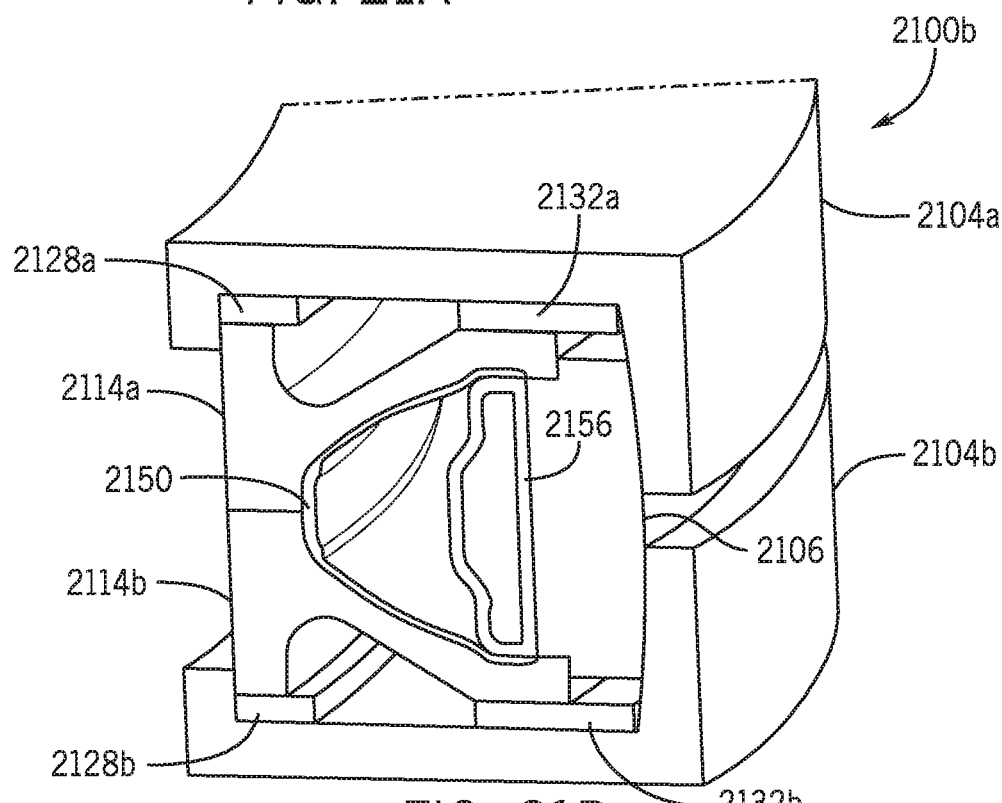
FIG. 21B depicts an arrangement for performing a channel weld for the reinforced thermoplastic wheel component of FIG. 21A.

With reference to FIGS. 21A and 21B, a first example of a multi-stage thermal bonding technique is depicted. FIG. 21A shows an operation 2100a in which a spoke bed weld or bond is performed, and FIG. 21B shows an operation 2100b in which a channel weld or bond is performed. As shown in FIG. 21A, a main structure portion 2150 can generally be held within a tooling. The tooling can include a first half 2104a and a second half 2104b. The first and second halves 2104a, 2104b can operate as outer support members that clamp the pieces of the wheel component in the tooling. A first cradle portion 2114a and a second cradle portion 2114b can contact and engage the main structure portion 2150 within the tooling. An annular member 2106 can retain the main structure portion 2150 therein, helping to hold the portion 2150 against the cradles 2114a, 2114b. A cavity 2152 can be defined by the main structure portion 2150 and the annular member 2106. FIG. 21A also shows conduction rings 2108a, 2108b. The conduction rings 2108a, 2108b can be used to generate heat within the cradle portions 2114a, 2114b that can be used to thermally bond components of the main structure portion 2150 and/or otherwise facilitate a spoke bed weld of the wheel component. Phenolic insulating rings 2112a, 2112b can provide an electrically insulating feature that limits the flow of heat to non-target areas during the thermal bonding. With reference to FIG. 21B, the operation 2100b shows the thermal bonding of a rim bed portion 2156 to the main structure portion 2150. In the operation 2100b, heat is generated proximate a channel of the rim bed portion 2156 via conduction rings 2132a, 2132b. Phenolic insulting rings 2128a, 2128b are provided to limit the flow of heat to non-target areas during the thermal bonding.

Figure 22A:
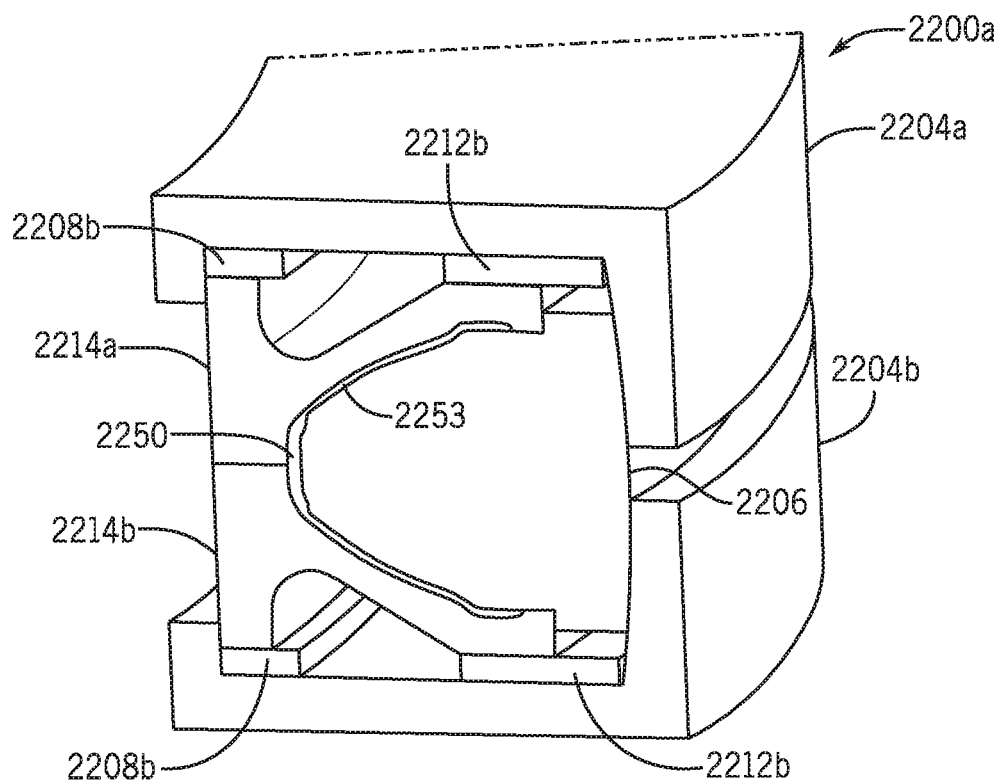
FIG. 22A depicts an arrangement for performing a spoke weld for a reinforced thermoplastic wheel component, according to another example.
Figure 22B:
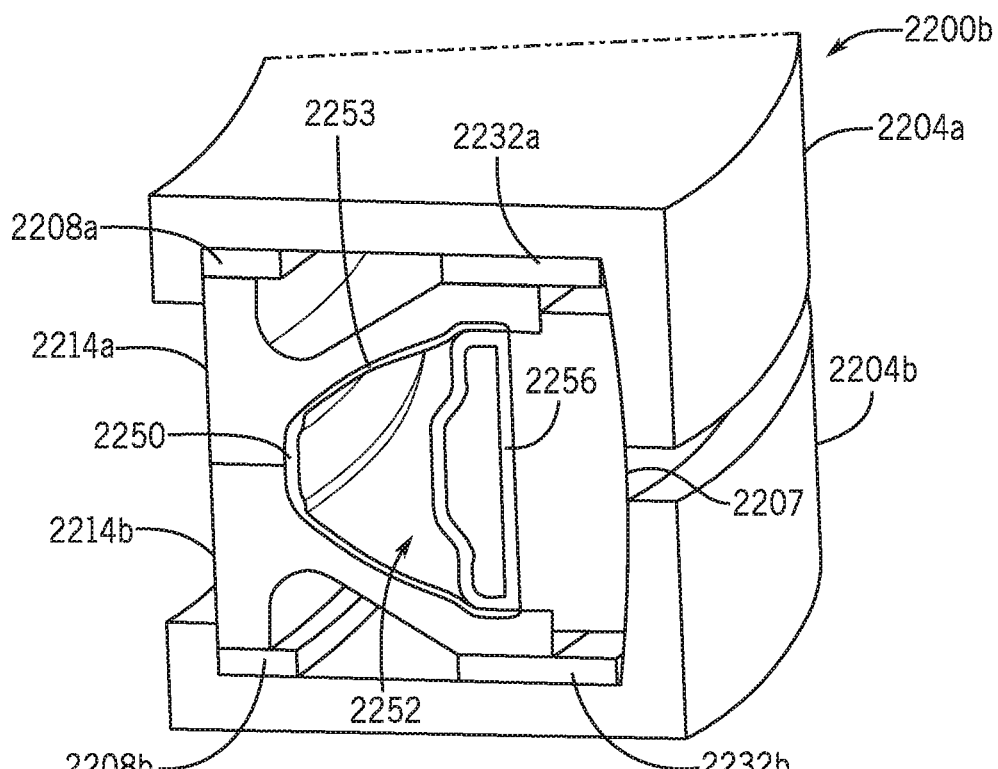
FIG. 22B depicts an arrangement for performing a channel weld for the reinforced thermoplastic wheel component of FIG. 22A.

With reference to FIGS. 22A and 22B, a second example of a multi-stage thermal bonding technique is depicted. FIG. 22A shows an operation 2200a in which a spoke bed weld or bond is performed, and FIG. 22B shows an operation 2200b in which a channel weld or bond is performed. As shown in FIG. 22A, a main structure portion 2250 can generally be held within a tooling. The tooling can include a first half 2204a and a second half 2204b. The first and second halves 2204a, 2204b can operate as outer support members that clamp the pieces of the wheel component in the tooling. A first cradle portion 2214a and a second cradle portion 2214b can contact and engage the main structure portion 2250 within the tooling. An annular member 2206 can retain the main structure portion 2250 therein, helping to hold the portion 2250 against the cradles 2214a, 2214b. The annular member 2206 can also extend toward and push against the main structure portion 2250 to help define contour 2253 during thermal bonding. FIG. 22A also shows conduction rings 2208a, 2208b. The conduction rings 2208a, 2208b can be used to generate heat within the cradle portions 2214a, 2214b that can be used to thermally bond components of the main structure portion 2250 and/or otherwise facilitate a spoke bed weld of the wheel component. Phenolic insulating rings 2212a, 2212b can provide an electrically insulating feature that limits the flow of heat to non-target areas during the thermal bonding. With reference to FIG. 22B, the operation 2200b shows the thermal bonding of a rim bed portion 2256 to the main structure portion 2250. A cavity 2252 can be defined by the main structure portion 2250 and the rim bed portion 2256. In the operation 2200b, heat is generated proximate a channel of the rim bed portion 2256 via conduction rings 2232a, 2232b. Phenolic insulting rings 2228a, 2228b are provided to limit the flow of heat to non-target areas during the thermal bonding.

Figure 23A:
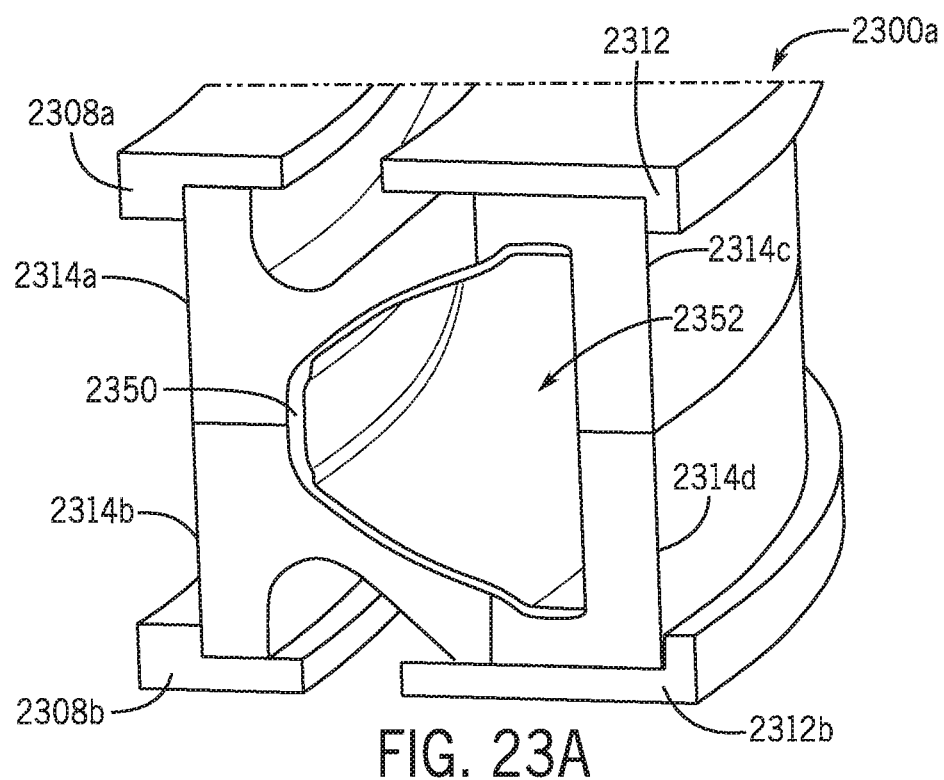
FIG. 23A depicts an arrangement for performing a spoke weld for a reinforced thermoplastic wheel component, according to another example.
Figure 23B:
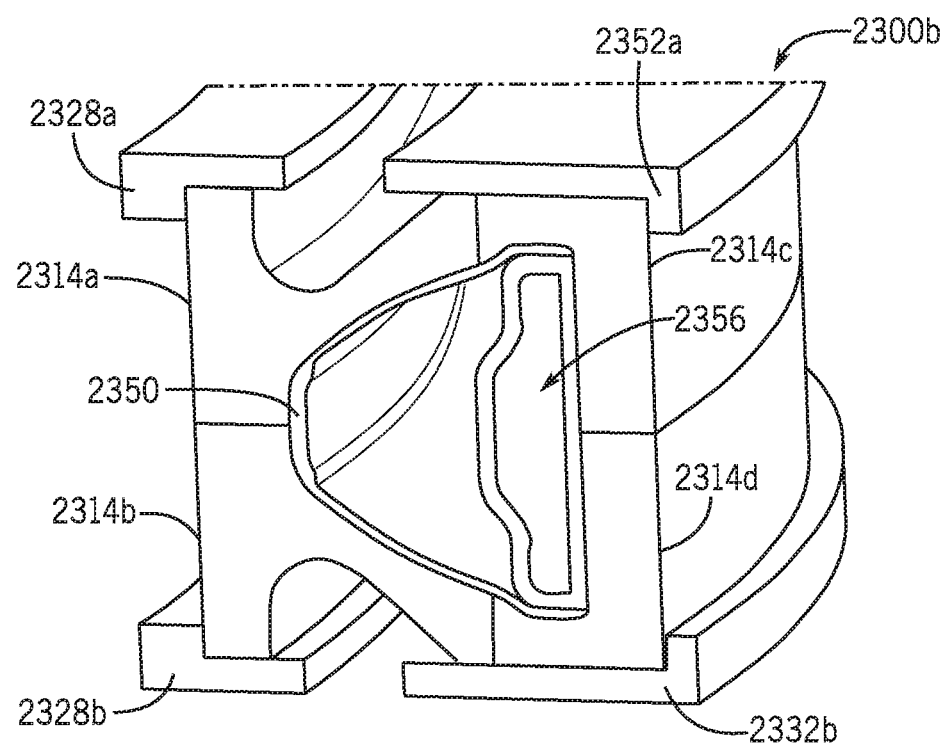
FIG. 23B depicts an arrangement for performing a channel weld for the reinforced thermoplastic wheel component of FIG. 23A.

With reference to FIGS. 23A and 23B, a third example of a multi-stage thermal bonding technique is depicted. FIG. 23A shows an operation 2300a in which a spoke bed weld or bond is performed, and FIG. 23B shows an operation 2300b in which a channel weld or bond is performed. As shown in FIG. 23A, a main structure portion 2350 can generally be held within a tooling. The tooling can include a first cradle portion 2314a, a second cradle portion 2314b, a third cradle portion 2314c, and a fourth cradle portion 2014d, each of which cooperate to contact and engage the main structure portion 2350 within the tooling. A cavity 2352 can be defined by the main structure portion 2350 and the third and fourth cradles 2314c, 2314d. FIG. 23A also shows conduction rings 2308a, 2308b. The conduction rings 2308a, 2308b can be used to generate heat with the cradle portions 2314a, 2314b that can be used to thermally bond components of the main structure portion 2350 and/or otherwise facilitate a spoke bed weld of the wheel component. Phenolic insulating rings 2312a, 2312b can provide an electrically insulating feature that limits the flow of heat to non-target areas during the thermal bonding. With reference to FIG. 23B, the operation 2300b shows the thermal bonding of a rim bed portion 2356 to the main structure portion 2350. In the operation 2300b, heat is generated proximate a channel of the rim bed portion 2356 via conduction rings 2332a, 2332b. Phenolic insulting rings 2328a, 2328b are provided to limit the flow of heat to non-target areas during the thermal bonding.

Figure 24A:
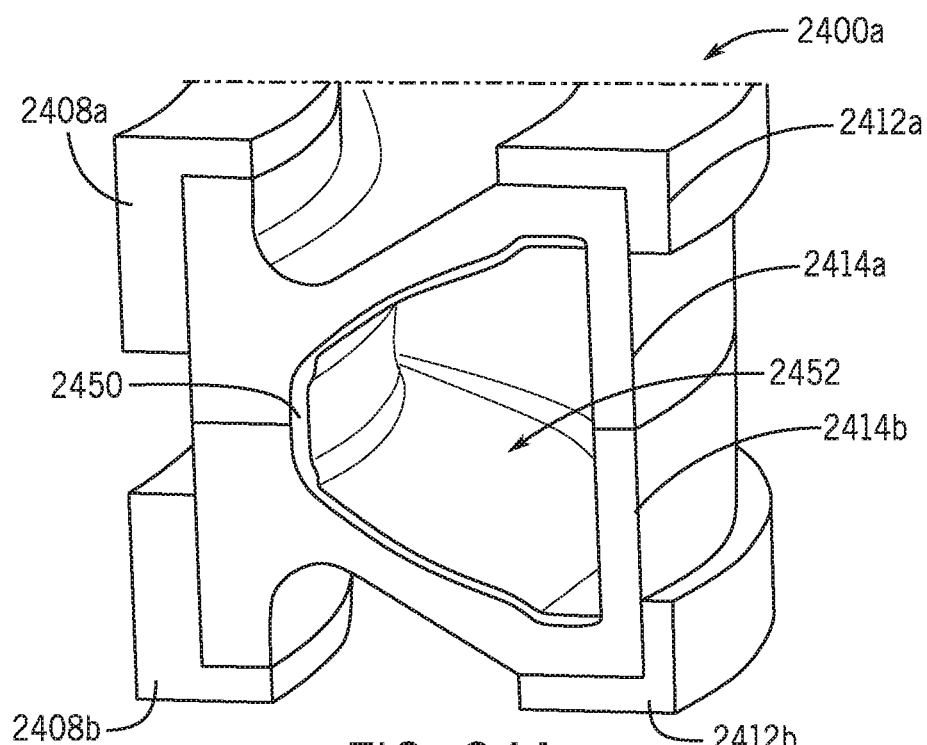
FIG. 24A depicts an arrangement for performing a spoke weld for a reinforced thermoplastic wheel component, according to another example.
Figure 24B:
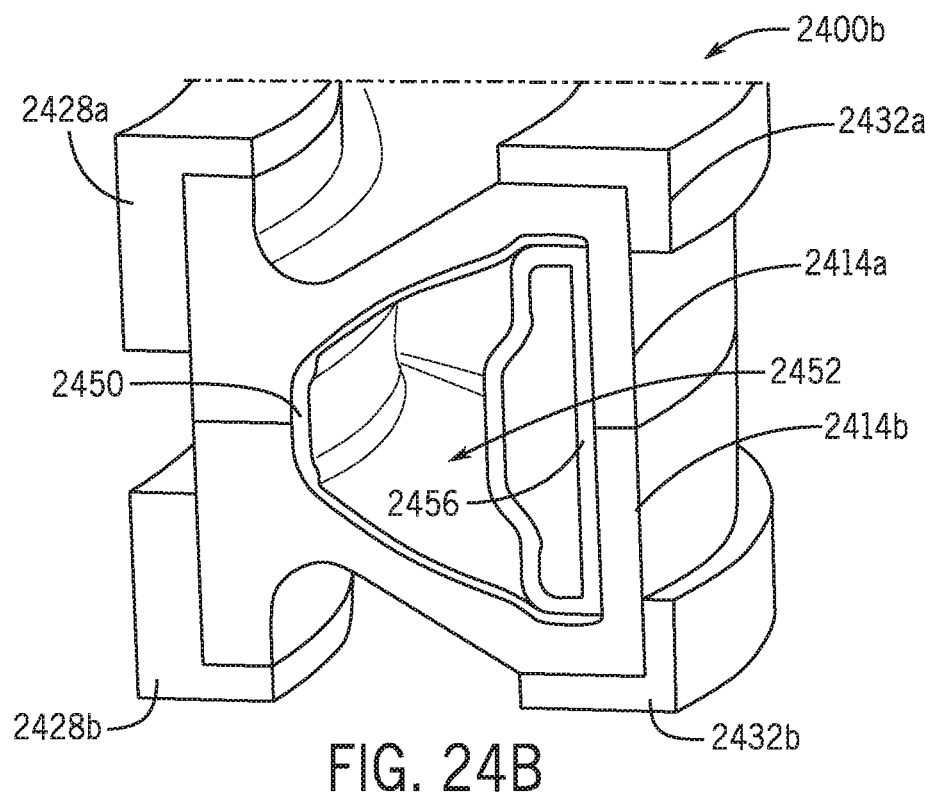
FIG. 24B depicts an arrangement for performing a channel weld for the reinforced thermoplastic wheel component of FIG. 24A.

With reference to FIGS. 24A and 24B, a fourth example of a multi-stage thermal bonding technique is depicted. FIG. 24A shows an operation 2400a in which a spoke bed weld or bond is performed, and FIG. 24B shows an operation 2400b in which a channel weld or bond is performed. As shown in FIG. 24A, a main structure portion 2450 can generally be held within a tooling. The tooling can include a first cradle portion 2414a and a second cradle portion 2414b, each of which cooperate to contact and engage the main structure portion 2450 within the tooling. A cavity 2452 can be defined by the main structure portion 2450 and the cradles 2414a, 2414b. FIG. 24A also shows conduction rings 2408a, 2408b. The conduction rings 2408a, 2408b can be used to generate heat with the cradle portions 2414a, 2414b that can be used to thermally bond components of the main structure portion 2450 and/or otherwise facilitate a spoke bed weld of the wheel component. Phenolic insulating rings 2412a, 2412b can provide an electrically insulating feature that limits the flow of heat to non-target areas during the thermal bonding. With reference to FIG. 24B the operation 2400b shows the thermal bonding of a rim bed portion 2456 to the main structure portion 2450. In the operation 2400b, heat is generated proximate a channel of the rim bed portion 2456 via conduction rings 2432a, 2432b. Phenolic insulting rings 2428a, 2428b are provided to limit the flow of heat to non-target areas during the thermal bonding.

Figure 25A:
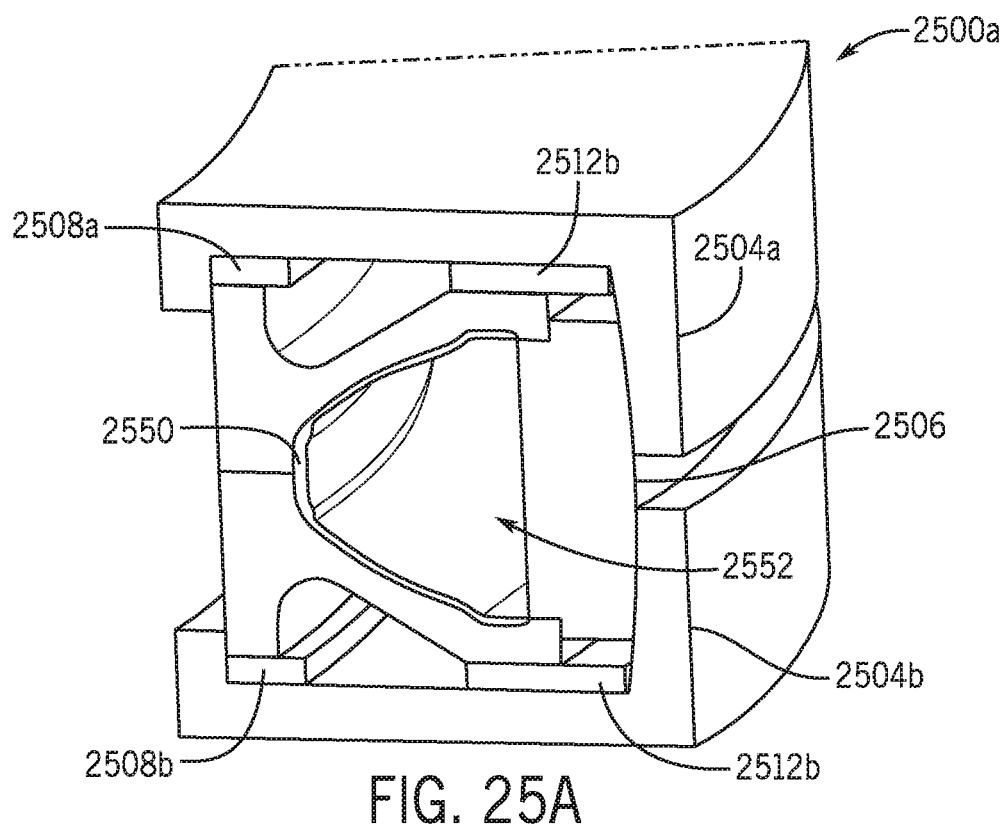
FIG. 25A depicts an arrangement for performing a spoke weld for a reinforced thermoplastic wheel component, according to another example.
Figure 25B:
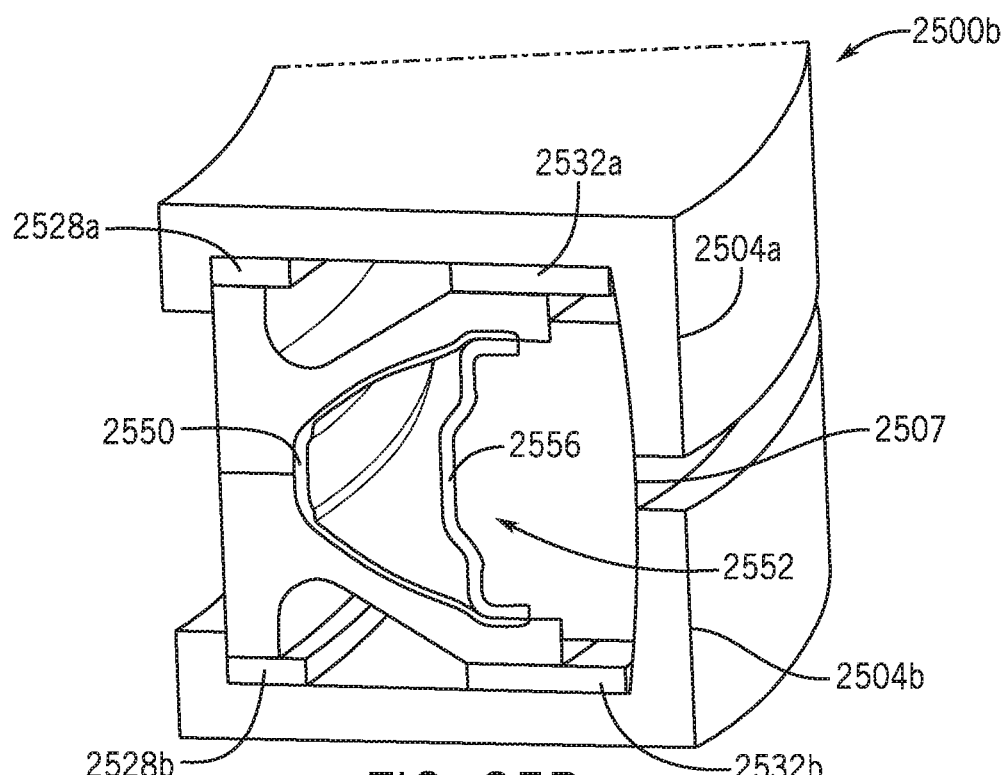
FIG. 25B depicts an arrangement for performing a channel weld for the reinforced thermoplastic wheel component of FIG. 25A.

With reference to FIGS. 25A and 25B, a fifth example of a multi-stage thermal bonding technique is depicted. FIG. 25A shows an operation 2500a in which a spoke bed weld or bond is performed, and FIG. 25B shows an operation 2500b in which a channel weld or bond is performed. As shown in FIG. 25A, a main structure portion 2550 can generally be held within a tooling. The tooling can include a first half 2504a and a second half 2504b. The first and second halves 2504a, 2504b can operate as outer support members that clamp the pieces of the wheel component in the tooling. A first cradle portion 2514a and a second cradle portion 2514b can contact and engage the main structure portion 2550 within the tooling. An annular member 2506 can retain the main structure portion 2550 therein, helping to hold the portion 2550 against the cradles 2514a, 2514b. A cavity 2552 can be defined by the main structure portion 2550 and the annular member 2506. FIG. 25A also shows conduction rings 2508a, 2508b. The conduction rings 2508a, 2508b can be used to generate heat with the cradle portions 2514a, 2514b that can be used to thermally bond components of the main structure portion 2550 and/or otherwise facilitate a spoke bed weld of the wheel component. Phenolic insulating rings 2512a, 2512b can provide an electrically insulating feature that limits the flow of heat to non-target areas during the thermal bonding. With reference to FIG. 25B, the operation 2500b shows the thermal bonding of a rim bed portion 2556 to the main structure portion 2550. In the operation 2500b, heat is generated proximate a channel of the rim bed portion 2556 via conduction rings 2532a, 2532b. Phenolic insulting rings 2528a, 2528b are provided to limit the flow of heat to non-target areas during the thermal bonding. FIG. 25B also shows another annular member 2507 that is used to hold the rim bed portion 2556 adjacent the main structure portion 2550. The another annular member 2507 can be adapted to define a contoured surface that matches and/or is used to form a matching contour of the rim bed portion 2556, such as that used to engage a bicycle tire.

Figure 26:
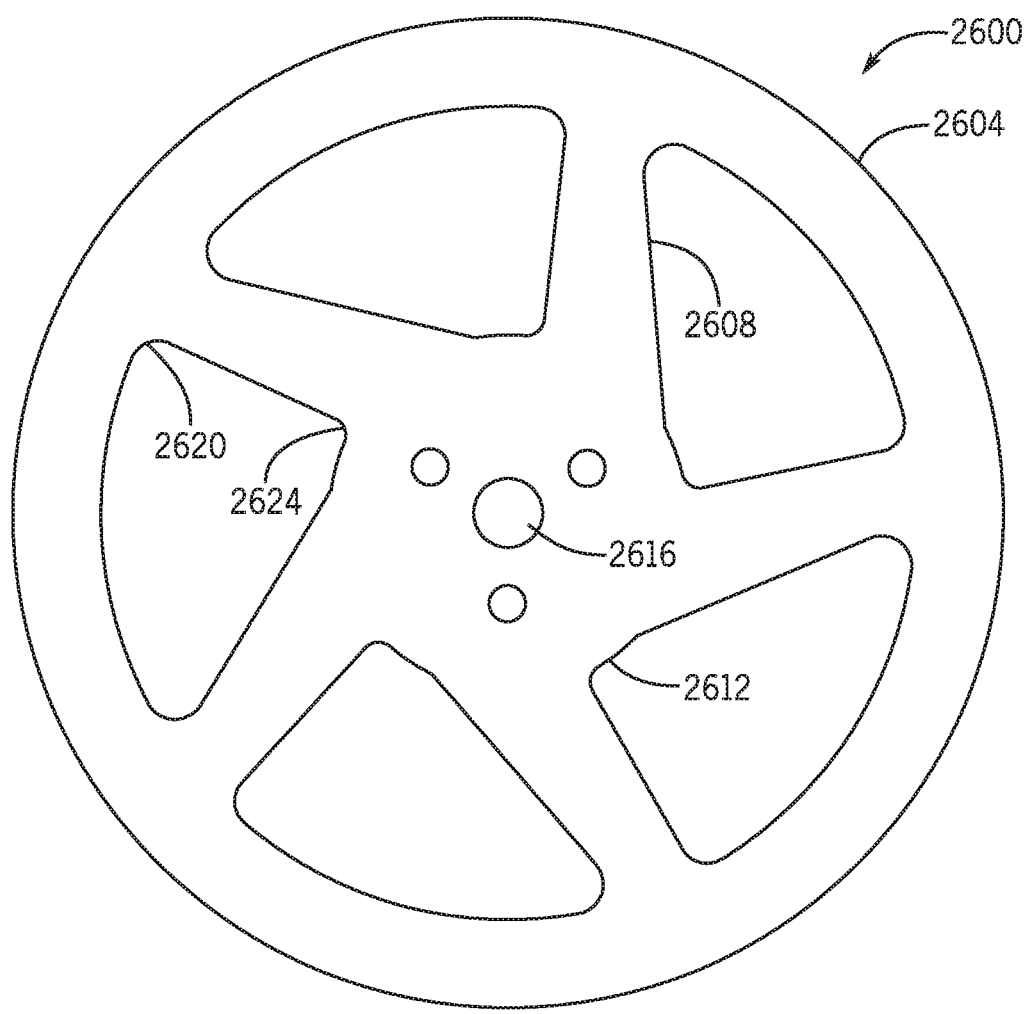
FIG. 26 depicts another example of a wheel component formed from a reinforced thermoplastic material.

Turning to FIG. 26, a wheel component 2600 is shown. The systems and techniques of the present disclosure can be used to produce a wide variety of shapes and components from reinforced thermoplastic material. This can include shapes and components having curved contours and/or substantially hollow interiors, such as the various wheel components and assemblies described herein. The systems and techniques can also be used to produce another wheel designs, such as the wheel component 2600 which can substantially define a tri-spoke shape.

For example, the wheel component 2600 can have a rim 2604 with a substantially circular contour that defines an outer perimeter of the wheel component 2600. The rim 2604 can be smooth and substantially seamless, according to the various methods described herein. The wheel component can also include a series of spokes 2608. The spokes 2608 can be integrally formed with the rim 2604 and associated therewith at one or more curved regions 2620. While the series of spokes 2608 includes five spokes in FIG. 26, it will be appreciated that the series of spokes 2608 more generally cooperate to define the tri-spoke design of the wheel component 2600. In this regard, the series of spokes 2608 can include three spokes, integrally formed with the rim 2604. The wheel component 2600 can also include a hub 2624. The hub 2624 can be integrally formed with some or all of the series of spokes 2608 and associated therewith at one or more curved regions 2624. The hub can define an opening 2616 that is adapted to receive a component of a bicycle.

The wheel component 2600 can be formed fully from a reinforced thermoplastic material. In this regard, each of the rim 2604, the series of spokes 2608, and the hub 2612 can be formed from a reinforced thermoplastic material. The rim 2604, the series of spokes 2608, and the hub 2612 can be bonded to one via any of the thermal bonding processes described herein. In some cases, one or more of the rim 2604, the series of spokes 2608, and the hub 2612 can be formed as a substantially hollow component.

Figure 27A:
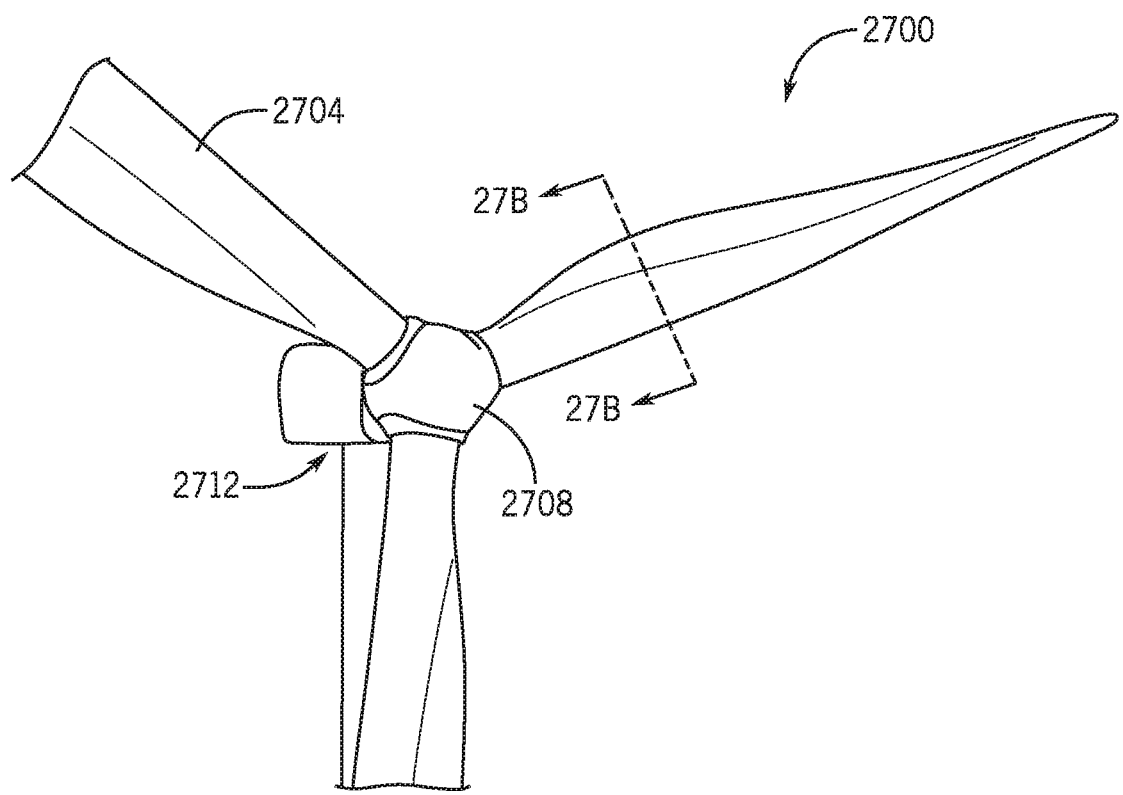
FIG. 27A depicts an apparatus including substantially hollow components that are formed from a thermoplastic material.
Figure 27B:
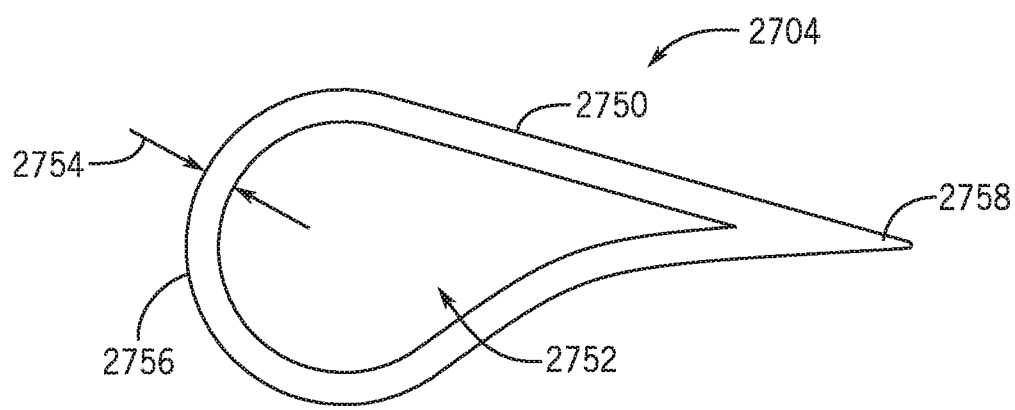
FIG. 27B depicts a cross-sectional view of the substantially hollow components of FIG. 27A, taken along line 27B-27B of FIG. 27A.

It is contemplated and described herein that the systems and techniques for forming a component from reinforced thermoplastic materials can be used to construct a wide variety of applications where a sufficiently high strength-to-weight ratio is desired. For example, the systems and techniques described herein can be adapted to produce components that have a sealed, hollow interior and/or define a complex, seamless exterior contour. As one illustration, FIGS. 27A-27B depict the application of systems and techniques described herein to wind turbines, and wind turbine blades. It will be appreciated, however, that the example of FIGS. 27A-27B is meant as an illustration of other non-wheel applications of the systems and techniques described herein rather than be limiting.

With reference to FIG. 27A, a wind turbine 2700 is shown. The wind turbine 2700 can include blades 2704 that are associated with a rotatable structure 2708. The wind turbine 2700 can further include a device 2712 that is connected to the rotatable structure 2708 and is configured for energy transfer upon the rotation of the rotatable structure 2708. The blade 2704 can be sufficiently strong to withstand the force of wind and gravitational forces, but light in order to rotate. The blades 2704 can be formed full from a reinforced thermoplastic material, according to one or more the techniques described herein.

For example, with reference to FIG. 27B, a cross-sectional view of the blade 2704 is depicted, taken along line 27B-27B of FIG. 27A. The blade 2704 can have an external contour 2750 that is substantially smooth and seamless, according to the techniques described herein. The blade 2704 can further include a cavity 2752. The cavity 2752 can be substantially sealed from an external environment. The blade 2704 can be formed to meet target aerodynamic specifications, and as such defining a leading edge 2756 and a trailing edge 2758. One or both of the leading edge 2756 or the trailing edge 2758 can be curved or partially curved. Further, one or both of the leading edge 2765 or the trailing edge 2758 can define a sharp edge of the blade 2704. The reinforced thermoplastic material can be tuned to have a thickness 2754.

To facilitate the reader's understanding of the various functionalities of the examples discussed herein, reference is now made to the flow diagram in FIGS. 28, 29, 30, and 31, which illustrates processes 2800, 2900, 3000, and 3100, respectively. While specific steps (and orders of steps) of the methods presented herein have been illustrated and will be discussed, other methods (including more, fewer, or different steps than those illustrated) consistent with the teachings presented herein are also envisioned and encompassed with the present disclosure.

Figure 28:
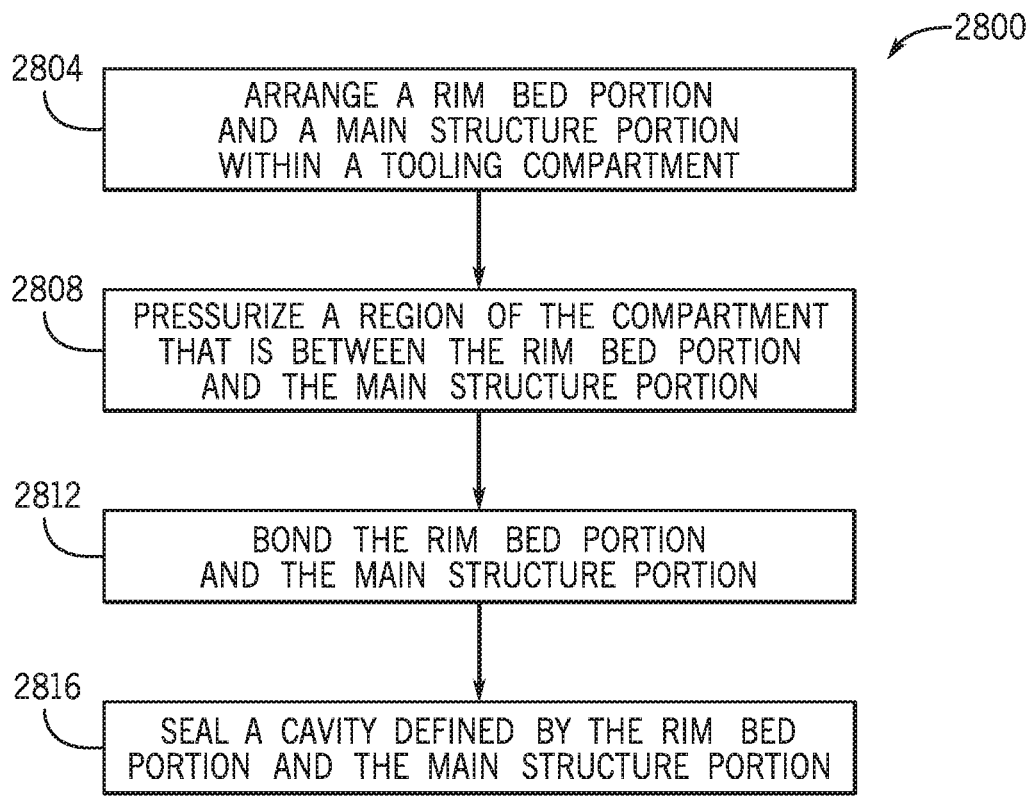
FIG. 28 depicts a flow diagram of a method of manufacturing a fully reinforced thermoplastic wheel component.

In this regard, with reference to FIG. 28, process 2800 relates generally to a method of manufacturing a fully reinforced thermoplastic wheel component. The process 2800 can be used with any of the wheel components and tooling described herein, for example, such as the wheel components 300, 400, 500, 600, 800, 1000; and the tooling 900, 1050, 1200; and variations and combinations thereof.

At operation 2804, a rim bed portion and a main structure portion can be arranged within a tooling compartment. The rim bed portion and the main structure portion can be formed from a reinforced thermoplastic material. For example and with reference to FIGS. 10A and 10B, the rim bed portion 1004 and the main structure portion 1010 can be arranged in the tooling compartment 1040. The rim bed portion 1004 and the main structure portion 1010 can be formed from a reinforced thermoplastic material, such as any of the reinforced thermoplastic materials described herein, redundant explanation of which is omitted here for clarity.

At operation 2808, a region of compartment that is between the rim bed portion and the main structure portion can be pressurized. For example and with reference to FIG. 10C, the tooling compartment 1060 can be pressurized. The inflation component 1070 can deliver a compressed air to a region of the tooling 1050 that is substantially between the rim bed portion 1084 and the main structure portion 1080 to maintain a shape of a cavity of the wheel component during thermal bonding.

At operation 2812, the rim bed portion and the main structure portion can be bonded by heating the reinforced thermoplastic material above a melting temperature. For example and with reference to FIG. 11, the rim bed portion 1084 and the first wall portion 1082a and second wall portion 1082b can be thermally bonded to one another. For example, the tooling 1050 can be subjected to heat, such as heat that is an excess of 450 degrees, that causes one or more of the main structure portion 1084, the first wall portion 1082a, and/or the second wall portion 1082b to transition toward or into a partially melted or melted state.

At operation 2816, a cavity can be defined by the rim bed and the main structure portion and the cavity can be sealed. For example and with reference to FIG. 11, the cavity of the wheel component 1050 can be sealed. Subsequent to thermal bonding of the pieces of the wheel component 1110, the inflation component 1170 can be removed from the cavity. In some cases, the opening 1085 can be allowed to close with exit of the inflation component 1170. For example, the reinforced thermoplastic material of the rim bed portion 1004 can be largely self-sealing. Additionally or alternatively, a higher-temp film, plug or other structure can cooperate to seal the opening 1085.

Figure 29:
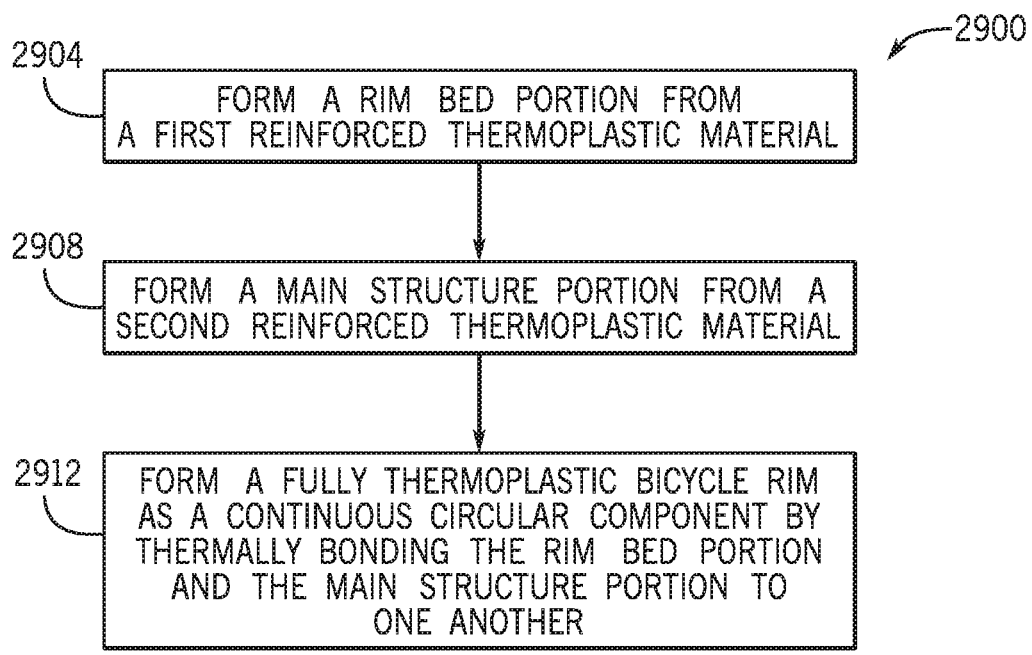
FIG. 29 depicts a flow diagram of another method of manufacturing a fully reinforced thermoplastic wheel component.

In this regard, with reference to FIG. 29, process 2900 relates generally to a method of manufacturing a fully reinforced thermoplastic wheel component. The process 2900 can be used with any of the wheel components and tooling described herein, for example, such as the wheel components 300, 400, 500, 600, 800, 1000; and the tooling 900, 1050, 1200; and variations and combinations thereof.

At operation 2904, a rim bed portion can be formed from a first reinforced thermoplastic material. For example and with reference to FIG. 7A, the rim bed portion 708 can be formed from a first thermoplastic material. A stamping operation can manipulate the first thermoplastic material into the shape of the rim bed portion 708.

At operation 2908, a main structure portion can be formed from a second reinforced thermoplastic material. For example and with reference to FIGS. 7B and 7C, the wall portions 718, 728 can be formed from a second thermoplastic material. A stamping operation can manipulate the second thermoplastic material into the shape of the wall portions 718, 728.

At operation 2912, the fully reinforced thermoplastic wheel component can be formed as a continuous circular component. The operation of forming can occur by thermally bonding the rim bed portion and the main structure portion to one another within a tooling compartment. For example and with reference to FIG. 14, the rim bed portion 1220 and the main structure portion 1224 can be mechanically engaged with one another. The rim bed portion 1220 and the main structure portion 1224 can be mechanically engaged with one another and arranged within a tooling 1200, which can define a continuous circular shape therein. The tooling 1200 can be subjected to heat, allowing the rim bed portion 1220 and the main structure portion 1224 to thermally bond to one another therein. The rim bed portion 1220 and the main structure portion 1224 can be removed from the tooling 1200 as an integrally formed structure having a continuous, substantially seamless exterior contour.

Figure 30:
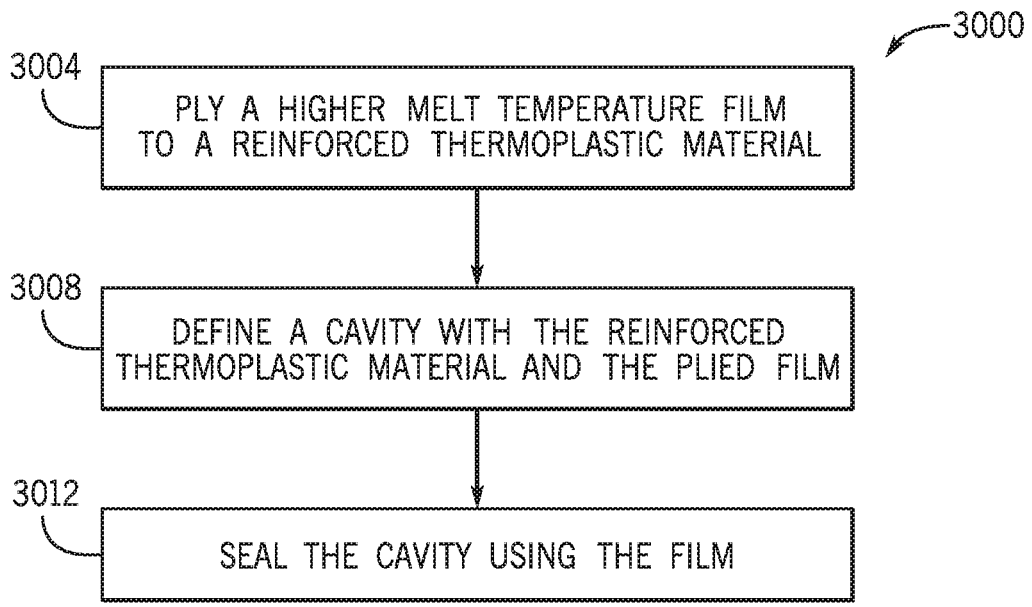
FIG. 30 depicts a flow diagram of another method of manufacturing a fully thermoplastic wheel component.

In this regard, with reference to FIG. 30, process 3000 relates generally to a method of manufacturing a fully reinforced thermoplastic wheel component. The process 3000 can be used with any of the wheel components and tooling described herein, for example, such as the wheel components 300, 400, 500, 600, 800, 1000; and the tooling 900, 1050, 1200; and variations and combinations thereof.

At operation 3004, a film can be plied to a reinforced thermoplastic material. The film can have a higher melting temperature than that of the reinforced thermoplastic material. For example and with reference to FIG. 7D, the film 754 can be plied to a stamp form shape 762. The film 754 can have a higher melting temperature than that of the stamp form shape 762, which is formed from a reinforced thermoplastic material. Further, as shown in FIG. 7E, the film 784 can be plied to the consolidated panel 792. The film 784 can have a higher melting temperature than that of the consolidated panel 792.

At operation 3008, a cavity can be defined with the reinforced thermoplastic material and the plied film. For example and with reference to FIGS. 8 and 9, the cavity 801 can be defined using the collection of the rim bed portion 804 and the main structure portion 810, all of which can be formed from a reinforced thermoplastic material having a plied higher-melt temperature film.

At operation 3012, the cavity can be sealed using the film. For example and with reference to FIG. 11, the rim bed portion 1004 can include the higher-melt temperature film described herein. In this regard, the reinforced thermoplastic material of the rim bed 1004 and the film cool according to a different thermal characteristic. The different thermal characteristic can allow the rim bed portion 1004 to be substantially self-sealing, closing the hole 1005 upon cooling.

Figure 31:
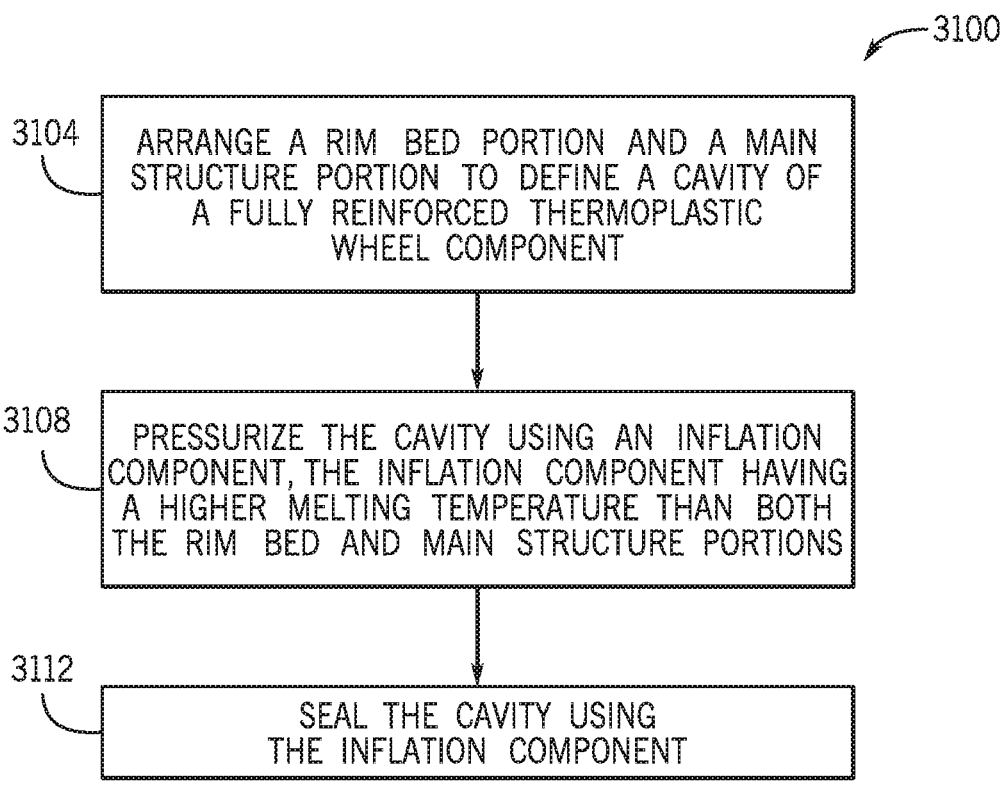
FIG. 31 depicts a flow diagram of another method of manufacturing a fully thermoplastic wheel component.

In this regard, with reference to FIG. 31, process 3100 relates generally to a method of manufacturing a fully reinforced thermoplastic wheel component. The process 3000 can be used with any of the wheel components and tooling described herein, for example, such as the wheel components 300, 400, 500, 600, 800, 1000; and the tooling 900, 1050, 1200; and variations and combinations thereof.

At operation 3104, a rim bed portion and a main structure portion can be arranged to define a cavity of the fully reinforced thermoplastic wheel component. For example and with reference to FIGS. 12 and 13, the rim bed portion 1204 and the walls 1208a, 1208b can be arranged to define the cavity 1210. The rim bed portion 1204 and the walls 1208a, 1208b can be arranged to define the cavity 1210 within a tooling that is adapted to form a thermal bond between the pieces held therein.

At operation 3108, the cavity can be pressurized by at least partially inserting an inflation component into the cavity. The inflation component can at least partially be formed from a material having a melting temperature that is greater than a melting temperature of materials used to form the rim bed portion and the main structure portion. For example and with reference to FIGS. 12 and 13, the cavity 1210 can be pressurized by at least partially inserting an inflation component 1250 into the cavity 1210. In particular, the tip 1258 can be inserted through an opening 1206 and used to direct compressed air into the cavity 1201 in order to maintain a shape of the cavity 1210 during a thermal bonding process. The tip 1258 can be at least partially formed from a material having a melting temperature that is greater than a melting temperature of the rim bed portion 1204.

At operation 3112, the cavity can be sealed using the inflation component. For example and with reference to FIGS. 12 and 13, the tip 1258 can be separated from a remainder of the inflation component 1250, such as separating the tip 1258 from the shaft portion 1254. The tip 1258 can remain at least partially engaged within the hole 1206, defining a plug or partial plug for the flow of air therethrough. Additionally, the tip 1262 can cool according to a different thermal characteristic than that of the reinforced thermoplastic material of the rim bed portion 1204. The different thermal characteristic can allow the rim bed portion 1204 to be substantially self-sealing, closing the hole 1005 upon cooling with the tip 1262.

Figure 32:
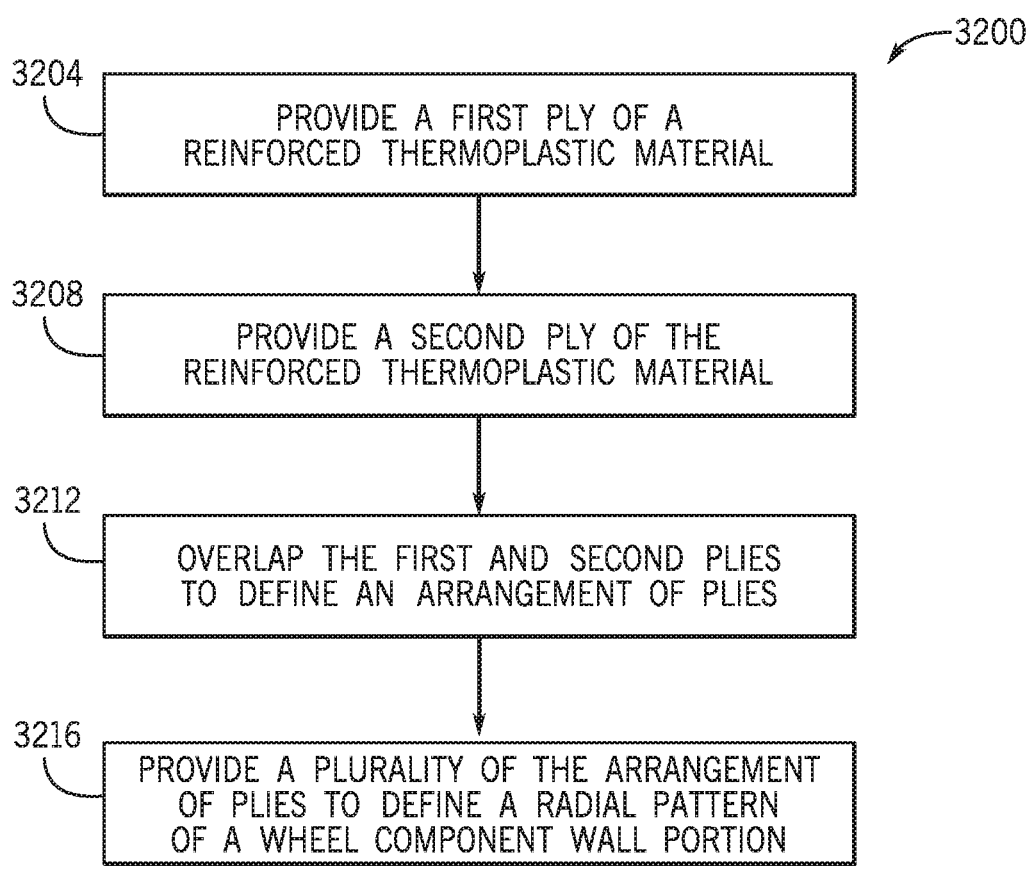
FIG. 32 depicts a flow diagram of a method of forming a sidewall of a fully thermoplastic wheel component.

With reference to FIG. 32, process 3200 relates generally to a method of manufacturing a wall portion of a fully reinforced thermoplastic wheel component. The process 3200 can be used with any of the wheel components and tooling described herein, for example, such as the wheel components 300, 400, 500, 600, 800, 1000; and the tooling 900, 1050, 1200; and variations and combinations thereof.

At operation 3204, a first ply of reinforced thermoplastic material is provided. For example, and with reference to FIG. 8A, the first ply 810 is provided. The first ply 810 can include or be formed from a reinforced thermoplastic material, such as any of the materials described herein. The first ply 810 can have a first edge 812. The first ply 810 can be provided relative to the wall portion outline 804. For example, the first ply 810 can be arranged relative to the wall portion outline 804 to define an angle $\theta_1$ from a center axis of the circular outline, as defined by the center 806.

At operation 3208, a second ply of reinforced thermoplastic material is provided. For example, and with reference to FIG. 8B, the second ply 820 is provided. The second ply 820 can include or can be formed from a reinforced thermoplastic material, such as any of the materials described herein. The second ply 820 can have a second edge 822. The second ply 820 can be provided relative to the wall portion outline 804. For example, the second ply 820 can be arranged relative to the wall portion outline 804 to define an angle $\theta_2$ from a center axis of the circular outline, as defined by the center 806.

At operation 3212, the first ply and the second ply are overlapped within one another in order to define an arrangement of plies. For example, and with reference to FIGS. 8A and 8B, the first ply 810 and the second ply 820 are overlapped with one another to define an arrangement of plies of the radial pattern 802. In one example, the first and second plies 810, 820 are overlapped with one another such that the first edge 812 and the second edge 822 are substantially transverse to one another. It will be appreciated, however, that the orientation of the first and second edges 812, 822 can be specifically chosen and/or designed with any appropriate orientation to facilitate wall strength of the wheel component.

At operation 3216, a plurality of the arrangement of plies are provided to define a radial pattern of a wheel component of a wall portion. For example, and with reference to FIGS. 8A and 8B, multiple groupings or arrangements of the plies 810, 820 can be provided and arranged radially along the outline 804. The radial arrangement of the plies 810, 802 can define the radial cross pattern 802, such as that shown with reference to FIG. 8A. The layup 800 including the crossply pattern 802 can be subsequently shaped to form the wall portion 850, according to any of the shaping techniques described herein.

Other examples and implementations are within the scope and spirit of the disclosure and appended claims. For example, features implementing functions can also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A wheel component, comprising:
   a rim bed portion at least partially defining a cavity and defining an outer annular surface, the outer annular surface configured to engage a bicycle tire; and
   a main structure portion at least partially defining the cavity;
   wherein:
   the rim bed portion comprises a reinforced thermoplastic material;
   the main structure portion comprises a reinforced thermoplastic material;
   the rim bed portion is bonded to the main structure portion to form an integral structure;
   the main structure portion comprises a sidewall portion formed from the reinforced thermoplastic material;
   the reinforced thermoplastic material of the sidewall portion comprises a plurality of overlapping plies defining a radial crossply;
   the plurality of overlapping plies comprises a first ply having a first edge, and a second ply having a second edge;
   the first ply and the second ply overlap one another on the sidewall portion and define an overlapped portion with the first edge oriented substantially transverse to the second edge on the sidewall portion;
   the overlapped portion extends across at least a majority of a height of the sidewall portion.

2. The wheel component of claim 1, wherein:
   the first edge and the second edge each define a bias angle of between 22.5 and 75 degrees relative to a radius extending from the outer annular surface to a center axis of a continuous circle defined by the outer annular surface.

3. The wheel component of claim 2, wherein the first edge and the second edge define the bias angle of between 22.5 and 75 degrees with a geometric center of the first ply and the second ply arranged on the sidewall portion.

4. The wheel component of claim 1, wherein:
   the first ply and the second ply define an arrangement of plies;
   the wheel component further comprises a plurality of the arrangement of plies disposed in a radial pattern; and
   the plurality of the arrangement of plies defines the sidewall portion.

5. The wheel component of claim 1, wherein the rim bed portion and main structure portion are at least one of thermally bonded, chemically bonded, or adhesively bonded.

6. The wheel component of claim 1, wherein:
   the main structure portion defines an inner annular surface that is configured to receive a series of spokes; and
   the main structure portion is configured to withstand a pull force of a spoke of the series of spokes of at least 300 lbs.

7. The wheel component of claim 1, wherein:
   the reinforced thermoplastic material comprises:
   a thermoplastic material; and
   fibers disposed within the thermoplastic material; and the fibers include at least one of carbon fibers, glass fibers, Kevlar fibers, or basalt fibers.

8. The wheel component of claim 7, wherein the fibers define at least 30% of a volume of the reinforced thermoplastic material.

9. The wheel component of claim 1, wherein
the plurality of overlapping plies comprise a first plurality of overlapping plies that define a first radial crossply pattern on the wall portion,
the reinforced thermoplastic material further comprises a second plurality of overlapping plies that define a second radial crossply pattern on the wall portion over the first radial crossply pattern.

10. The wheel component of claim 9, wherein the first plurality of overlapping plies and the second plurality of overlapping plies are layers of a six, twelve, or twenty-two layer crossply laminate.

11. The wheel component of claim 9, wherein the first plurality of overlapping plies and the second plurality of overlapping plies cooperate to define a continuous, circumferentially uniform pattern of overlapping plies on the sidewall of the main structure portion.

12. The wheel component of claim 1, wherein the first ply and second ply overlap one another on the wall portion and define an overlapped portion encompassing a majority of the surface of area of the first ply and the first ply.

13. The wheel component of claim 1, wherein
the sidewall portion comprises a first sidewall portion defining a first sidewall of the wheel component,
the radial crossply is a first radial crossply forming the first sidewall,
the main structure further comprises a second sidewall portion defining a second sidewall of the wheel component formed from the reinforced thermoplastic material,
the reinforced thermoplastic material of the second sidewall portion comprises a second plurality of overlapping plies defines a second radial crossply.

14. The wheel component of claim 13, wherein the thermoplastic material of the first sidewall portion including the first radial crossply and the thermoplastic material of the second sidewall portion including the second radial crossply overlap one another to define a reinforced region configured to receive spokes of a bicycle tire.

15. The wheel component of claim 14, wherein
the first radial crossply pattern defines a first continuous, circumferential uniform pattern of overlapping plies on the first sidewall portion, and
the second radial crossply pattern defines a second continuous, circumferential uniform pattern of overlapping plies on the second sidewall portion.

16. A wheel component, comprising a continuous reinforced thermoplastic material, the continuous reinforced thermoplastic material defining:
a rim bed portion having a first external surface;
a main structure portion connected to the rim bed portion and having a second external surface that defines a sidewall portion of the wheel component; and
a circular cavity;
wherein:
the first external surface and the second external surface are each free of indicia associated with bladder exit from the cavity;
the continuous reinforced thermoplastic material comprises a layup of overlapping reinforced thermoplastic plies, the layup defining a radial crossply with edges of the plies oriented substantially transverse to an edge of an adjacent ply; and
the radial crossply defines a continuous, circumferentially uniform distribution of plies on the sidewall portion.

17. The wheel component of claim 16, wherein the indicia comprises through portions of the wheel component extending between the circular cavity and an external environment that have a cross-dimension of greater than 15 millimeters (mm).

18. The wheel component of claim 16, wherein the circular cavity is formed by maintaining a pressurized region between the rim bed portion and the main structure portion during a thermal bonding process.

19. The wheel component of claim 16, wherein the circular cavity comprises a self-sealing film.

20. The wheel component of claim 16, wherein the continuous reinforced thermoplastic material exhibits a flexural strength of at least 740 MPa.

21. A wheel component, comprising:
a wall portion formed from a reinforced thermoplastic material, wherein the reinforced thermoplastic material of the wall portion comprises a plurality of overlapping plies defining a radial crossply; and
a rim bed portion defining a cavity with the wall portion;
wherein the plurality of overlapping plies comprise a first ply and a second ply, the first ply having a first edge, and the second ply having a second edge with the first edge oriented substantially transverse to the second edge on the wall portion; and
wherein the first ply and second ply overlap one another on the wall portion and define an overlapped portion encompassing a majority of the surface area of the first ply and the second ply.

22. The wheel component of claim 21, wherein the wall portion comprises a first sidewall portion and a second sidewall portion connected to one another via a lap joint.

23. The wheel component of claim 22, wherein the cavity is at least partially defined by each of the rim bed portion, the first sidewall portion, and the second sidewall portion.

24. The wheel component of claim 21, wherein the rim bed portion is bonded to the main structure portion to form an integral structure that defines a continuous circular shape.

* * * * *